(12) United States Patent
Doughty

(10) Patent No.: US 11,470,774 B2
(45) Date of Patent: Oct. 18, 2022

(54) BLADE ASSEMBLY FOR A GRASS CUTTING MOBILE ROBOT

(71) Applicant: iRobot Corporation, Bedford, MA (US)

(72) Inventor: Brian W. Doughty, Framingham, MA (US)

(73) Assignee: iRobot Corporation, Bedford, MA (US)

( * ) Notice: Subject to any disclaimer, the term of this patent is extended or adjusted under 35 U.S.C. 154(b) by 456 days.

(21) Appl. No.: 16/631,109

(22) PCT Filed: Jun. 28, 2018

(86) PCT No.: PCT/US2018/040049
§ 371 (c)(1),
(2) Date: Jan. 14, 2020

(87) PCT Pub. No.: WO2019/013989
PCT Pub. Date: Jan. 17, 2019

(65) Prior Publication Data
US 2020/0154637 A1   May 21, 2020

Related U.S. Application Data

(60) Provisional application No. 62/532,939, filed on Jul. 14, 2017.

(51) Int. Cl.
*A01D 34/73*   (2006.01)
*A01D 34/00*   (2006.01)
(Continued)

(52) U.S. Cl.
CPC ......... *A01D 34/733* (2013.01); *A01D 34/008* (2013.01); *A01D 34/74* (2013.01);
(Continued)

(58) Field of Classification Search
CPC ............................ A01D 34/733; A01D 34/008
(Continued)

(56) References Cited

U.S. PATENT DOCUMENTS 2,511,124 A   6/1950   Phelps
2,529,870 A   11/1950  Golasky
(Continued)

FOREIGN PATENT DOCUMENTS

CN   206136662   5/2017
DE   19932552    2/2000
(Continued)

OTHER PUBLICATIONS

EP European Search Report in European Appln. No. 18832658.1, dated Mar. 17, 2021, 7 pages.
(Continued)

*Primary Examiner* — Alicia Torres
(74) *Attorney, Agent, or Firm* — Fish & Richardson P.C.

(57) ABSTRACT

A grass cutting mobile robot includes a body and a blade assembly connected to the body and rotatable about a drive axis. The blade assembly includes blades, a housing to hold the blades, a coupling latch configured to lock the housing to a drive shaft of the mobile robot, and a spring that connects the blade to the coupling latch. The housing is configured for coupling to an actuator so that the housing is rotatable about a drive axis, and receives a shaft that connects the housing to the actuator. The shaft includes a groove or an undercut therein. The coupling latch is rotatable within the housing to move an engagement end towards, or away from the groove or undercut. The engagement end is positionable within the groove to lock the housing to the actuator.

20 Claims, 27 Drawing Sheets

(51) Int. Cl.
   *A01D 34/74* (2006.01)
   *A01D 34/78* (2006.01)
   A01D 34/66 (2006.01)
   A01D 101/00 (2006.01)

(52) U.S. Cl.
   CPC .......... *A01D 34/78* (2013.01); *A01D 34/661* (2013.01); *A01D 2101/00* (2013.01)

(58) Field of Classification Search
   USPC .................................................. 56/12.7, 295
   See application file for complete search history.

(56) References Cited

U.S. PATENT DOCUMENTS

| | | |
|---|---|---|
| 2,751,030 A | 6/1956 | Null |
| 3,128,840 A | 4/1964 | Barrett |
| 3,138,910 A | 6/1964 | Price |
| 3,252,304 A | 5/1966 | Moody |
| 3,385,041 A | 5/1968 | Douglas |
| 3,457,575 A | 7/1969 | Bienek |
| 3,550,714 A | 12/1970 | Bellinger |
| 3,621,642 A | 11/1971 | Leake |
| 3,670,481 A | 6/1972 | Minet |
| 3,674,316 A | 7/1972 | De Brey |
| 3,750,377 A | 8/1973 | Clark |
| 3,815,234 A | 6/1974 | Nelson |
| 3,918,241 A | 11/1975 | Stillons |
| 3,924,389 A | 12/1975 | Kita |
| 3,937,174 A | 2/1976 | Haaga |
| 3,946,543 A | 3/1976 | Templeton |
| 4,072,195 A | 2/1978 | Carlson |
| 4,114,354 A | 9/1978 | Morris |
| 4,119,900 A | 10/1978 | Kremnitz |
| 4,133,404 A | 1/1979 | Griffin |
| 4,158,944 A * | 6/1979 | Rabinow ............ A01D 34/6806 192/17 R |
| 4,163,977 A | 8/1979 | Polstorff |
| 4,258,536 A | 3/1981 | Kidd et al. |
| 4,306,329 A | 12/1981 | Yokoi |
| 4,369,543 A | 1/1983 | Chen et al. |
| 4,513,469 A | 4/1985 | Godfrey et al. |
| 4,545,453 A | 10/1985 | Yoshimura et al. |
| 4,556,313 A | 12/1985 | Miller et al. |
| 4,561,180 A | 12/1985 | Pittinger et al. |
| 4,603,753 A | 8/1986 | Yoshimura et al. |
| 4,626,995 A | 12/1986 | Lofgren et al. |
| 4,674,048 A | 6/1987 | Okumura |
| 4,679,152 A | 7/1987 | Perdue |
| 4,696,074 A | 9/1987 | Cavalli et al. |
| 4,700,301 A | 10/1987 | Dyke |
| 4,700,427 A | 10/1987 | Knepper |
| 4,716,621 A | 1/1988 | Zoni |
| 4,733,431 A | 3/1988 | Martin |
| 4,756,049 A | 7/1988 | Uehara |
| 4,767,237 A | 8/1988 | Cosman et al. |
| 4,777,416 A | 10/1988 | George, II et al. |
| 4,782,550 A | 11/1988 | Jacobs |
| 4,811,228 A | 3/1989 | Hyyppa |
| 4,854,000 A | 8/1989 | Takimoto |
| 4,887,415 A | 12/1989 | Martin |
| 4,893,025 A | 1/1990 | Lee |
| 4,909,024 A | 3/1990 | Jones et al. |
| 4,912,643 A | 3/1990 | Beirne |
| 4,918,441 A | 4/1990 | Bohman |
| 4,919,224 A | 4/1990 | Shyu et al. |
| 4,924,665 A | 5/1990 | Crosley et al. |
| 4,933,864 A | 6/1990 | Evans et al. |
| 4,962,453 A | 10/1990 | Pong et al. |
| 4,974,283 A | 12/1990 | Holsten et al. |
| 5,002,145 A | 3/1991 | Waqkaumi et al. |
| 5,017,415 A | 5/1991 | Cosman et al. |
| 5,086,535 A | 2/1992 | Grossmeyer et al. |
| 5,093,955 A | 3/1992 | Blehert et al. |
| 5,109,566 A | 5/1992 | Kobayashi et al. |
| 5,142,985 A | 9/1992 | Steams et al. |
| 5,163,202 A | 11/1992 | Kawakami et al. |
| 5,163,273 A | 11/1992 | Wojtkowski et al. |
| 5,165,064 A | 11/1992 | Mattaboni |
| 5,204,814 A | 4/1993 | Noonan et al. |
| 5,208,521 A | 5/1993 | Aoyama |
| 5,216,777 A | 6/1993 | Moro et al. |
| 5,239,720 A | 8/1993 | Wood et al. |
| 5,261,139 A | 11/1993 | Lewis |
| 5,274,987 A | 1/1994 | Wiener |
| 5,279,672 A | 1/1994 | Belker, Jr. et al. |
| 5,284,522 A | 2/1994 | Kobayashi et al. |
| 5,293,955 A | 3/1994 | Lee |
| 5,303,448 A | 4/1994 | Hennessey et al. |
| 5,319,828 A | 6/1994 | Waldhauser et al. |
| 5,321,614 A | 6/1994 | Ashworth |
| 5,324,948 A | 6/1994 | Dudar et al. |
| 5,341,540 A | 8/1994 | Soupert et al. |
| 5,353,224 A | 10/1994 | Lee et al. |
| 5,369,347 A | 11/1994 | Yoo |
| 5,410,479 A | 4/1995 | Coker |
| 5,438,721 A | 8/1995 | Pahno et al. |
| 5,440,216 A | 8/1995 | Kim |
| 5,444,965 A | 8/1995 | Co lens |
| 5,446,356 A | 8/1995 | Kim |
| 5,454,129 A | 10/1995 | Kell |
| 5,455,982 A | 10/1995 | Armstrong et al. |
| 5,465,525 A | 11/1995 | Mifune et al. |
| 5,467,273 A | 11/1995 | Faibish et al. |
| 5,497,529 A | 3/1996 | Boesi |
| 5,507,067 A | 4/1996 | Hoekstra et al. |
| 5,515,572 A | 5/1996 | Hoekstra et al. |
| 5,528,888 A | 6/1996 | Miyamoto et al. |
| 5,534,762 A | 7/1996 | Kim |
| 5,537,017 A | 7/1996 | Feiten et al. |
| 5,539,953 A | 7/1996 | Kurz |
| 5,542,146 A | 8/1996 | Hoekstra et al. |
| 5,548,511 A | 8/1996 | Bancroft |
| 5,553,349 A | 9/1996 | Kilstrom et al. |
| 5,555,587 A | 9/1996 | Guha |
| 5,560,077 A | 10/1996 | Crotchett |
| 5,561,972 A | 10/1996 | Rolfe |
| 5,568,589 A | 10/1996 | Hwang |
| 5,611,106 A | 3/1997 | Wulff |
| 5,611,108 A | 3/1997 | Knowlton et al. |
| 5,613,261 A | 3/1997 | Kawakami et al. |
| 5,621,291 A | 4/1997 | Lee |
| 5,622,236 A | 4/1997 | Azumi et al. |
| 5,634,237 A | 6/1997 | Paranjpe |
| 5,634,239 A | 6/1997 | Tuvin et al. |
| 5,650,702 A | 7/1997 | Azumi |
| 5,652,489 A | 7/1997 | Kawakami |
| 5,682,213 A | 10/1997 | Schmutz |
| 5,682,313 A | 10/1997 | Edlund et al. |
| 5,682,839 A | 11/1997 | Grimsley et al. |
| 5,709,007 A | 1/1998 | Chiang |
| 5,761,762 A | 6/1998 | Kubo et al. |
| 5,781,960 A | 7/1998 | Kilstrom et al. |
| 5,787,545 A | 8/1998 | Co lens |
| 5,794,297 A | 8/1998 | Muta |
| 5,812,267 A | 9/1998 | Everett, Jr. et al. |
| 5,819,008 A | 10/1998 | Asama et al. |
| 5,825,981 A | 10/1998 | Matsuda |
| 5,839,156 A | 11/1998 | Park et al. |
| 5,841,259 A | 11/1998 | Kim et al. |
| 5,867,800 A | 2/1999 | Leif |
| 5,916,111 A | 6/1999 | Colens |
| 5,926,909 A | 7/1999 | McGee |
| 5,935,179 A | 8/1999 | Kleiner et al. |
| 5,940,927 A | 8/1999 | Haegermarck et al. |
| 5,940,930 A | 8/1999 | Oh et al. |
| 5,942,869 A | 8/1999 | Katou et al. |
| 5,943,730 A | 8/1999 | Boomgaarden |
| 5,943,733 A | 8/1999 | Tagliaferri |
| 5,959,423 A | 9/1999 | Nakanishi et al. |
| 5,974,348 A | 10/1999 | Rocks |
| 6,009,358 A | 12/1999 | Angott et al. |
| 6,026,635 A | 2/2000 | Staiger |
| 6,041,471 A | 3/2000 | Charkey et al. |

(56) References Cited

U.S. PATENT DOCUMENTS

| | | | |
|---|---|---|---|
| 6,049,745 A | 4/2000 | Douglas et al. |
| 6,073,427 A | 6/2000 | Nichols |
| 6,076,025 A | 6/2000 | Ueno et al. |
| 6,076,227 A | 6/2000 | Schalig et al. |
| 6,108,067 A | 8/2000 | Hanseder |
| 6,108,076 A | 8/2000 | Hanseder |
| 6,112,143 A | 8/2000 | Allen et al. |
| 6,124,694 A | 9/2000 | Bancroft et al. |
| 6,133,730 A | 10/2000 | Winn |
| 6,140,146 A | 10/2000 | Brady et al. |
| 6,166,706 A | 12/2000 | Gallagher et al. |
| 6,226,830 B1 | 5/2001 | Hendriks et al. |
| 6,240,342 B1 | 5/2001 | Fiegert et al. |
| 6,255,793 B1 | 7/2001 | Peless et al. |
| 6,259,979 B1 | 7/2001 | Holmquist |
| 6,285,930 B1 | 9/2001 | Dickson et al. |
| 6,300,737 B1 | 10/2001 | Begvall et al. |
| D451,931 S | 12/2001 | Abramson et al. |
| 6,339,735 B1 | 1/2002 | Peless et al. |
| 6,374,155 B1 | 4/2002 | Wallach et al. |
| 6,385,515 B1 | 5/2002 | Dickson et al. |
| 6,408,226 B1 | 6/2002 | Byrne et al. |
| 6,417,641 B2 | 7/2002 | Peless et al. |
| 6,438,456 B1 | 8/2002 | F eddema et al. |
| 6,442,476 B1 | 8/2002 | Poropat |
| 6,443,509 B1 | 9/2002 | Levin et al. |
| 6,444,003 B1 | 9/2002 | Sutcliffe |
| 6,463,368 B1 | 10/2002 | Feiten et al. |
| 6,465,982 B1 | 10/2002 | Bergvall et al. |
| 6,493,613 B2 | 12/2002 | Peless et al. |
| 6,496,754 B2 | 12/2002 | Song et al. |
| 6,496,755 B2 | 12/2002 | Wallach et al. |
| 6,507,773 B2 | 1/2003 | Parker et al. |
| 6,525,509 B1 | 2/2003 | Petersson et al. |
| 6,532,404 B2 | 3/2003 | Co lens |
| 6,535,793 B2 | 3/2003 | Allard |
| 6,548,982 B1 | 4/2003 | Papanikolopoulos et al. |
| 6,571,415 B2 | 6/2003 | Gerber et al. |
| 6,574,536 B1 | 6/2003 | Kawagoe et al. |
| 6,580,246 B2 | 6/2003 | Jacobs |
| 6,580,978 B1 | 6/2003 | McTamaney |
| 6,584,376 B1 | 6/2003 | Kommer |
| 6,586,908 B2 | 7/2003 | Petersson et al. |
| 6,594,844 B2 | 7/2003 | Jones |
| 6,604,022 B2 | 8/2003 | Parker |
| 6,605,156 B1 | 8/2003 | Clark et al. |
| 6,611,120 B2 | 8/2003 | Song et al. |
| 6,611,734 B2 | 8/2003 | Parker et al. |
| 6,611,738 B2 | 8/2003 | Ruffner |
| 6,615,108 B1 | 9/2003 | Peless et al. |
| 6,658,693 B1 | 12/2003 | Reed, Jr. |
| 6,661,239 B1 | 12/2003 | Ozick |
| 6,671,592 B1 | 12/2003 | Bisset et al. |
| 6,690,134 B1 | 2/2004 | Jones et al. |
| 6,741,054 B2 | 5/2004 | Koselka et al. |
| 6,748,297 B2 | 6/2004 | Song et al. |
| 6,764,373 B1 | 7/2004 | Osawa et al. |
| 6,781,338 B2 | 8/2004 | Jones et al. |
| 6,809,490 B2 | 10/2004 | Jones et al. |
| 6,830,120 B1 | 12/2004 | Yashima et al. |
| 6,841,963 B2 | 1/2005 | Song et al. |
| 6,845,297 B2 | 1/2005 | Allard |
| 6,883,201 B2 | 4/2005 | Jones et al. |
| 6,885,912 B2 | 4/2005 | Peless et al. |
| D510,066 S | 9/2005 | Hickey et al. |
| 6,940,291 B1 | 9/2005 | Ozick |
| 6,956,348 B2 | 10/2005 | Landry et al. |
| 6,984,952 B2 | 1/2006 | Peless et al. |
| 6,999,850 B2 | 2/2006 | McDonald |
| 7,024,278 B2 | 4/2006 | Chiappetta et al. |
| 6,901,624 B2 | 1/2005 | Mori et al. |
| 6,938,298 B2 | 1/2005 | Aasen |
| 6,971,140 B2 | 1/2005 | Kim |
| 6,850,024 B2 | 2/2005 | Peless et al. |
| 6,870,792 B2 | 3/2005 | Chiappetta |
| 7,069,124 B1 | 6/2006 | Whittaker et al. |
| 7,085,624 B2 | 8/2006 | Aldred et al. |
| 7,117,660 B1 | 10/2006 | Colens |
| 7,155,309 B2 | 12/2006 | Peless et al. |
| 7,203,576 B1 | 4/2007 | Wilson et al. |
| 7,206,677 B2 | 4/2007 | Hulden |
| D559,867 S | 1/2008 | Abramson |
| 7,349,759 B2 | 3/2008 | Peless et al. |
| D573,610 S | 7/2008 | Abramson |
| 7,441,392 B2 | 10/2008 | Lilliestielke et al. |
| 7,481,036 B2 | 1/2009 | Lilliestielke et al. |
| 7,525,287 B2 | 4/2009 | Miyashita et al. |
| 7,543,432 B1 * | 6/2009 | Osborne ............... A01D 75/182 |
| | | 56/DIG. 17 |
| 7,729,801 B2 | 6/2010 | Abramson |
| 8,046,103 B2 | 10/2011 | Abramson et al. |
| 8,069,639 B2 | 12/2011 | Fancher, III |
| D652,431 S | 1/2012 | Naslund |
| D656,163 S | 3/2012 | Johansson et al. |
| 8,136,333 B1 | 3/2012 | Levin et al. |
| 8,234,848 B2 | 8/2012 | Messina et al. |
| 8,306,659 B2 | 11/2012 | Abramson et al. |
| 8,413,616 B2 | 4/2013 | Bergquist |
| 8,532,822 B2 | 9/2013 | Abramson et al. |
| 8,634,960 B2 | 1/2014 | Sandin et al. |
| 8,635,841 B2 | 1/2014 | Fiser et al. |
| 8,781,627 B2 | 7/2014 | Sandin et al. |
| 8,868,237 B2 | 10/2014 | Sandin et al. |
| 8,954,193 B2 | 2/2015 | Sandin et al. |
| 9,043,952 B2 | 6/2015 | Sandin et al. |
| 9,043,953 B2 | 6/2015 | Sandin et al. |
| 9,516,806 B2 | 12/2016 | Yamauchi et al. |
| 10,021,830 B2 | 7/2018 | Doughty |
| 10,426,083 B2 | 10/2019 | Doughty |
| 2001/0022506 A1 | 9/2001 | Peless et al. |
| 2001/0047231 A1 | 11/2001 | Peless et al. |
| 2002/0011813 A1 | 1/2002 | Koselka et al. |
| 2002/0016649 A1 | 2/2002 | Jones |
| 2002/0049517 A1 | 4/2002 | Ruffner |
| 2002/0056263 A1 | 5/2002 | Schaedler |
| 2002/0120364 A1 | 8/2002 | Co lens |
| 2002/0140393 A1 | 10/2002 | Peless et al. |
| 2002/0156556 A1 | 10/2002 | Ruffner |
| 2002/0160845 A1 | 10/2002 | Simonsen |
| 2002/0173877 A1 | 11/2002 | Zweig |
| 2003/0019071 A1 | 1/2003 | Field et al. |
| 2003/0023356 A1 | 1/2003 | Keable |
| 2003/0025472 A1 | 2/2003 | Jones et al. |
| 2003/0055337 A1 | 3/2003 | Lin |
| 2003/0060928 A1 | 3/2003 | Abramson et al. |
| 2003/0120389 A1 | 6/2003 | Abramson et al. |
| 2003/0137268 A1 | 7/2003 | Papanikolopoulos et al. |
| 2003/0182914 A1 | 10/2003 | Shibata et al. |
| 2003/0192144 A1 | 10/2003 | Song et al. |
| 2003/0208304 A1 | 11/2003 | Peless et al. |
| 2003/0216834 A1 | 11/2003 | Allard |
| 2003/0233177 A1 | 12/2003 | Johnson et al. |
| 2003/0234325 A1 | 12/2003 | Marino et al. |
| 2004/0020000 A1 | 2/2004 | Jones |
| 2004/0030448 A1 | 2/2004 | Solomon |
| 2004/0030449 A1 | 2/2004 | Solomon |
| 2004/0030450 A1 | 2/2004 | Solomon |
| 2004/0030571 A1 | 2/2004 | Solomon |
| 2004/0031113 A1 | 2/2004 | Wosewick et al. |
| 2004/0036618 A1 | 2/2004 | Ku et al. |
| 2004/0049877 A1 | 4/2004 | Jones et al. |
| 2004/0068351 A1 | 4/2004 | Solomon |
| 2004/0068415 A1 | 4/2004 | Solomon |
| 2004/0068416 A1 | 4/2004 | Solomon |
| 2004/0076324 A1 | 4/2004 | Burl et al. |
| 2004/0088079 A1 | 5/2004 | Lavarec et al. |
| 2004/0111184 A1 | 6/2004 | Chiappetta et al. |
| 2004/0111196 A1 | 6/2004 | Dean |
| 2004/0134336 A1 | 7/2004 | Solomon |
| 2004/0134337 A1 | 7/2004 | Solomon |
| 2004/0156541 A1 | 8/2004 | Jeon et al. |
| 2004/0158357 A1 | 8/2004 | Lee et al. |
| 2004/0187457 A1 | 9/2004 | Co lens |
| 2004/0200505 A1 | 10/2004 | Taylor et al. |

(56) References Cited

U.S. PATENT DOCUMENTS

| | | |
|---|---|---|
| 2004/0204792 A1 | 10/2004 | Taylor et al. |
| 2004/0211444 A1 | 10/2004 | Taylor et al. |
| 2004/0220000 A1 | 11/2004 | Falone |
| 2004/0236468 A1 | 11/2004 | Taylor et al. |
| 2004/0244138 A1 | 12/2004 | Taylor et al. |
| 2005/0000543 A1 | 1/2005 | Taylor et al. |
| 2005/0007057 A1 | 1/2005 | Peless et al. |
| 2005/0010331 A1 | 1/2005 | Taylor et al. |
| 2005/0020374 A1 | 1/2005 | Wang |
| 2005/0097952 A1 | 5/2005 | Steph |
| 2005/0108999 A1 | 5/2005 | Bucher |
| 2005/0113990 A1 | 5/2005 | Peless et al. |
| 2005/0120698 A1 | 6/2005 | Schlasse |
| 2005/0156562 A1 | 7/2005 | Cohen et al. |
| 2005/0204717 A1 | 9/2005 | Colens |
| 2005/0251292 A1 | 11/2005 | Casey et al. |
| 2005/0278094 A1 | 12/2005 | Swinbanks et al. |
| 2005/0287038 A1 | 12/2005 | Dubrovsky et al. |
| 2006/0021315 A1 | 2/2006 | Brandon |
| 2006/0293794 A1 | 12/2006 | Harwig et al. |
| 2007/0016328 A1 | 1/2007 | Ziegler et al. |
| 2007/0142964 A1 | 6/2007 | Abramson |
| 2007/0150109 A1 | 6/2007 | Peless et al. |
| 2008/0039974 A1 | 2/2008 | Sandin et al. |
| 2008/0097645 A1 | 4/2008 | Abramson et al. |
| 2008/0167753 A1 | 7/2008 | Peless et al. |
| 2008/0183349 A1 | 7/2008 | Abramson et al. |
| 2009/0254218 A1 | 10/2009 | Sandin et al. |
| 2010/0059000 A1 | 3/2010 | Bergquist |
| 2010/0102525 A1 | 4/2010 | Fancher |
| 2010/0043378 A1 | 12/2010 | Abernethy |
| 2011/0130875 A1 | 6/2011 | Abramson |
| 2011/0234153 A1 | 9/2011 | Abramson |
| 2011/0253399 A1 | 10/2011 | Wagner |
| 2012/0041594 A1 | 2/2012 | Abramson et al. |
| 2012/0226381 A1 | 9/2012 | Abramson et al. |
| 2012/0290165 A1 | 11/2012 | Duyang |
| 2013/0006419 A1 | 1/2013 | Bergstrom et al. |
| 2013/0030609 A1 | 1/2013 | Jagenstedt |
| 2013/0066484 A1 | 3/2013 | Markusson et al. |
| 2013/0076304 A1 | 3/2013 | Andersson et al. |
| 2013/0110322 A1 | 5/2013 | Jagenstedt et al. |
| 2013/0111863 A1 | 5/2013 | Johnson |
| 2013/0152538 A1 | 6/2013 | Fiser et al. |
| 2013/0184924 A1 | 7/2013 | Jagenstedt et al. |
| 2013/0205736 A1 | 8/2013 | Maruyama et al. |
| 2013/0249179 A1 | 9/2013 | Burns |
| 2013/0274920 A1 | 10/2013 | Abramson et al. |
| 2014/0102061 A1 | 4/2014 | Sandin et al. |
| 2014/0102062 A1 | 4/2014 | Sandin et al. |
| 2014/0117892 A1 | 5/2014 | Coates |
| 2015/0006015 A1 | 1/2015 | Sandin et al. |
| 2015/0096280 A1 | 4/2015 | Vondracek |
| 2015/0271991 A1 | 10/2015 | Balutis |
| 2016/0100522 A1 | 4/2016 | Yamauchi et al. |
| 2017/0215337 A1 | 8/2017 | Doughty |
| 2018/0352738 A1 | 12/2018 | Doughty |
| 2020/0154637 A1 | 5/2020 | Doughty |

FOREIGN PATENT DOCUMENTS

| | | |
|---|---|---|
| EP | 792726 | 9/1997 |
| EP | 774702 | 10/2001 |
| EP | 1331537 | 7/2003 |
| EP | 1358786 | 11/2003 |
| EP | 1570719 | 9/2005 |
| EP | 1704766 | 9/2006 |
| EP | 2625947 | 8/2013 |
| EP | 2818033 | 12/2014 |
| EP | 2946650 | 11/2015 |
| FR | 2828589 | 2/2003 |
| GB | 2001836 | 2/1979 |
| GB | 2142447 | 1/1985 |
| GB | 2283838 | 5/1995 |
| GB | 2344745 | 6/2000 |
| GB | 2382157 | 5/2003 |
| JP | 62-120510 | 6/1987 |
| JP | 62-154008 | 7/1987 |
| JP | 63-183032 | 7/1988 |
| JP | 63-241610 | 10/1988 |
| JP | 2-6312 | 1/1990 |
| JP | 3-051023 | 3/1991 |
| JP | 04-320612 | 11/1992 |
| JP | 06-327598 | 11/1994 |
| JP | 07-129239 | 5/1995 |
| JP | 07-295636 | 11/1995 |
| JP | 08-16776 | 1/1996 |
| JP | 08-089451 | 4/1996 |
| JP | 08-152916 | 6/1996 |
| JP | 09-179625 | 7/1997 |
| JP | 09-185410 | 7/1997 |
| JP | 11-508810 | 8/1999 |
| JP | 11-510935 | 9/1999 |
| JP | 2001-258807 | 9/2001 |
| JP | 2001-275908 | 10/2001 |
| JP | 2001-525567 | 12/2001 |
| JP | 2002-078650 | 3/2002 |
| JP | 2002-204768 | 7/2002 |
| JP | 3-356170 | 10/2002 |
| JP | 2002-532178 | 10/2002 |
| JP | 3-375843 | 11/2002 |
| JP | 2002-323925 | 11/2002 |
| JP | 2002-355206 | 12/2002 |
| JP | 2002-360471 | 12/2002 |
| JP | 2002-360482 | 12/2002 |
| JP | 2003-005296 | 1/2003 |
| JP | 2003-010076 | 1/2003 |
| JP | 2003-036116 | 2/2003 |
| JP | 2003-038401 | 2/2003 |
| JP | 2003-038402 | 2/2003 |
| JP | 2003-505127 | 2/2003 |
| JP | 2003-061882 | 3/2003 |
| JP | 2003-310489 | 11/2003 |
| KR | 2003/73983 | 1/2005 |
| KR | 2011/0085359 | 7/2011 |
| WO | 1995/26512 | 10/1995 |
| WO | 1997/40734 | 11/1997 |
| WO | 1997/41451 | 11/1997 |
| WO | 1998/53456 | 11/1998 |
| WO | 1999/16078 | 4/1999 |
| WO | 1999/28800 | 6/1999 |
| WO | 1999/38056 | 7/1999 |
| WO | 1999/38237 | 7/1999 |
| WO | 1999/59042 | 11/1999 |
| WO | 2000/04430 | 1/2000 |
| WO | 2000/36962 | 6/2000 |
| WO | 2000/38026 | 6/2000 |
| WO | 2000/38029 | 6/2000 |
| WO | 2000/78410 | 12/2000 |
| WO | 2001/06904 | 2/2001 |
| WO | 2001/06905 | 2/2002 |
| WO | 2002/39864 | 5/2002 |
| WO | 2002/39868 | 5/2002 |
| WO | 2002/058527 | 8/2002 |
| WO | 2002/062194 | 8/2002 |
| WO | 2002/067744 | 9/2002 |
| WO | 2002/067745 | 9/2002 |
| WO | 2002/074150 | 9/2002 |
| WO | 2002/075356 | 9/2002 |
| WO | 2002/075469 | 9/2002 |
| WO | 2002/075470 | 9/2002 |
| WO | 2002/101477 | 12/2002 |
| WO | 2003/026474 | 4/2003 |
| WO | 2003/040845 | 5/2003 |
| WO | 2003/040846 | 5/2003 |
| WO | 2003/065140 | 8/2003 |
| WO | 2004/004533 | 1/2004 |
| WO | 2004/006034 | 1/2004 |
| WO | 2004/058028 | 7/2004 |
| WO | 2005/055795 | 6/2005 |
| WO | 2005/077244 | 8/2005 |
| WO | 2006/068403 | 6/2006 |

(56) References Cited

FOREIGN PATENT DOCUMENTS

| WO | 2015/115955 | 8/2015 |
|---|---|---|
| WO | WO 2017/136443 | 8/2017 |
| WO | WO 2019/191622 | 10/2019 |

OTHER PUBLICATIONS

"DR DuraBlade® Kit for DR Trimmer Mower," DR Power, publically available before Feb. 2, 2016 [retrieved on Feb. 19, 2016], Retrieved from the Internet: URL<http://www.drpower.com/power-equipment/trimmer-mowers/accessories/dr-durablade-complete-kit.axd>, 4 pages.
"Electrolux—Designed for the well-lived home (Welcome to the Electrolux Trilobite)," Retrieved from the Internet: URL<http://www.electroluxusa.com/node57.as[?currentURL=nodel42.asp%3F>. Accessed Mar. 2005, 2 pages.
"eVac Robotic Vacuum," S1727 Instruction Manual, Sharper Image Corp, Copyright 2004, 13 pages.
"Facts on Trilobite," webpage, Retrieved from the Internet: URL<http://trilobiteelectroluxse/presskit_en/model11335asp?print=yes&pressID=>, accessed Dec. 2003, 2 pages.
"Put Your Roomba . . . On, Automatic" webpages: http://www.acomputeredge.com/roomba, accessed Apr. 2005, 3 pages.
"Weed Warrior® Heavy Duty Brush Cutter Head (16246)," Ace Hardware, publically available before Feb. 2, 2016 [retrieved on Feb. 19, 2016]. Retrieved from the Internet: URL<http://www.acehardware.com/product/index.jsp?productId=3325858>, 5 pages.
"Zoombot Remote Controlled Vaccunm-RV-500 NEW Roomba 2," eBay website: http://cgi.ebay.com/ws/eBayISAPI.dll?ViewItem&category=43526&item=4373497618&rd=1, accessed Apr. 2005, 7 pages.
Angle et al., U.S. Appl. No. 60/177,703, filed Jan. 24, 2000, available at http://portal.uspto.gov/extemal/portal/pair, accessed Jul. 11, 2012, 16 pages.
Bohn et al. "Super-distributed RFID Tag Infrastructures," Lecture Notes in Computer Science, Springer Verlag, Berlin, DE, vol. 3295, Nov. 11, 2004, pp. 1-12.
Campbell et al., U.S. Appl. No. 60/741,442, filed Dec. 2, 2005, available at http://patentscope.wipo.int/search/docservicepdf_pct/id00000005206306.pdf, accessed Jul. 11, 2012, 130 pages.
Caracciolo et al., "Trajectory Tracking Control of a Four-Wheel Differentially Driven Mobile Robot," IEEE Int. Conf, Robotics and Automation, Detroit. MI, 1999, pp. 2632-2638.
Casey et al., U.S. Appl. No. 60/582,992, filed Jun. 25, 2004, available athttp://portal.uspto.gov/external/portal/pair, accessed Jul. 11, 2012, 24 pages.
Domnitcheva, "Smart Vacuum Cleaner—An Autonomous Location-Aware Cleaning Device," Proceedings of the International Conference on Ubiquitous Computing, Sep. 10, 2004, pp. 1-2.
Doty and Harrison, "Sweep Strategies for a Sensory-Driven, Behavior-Based Vacuum Cleaning Agent," AAAI 1993 Fall Symposium Series, Instantiating Real-World Agents, Oct. 22-24, 1993, pp. 1-6.
Elite, "Weed Warrior Light Duty 3 Blade Trimmer Head (59600)," Amazon, publically available before Feb. 2, 2016 [retrieved on Feb. 19, 2016]. Retrieved from the Internet: URL<http://amazon.com/Warrior-Light-Blade-Trimmer-59600/dp/B002ATMWU0>, 7 pages.
Everyday Robots, "Everyday Robots: Reviews, Discussion and News for Consumers," Aug. 2004, Retrieved from the Internet: URL<www.everydayrobots.com/index.php?option-content&task=view&id-9>, retrieved Sep. 2012, 4 pages.
Evolution Robotics, "NorthStar—Low-cost Indoor Localization—How it Works," E Evolution Robotics, 2005, 2 pages.
Extended European Search Report in European Application No. 17748075, dated Aug. 30, 2019, 3 pages.
Final Office Action issued in U.S. Appl. No. 11/688,225, dated Nov. 10, 2011, 45 pages.
Gat, "Robust Low-Computation Sensor-driven Control for Task-Directed Navigation," Proc of IEEE International Conference on Robotics and Automation, Sacramento, CA, Apr. 1991, pp. 2484-2489.
Hicks and Hall, "A Survey of Robot Lawn Mowers", http://www.robotics.uc.edu/papers/paper2000/lawnmower.pdf, 2000, 8 pages.
Hitachi: News release: "The home cleaning robot of the autonomous movement type (experimental machine) is developed," May 29, 2003, Retrieved from the Internet: URL<www.i4u.com./japanreleases/hitachirobot.htm>, retrieved Mar. 2005, 5 pages.
International Preliminary Report on Patentability dated Sep. 23, 2008 from International Application No. PCT/US2007/064326, dated Sep. 23, 2008, 10 pages.
International Preliminary Report on Patentability in Appln. No. PCT/US2018/040049, dated Jan. 14, 2020, 5 pages.
International Preliminary Report on Patentability issued in International Application No. PCT/US2007/064323, dated Sep. 23, 2008, 10 pages.
International Search Report and Written Opinion in Appln. No. PCT/US2018/040049, dated Aug. 31, 2018, 6 pages.
International Search Report and Written Opinion in International Application No. PCT/US2015/050775, dated Dec. 23, 2015, 12 pages.
International Search Report and Written Opinion issued in PCT/US2007/064323, dated Jun. 16, 2008, 14 pages.
International Search Report and Written Opinion issued in PCT/US2007/064326, dated Jul. 17, 2008, 6 pages.
International Search Report in International Application No. PCT/US2017/16054, dated Apr. 13, 2017, 2 pages.
Invitation to Pay Additional Fees issued in International Application No. PCT/US2007/064326, dated Apr. 18, 2008, 9 pages.
Kahney, "Wired News: Robot Vacs are in the House," Jun. 2003, Retrieved from the Internet: URLwww.wired.com/news/technology/o,1282,59237,00.html, accessed Mar. 2005, 5 pages.
Karcher "Karcher RoboCleaner RC 3000," Retrieved from the Internet: URL<www.robocleaner.de/english/screen3.html>. 4 pages, Dec. 2003.
Karcher USA, "RC3000 Robotic Cleaner," 2005, Retrieved from the Internet: URL http://www.karcher-usa.com/showproducts.php?op=viewprod&paraml=143&param2=&param3=, accessed Mar. 2005, 3 pages.
Karcher, "Product Manual Download 'Karch'," available at www.karcher.com, 2004, 16 pages.
Karcher, RC 3000 Cleaning Robot-User Manual Manufacturer: Alfred-Karcher GmbH & Co, Cleaning Systems, Alfred Karcher-Str 28-40, PO Box 160, D-71349 Winnenden, Germany, Dec. 2002, 8 pages.
Kimura et al., "Stuck Evasion Control for Active Wheel Passive-Joint Snake-like Mobile Robot 'Genbu'," Proceedings of the 2004 IEEE International Conference on Robotics 8 Automation, New Orleans, LA, Apr. 2004, 6 pages.
KOOLVAC Robotic Vacuum Cleaner Owner's Manual, Koolatron, 2004, 13 pages.
Kozlowski and Pazderski, "Modeling and Control of a 4-wheel Skid-steering Mobile Robot," International J. of Applied Mathematics and Computer Science, 2004, 14(4):477-496.
Kubitz et al., "Application of radio frequency identification devices to support navigation of autonomous mobile robots" Vehicular Technology Conference, vol. 1, May 4, 1997, pp. 126-130.
Matthies et al., "Detecting Water Hazards for Autonomous Off-Road Navigation," Proceedings of SPIE Conference 5083: Unmanned Ground Vehicle Technology V, Orlando, FL, Apr. 2003, pp. 231-242.
Morland,"Autonomous Lawnmower Control," Downloaded from the internet at: http://cns.bu.edu/~cjmorlan/robotics/lawnmower/report.pdf, Jul. 2002, 10 pages.
Non-final Office Action issued in U.S. Appl. No. 11/688,213, dated Jan. 27, 2011, 27 pages.
Non-final Office Action issued in U.S. Appl. No. 11/688,225, dated Feb. 24, 2011, 30 pages.
Non-final Office Action issued in U.S. Appl. No. 12/488,094, dated Jan. 26, 2011, 25 pages.
Non-final Office Action issued in U.S. Appl. No. 12/488,094, dated Jul. 28, 2011, 13 pages.

(56) References Cited

OTHER PUBLICATIONS

On Robo, "Robot Reviews Samsung Robot Vacuum (VC-RP30W)," 2005, Retrieved from the Internet: URL www.onrobo.com/reviews/AT_Home/vacuum_cleaners/on00vcrb30rosam/index.htm, accessed Mar. 2005, 2 pages.

RoboMaid Sweeps Your Floors So You Won't Have To, the Official Site, Retrieved from the Internet: URLhttp://therobomaid.com/, accessed Mar. 2005, 2 pages.

Robotic Vacuum Cleaner-Blue, Retrieved from the Internet: URL http://www.sharperimage.com/us/en/catalog/productview.jhtml?sku=S1727BLU, accessed Mar. 2005, 2 pages.

Schofield, "Neither Master Nor Slave-A Practical Study in the Development and Employment of Cleaning Robots," Emerging Technologies and Factory Automation, 1999 Proceedings ETFA '99 1999 7th IEEE International Conference on Barcelona, Spain, Oct. 1999, pp. 1427-1434.

TheRobotStore.com, "Friendly Robotics Robotic Vacuum RV400—The Robot Store," www.therobotstore.com/s.nl/sc.9/category.-109/it.A/id.43/.f, accessed Apr. 2005, 1 page.

Thrun, "Learning Occupancy Grid Maps With Forward Sensor Models," Autonomous Robots 15, Sep. 1, 2003, 28 pages.

Wigley, "The Electric Lawn", in *The American Lawn*, Princeton Architectural Press New York with Canadian Centre for Architecture Montreal, 1999, pp. 155-195.

\* cited by examiner

BLADE ASSEMBLY FOR A GRASS CUTTING MOBILE ROBOT

CROSS-REFERENCE TO RELATED APPLICATIONS

This application is a 371 international claiming the benefit of WIPO Application No. PCT/US2018/040049, titled "BLADE ASSEMBLY FOR A GRASS CUTTING MOBILE ROBOT," filed on Jun. 28, 2018, which application claims the benefit under 35 U.S.C. § 119(e) of U.S. Patent Application No. 62/532,939, titled "BLADE ASSEMBLY FOR A GRASS CUTTING MOBILE ROBOT," filed Jul. 14, 2017. The disclosure of the foregoing applications are incorporated herein by reference in their entirety for all purposes.

TECHNICAL FIELD

This disclosure relates generally to a blade assembly for a grass cutting mobile robot.

BACKGROUND

A mobile lawn mowing robot can navigate about an environment to mow a confined area. The mobile lawn mowing robot includes blades that are rotatable. The mobile lawn mowing robot can rotate the blades as the mobile lawn mowing robot travels along a ground surface through the environment. As the blades rotate and contact mowable vegetation, such as grass, on the ground surface, the blades cut the vegetation.

SUMMARY

In one aspect, the present document features a grass cutting mobile robot including a body and a blade assembly connected to the body and rotatable about a drive axis. The blade assembly includes two or more spring mounted blades, two or more springs, and a housing to hold the blades. Each blade is rotatably mounted on a mounting axis and includes a cutting portion extending inwardly toward the drive axis from a blade tip. Each spring is configured to constrain movement of an associated one of the two or more blades.

The housing includes two or more finger wells and two or more slots in which to mount the two or more blades. The slots extending between successive finger wells. The housing further includes two or more push tabs. Each of the two or more push tabs is housed within and accessible one of the two or more finger wells. Each push tab is connected to a coupling latch mounted on the mounting axis of one of the two or more spring mounted blades. The coupling latch is configured to engage with a shaft rotatable about the drive axis, wherein pressing the push tab inward toward the drive axis rotates the coupling latch away from the drive axis and releasing the coupling latch rotates the towards the drive axis. In some examples, the finger wells are equidistantly spaced along the periphery of housing and in some examples, the finger wells are not equidistantly spaced. In some examples, the finger wells are recessed within the housing and the push tabs are positioned fully within a periphery of the housing.

In some examples, the coupling latch is connected to a lower end of one of the two or more springs and the coupling latch is configured to rotate around the mounting axis.

In some examples, the coupling latch comprises an engagement end configured to engage with the drive shaft, and the engagement end has a radius of curvature complimentary of a radius of curvature of the drive shaft.

In some examples, the slots are angled so that, in response to an impact, a portion of each blade is configured to move within a corresponding slot towards the drive axis by rotating about the mounting axis of the blade to cause the cutting portion of the blade to move upward relative to a ground surface toward the body and to reduce a tip radius defined by the blade tip and the drive axis as the blade tip rotates about the drive axis.

In some examples, each slot can extend, from proximate the mounting axis, away from the mounting axis and upward at an incline relative to a horizontal ground surface. An angle of the incline relative to the horizontal ground surface can be between 5 and 10 degrees.

In some examples, the mounting axis and the drive axis are non-parallel.

In some examples, the housing is configured to receive the shaft that connects the housing to the body and the shaft defines a groove or undercut therein. The coupling latch further includes an engagement end configured to engage with the drive shaft, and the engagement end is positionable within the undercut to lock the housing to the shaft.

In some examples, the two or more blades are connected to an upper end one of the two or more springs.

In some examples, the push tab and coupling latch are formed in a monolithic element.

In another aspect, a grass cutting mobile robot includes a housing to hold blades, a coupling latch configured to lock the housing to a drive shaft of the mobile robot, and a spring that connects the blade to the coupling latch. The housing includes a slot in which to mount one of the blades so that a portion of the blade is movable through the slot towards another of the blades in response to an impact. The housing is configured for coupling to an actuator of the grass cutting mobile robot so that the housing is rotatable about a drive axis, and the housing is configured to receive a shaft that connects the housing to the actuator. The shaft includes a groove or an undercut therein.

A coupling latch mounted on the mounting axis of one to the two or more spring mounted blades is configured to engage with the shaft. The coupling latch is rotatable within the housing to move an engagement end towards, or away from the groove or undercut. The engagement end is positionable within the groove to lock the housing to the actuator.

The spring connects at an upper end to a blade and at a lower end to the coupling latch.

In some examples, the housing includes a slot in which to mount a blade so that a portion of the blade is movable through the slot towards another blade in response to an impact. The slot slopes upwards in the housing towards the body, thereby enabling the blade to move upwards relative to a ground surface toward the body in response to the impact.

In some examples, the spring is a torsion spring having a twist axis, and the blade is configured to rotate relative to the housing about a mounting axis coincident with the twist axis and non-parallel to the drive axis.

In some examples, the spring can bias the blade away from the other blade.

In some examples, the blade assembly is configured to rotate relative to the body in a first direction, and the blade can be configured to rotate relative to the body in a second direction opposite the first direction in response to the impact. The grass cutting mobile robot can further include an actuator mounted in the body to rotate the blade assembly and one or more processors to execute instructions to perform operations. The operations can include detecting an increase in an electrical current delivered to the actuator and reducing the electrical current delivered to the actuator in response to detecting the increase. The increase can be responsive to the impact.

In some examples, the housing can include a splined cavity. The splined cavity can configured to mate with a corresponding splined portion of the shaft of the actuator.

In some examples, the housing further comprises a finger well adjacent each of the blades and a push tab extending from the coupling latch and accessible within each finger well. The spring biases the coupling latch to rotate toward the shaft, and pressing the push tab inward toward the drive axis rotates the coupling latch away from the shaft.

Advantages of the devices, blade assemblies, and robotic systems described herein may include, but are not limited to, the following. The blade assembly can reduce the risk of damaging the blades of the blade assembly and the actuator of the grass cutting mobile robot. For example, because the blades can move relative to the housing of the blade assembly, the blades can contact an object on the ground surface and move relative to the housing to maneuver about the object and thereby move away from the object. The blades can move both laterally and vertically to discontinue the contact with the object and hence be able to move about objects of varying geometries.

The movement of the blades through the slots defined by the housing can decrease an impulse force on the blade assembly when the blades contact the object. For example, the movement of the blades through the slots can increase a duration of time over which the force from the contact with the object occurs, providing a greater amount of time for a controller of the grass cutting mobile robot to respond to the impact. Similarly, the springs coupled to the blades can produce a biasing force against the force of the impact with objects so that the movement of the blades through the slot occurs over a greater duration of time, further increasing the amount of time for the controller to respond. Decreased impulse also can reduce the risk of fatigue and other mechanical failure of the blades.

The retention mechanism of the blade assembly provides a release mechanism that can enable easy attachment and detachment of the blade assembly to the actuator of the grass cutting mobile robot. The retention mechanism can be confined within the housing such that the retention mechanism is easily accessible by a user yet also confined such that the risk of inadvertent disconnection of the blade assembly from the actuator can be decreased.

Any two or more of the features described in this specification, including in this summary section, can be combined to form implementations not specifically described herein.

The blade assemblies, robotic systems, devices, and techniques described herein, or portions thereof, can be controlled by a computer program product that includes instructions that are stored on one or more non-transitory machine-readable storage media, and that are executable on one or more processing devices to control (e.g., to coordinate) the operations described herein. The robots described herein, or portions thereof, can be implemented as all or part of an apparatus or electronic system that can include one or more processing devices and memory to store executable instructions to implement various operations.

The details of one or more implementations are set forth in the accompanying drawings and the description herein.

Other features and advantages will be apparent from the description and drawings, and from the claims.

DESCRIPTION OF DRAWINGS

Like reference numerals in different figures indicate like elements.

DETAILED DESCRIPTION

Described herein are example mobile robots configured to traverse mowable areas to cut grass and other vegetation (hereafter referred to, collectively, as grass) using a blade assembly. The blade assembly is mountable on the mobile robot and, in an example implementation, includes two or more spring mounted blades. A quick-release retention mechanism is configured to enable a user to apply a force on the retention mechanism to mount and dismount the blade assembly to the mobile robot.

When the blade assembly is mounted on the mobile robot, the mobile robot rotates the blade assembly to cut the grass. In some implementations, the blades are mounted in the blade assembly such that the blades collapse in response to impact with non-mowable objects in the mowable area. The collapse of the blades enables the blades to move around objects as the mobile robot continues to traverse the area and the blade assembly continues to rotate.

Figure 1:
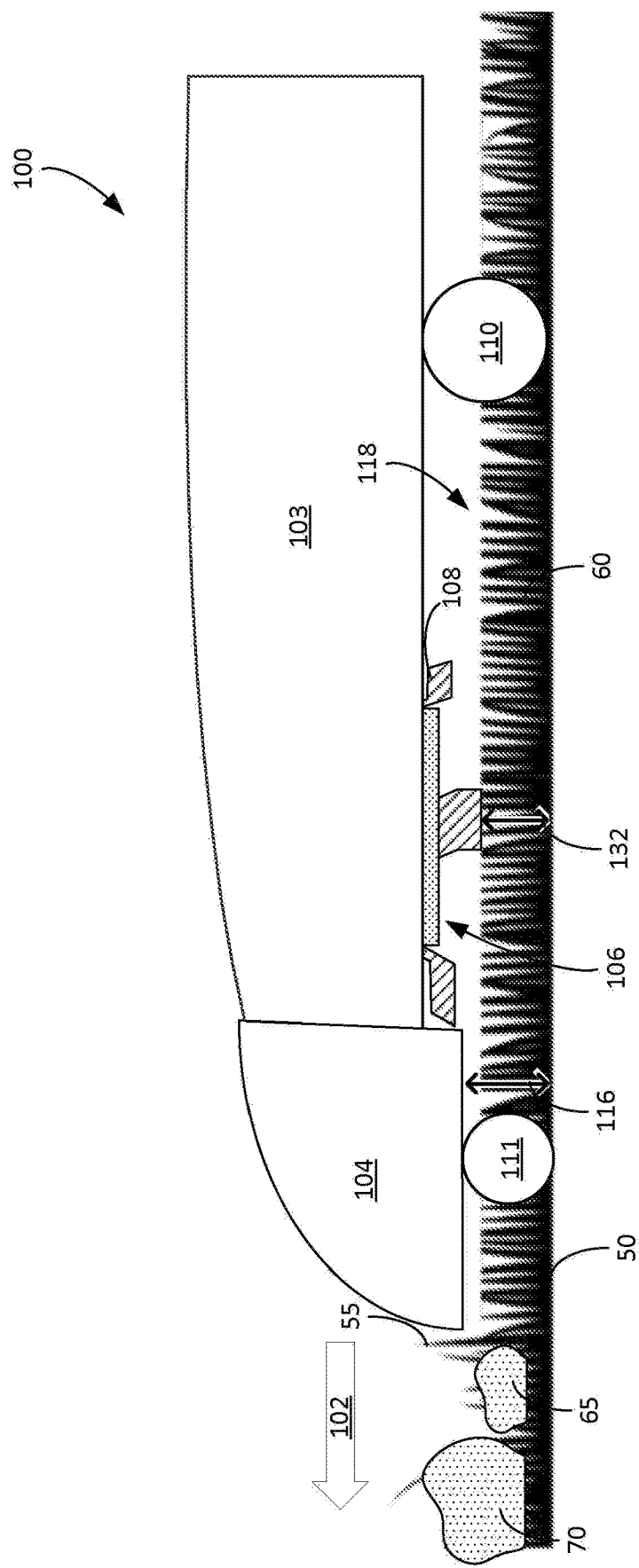
FIG. 1 is a side view of an example of a grass cutting mobile robot with a blade assembly moving across a ground surface.
Figure 2:
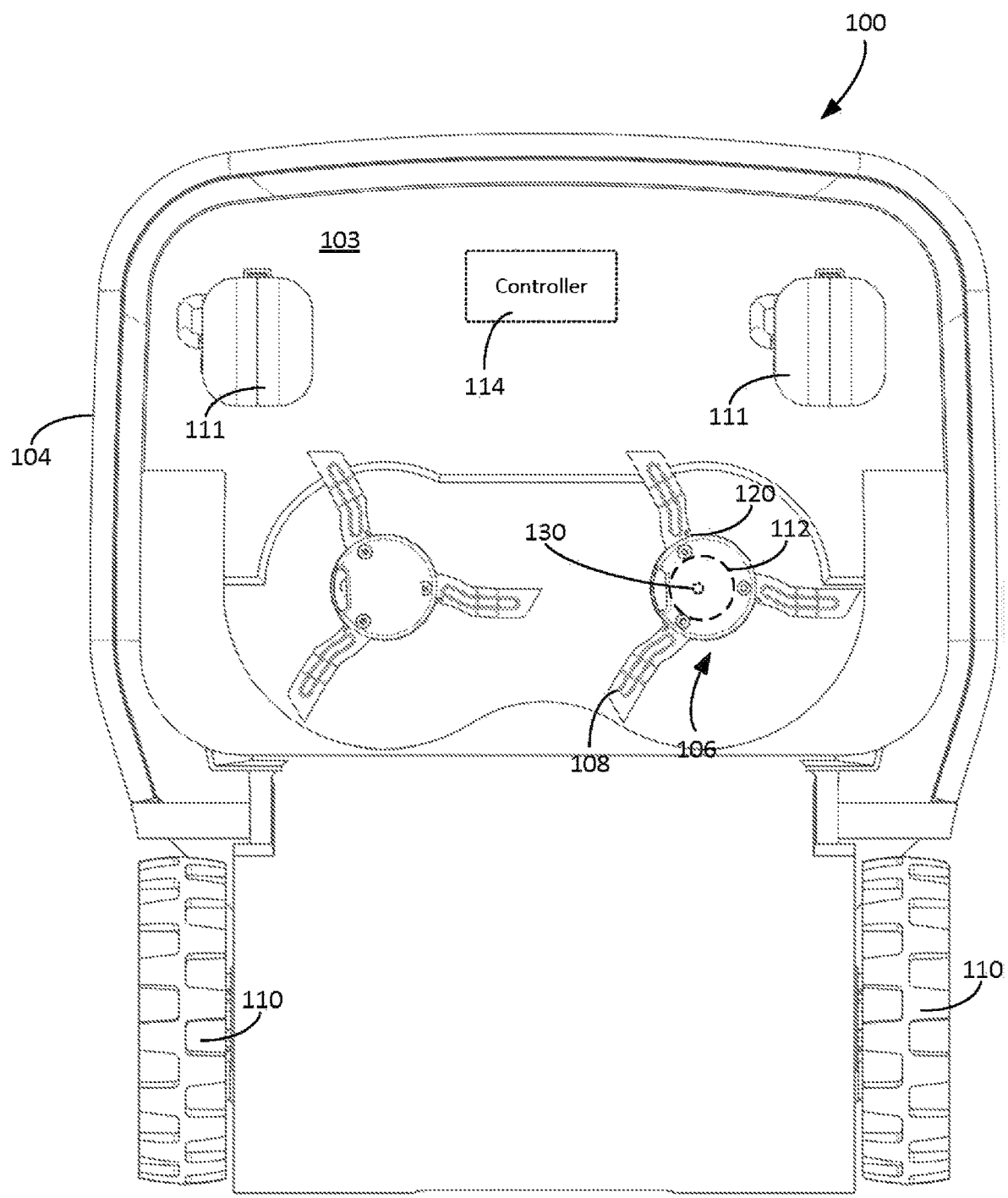
FIG. 2 is a bottom view of the grass cutting mobile robot of FIG. 1.

FIG. 1 depicts a side view of a grass cutting mobile robot 100 (herein also referred to as robot) travelling across a ground surface 50 in a forward direction 102. The ground surface 50 includes unmowed grass 55 and mowed grass 60 that is cut by a blade assembly 106. The blade assembly 106, as shown in FIG. 2, includes a housing 120 in which blades 108 are mounted. The grass cutting mobile robot 100 also includes an actuator 112 to which the blade assembly 106 is mounted. The actuator 112, when the blade assembly 106 is mounted to the actuator, is configured to rotate the blade assembly 106. A small non-mowable object 65 (e.g., a small rock) and a large non-mowable object 70 (e.g., a large rock) are in the forward direction 102 of the grass cutting mobile robot 100. In some implementations, the robot 100 includes two or more blade assemblies 106.

Contact between the blade assembly 106 and such objects is undesirable, in some examples, because the contact may damage the blades 108, the blade assembly 106, or an actuator 112 used to drive the rotation of the blades 108. Furthermore, contact between a housing 120 of the blade assembly 106 may produce a lateral force on the actuator 112, which may damage a shaft of actuator 112.

The robot 100 includes multiple mechanisms to avoid damage to the robot 100 that may be caused by contact with the non-mowable objects 65, 70. As shown in FIG. 2, depicting a bottom view of the robot 100, the robot 100 includes a bumper 104 mounted on a forward portion of the body 103 of the robot 100. The bumper 104 and the blades 108 are configured to contact objects on the ground surface 50 as the robot 100 moves about the ground surface 50. Contact between the bumper 104 and objects tall enough to depress the bumper 104 is used to redirect the robot 100 away from larger non-mowable objects (e.g., non-mowable objects having a minimum height of the height of the bottom of the bumper 104). The bumper 104 protects the blade assembly 106 from contacting these larger objects.

Figure 10:
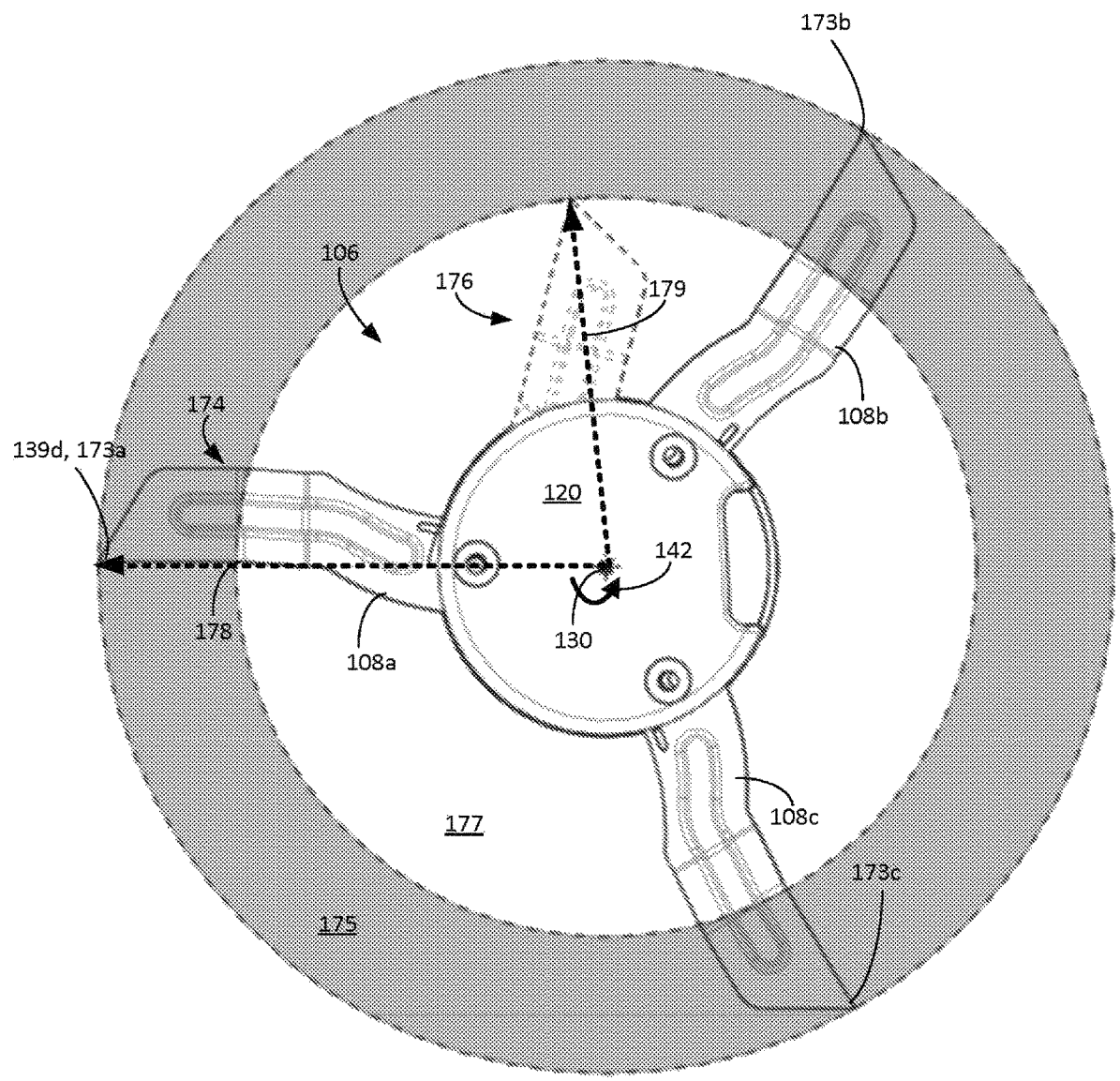
FIG. 10 is a schematic top view of the blade assembly showing a blade of the blade assembly in the extended position and the retracted position.

The blade assembly 106 is mounted on a bottom portion of the body 103 and includes a blade retraction mechanism that enables the blades 108 to retract and rise in response to contact with the non-mowable objects. Objects that the bumper 104 does not contact can, in some cases, come into contact with the blades 108. In some implementations, as described herein, blades 108 are mounted in the blade assembly 106 such that, as the blades 108 contact the object, the blades 108 rotate relative to the housing 120 of the blade assembly. Referring briefly to FIG. 10, the blades 108a, 108b, 108c (collectively referred to as blades 108) are mounted so that each blade 108a, 108b, 108c, upon contact with an object, independently rotates relative to the housing 120 of the blade assembly 106 from an extended position to a retracted position. FIG. 10 depicts the blade 108a in an extended position 174 shown in solid lines. The blade 108a is rotatable relative to the housing 120 to a retracted position 176 shown in dotted lines. Each of the blades 108a, 108b, 108c has a corresponding extended position and retracted position and is able to rotate between these positions independent of the other blades.

This rotation reduces the force of impact resulting from contact between the blades 108 and the object, thereby potentially reducing damage to the blades 108, the blade assembly 106, and the actuator 112. As described in greater detail herein, the movement of the blade 108a to the retracted position 176 further enables the blade 108a to move to a position such that the blade 108a avoids further contact with the object. The blade 108a, for example, rises vertically relative to the ground surface 50 to allow the object to pass beneath the blade 108a. The blade 108a additionally or alternatively collapses inwardly to allow the object to pass outside of the outermost point (e.g., a blade tip 139d shown in FIG. 10) of the blade 108a.

The blade 108a is also spring-mounted such that the movement of the blade 108a against the force of a spring delays the transfer of a large impulse force directly to the housing 120, thereby decreasing the impulse force on the actuator 112. The spring furthermore absorbs energy imparted onto the blade 108a when the blade 108a when the blade 108a strikes an object, and biases the blade 108a back to a cutting position so that the blade 108a returns to the cutting position after the blade 108a has cleared the struck object.

As shown in FIGS. 1 and 2, drive wheels 110, in conjunction with caster wheels 111 on a forward portion of the robot 100, support the body 103 above the ground surface 50. The robot 100 further includes the actuator 112 on which the blade assembly 106 is mounted. Shown in the exploded view of the actuator 112 and the blade assembly 106 depicted in FIG. 3, the actuator 112 includes a shaft 113 on which the blade assembly 106 is mounted.

The robot 100 includes a controller 114 to control operations of systems of the robot 100. The controller 114, for example, controls one or more motors that rotate drive wheels 110 of the robot 100 to move the robot 100 across the ground surface 50. The controller 114 also controls an amount of power delivered to the actuator 112 to rotate the actuator 112 and, when the blade assembly 106 is mounted to the actuator 112, the blade assembly 106.

As the robot 100 moves around the ground surface 50 in the forward movement direction 102 as shown in FIG. 1, the bumper 104 of the robot 100 is positioned on the body 103 of the robot 100 to contact objects along the ground surface 50. When the bumper 104 contacts the object, in response to the force of the impact with the object, the bumper 104 moves in a rearward direction relative to the body 103 of the robot 100. In some implementations, the bumper 104 also moves in an upward direction relative to the body 103 of the robot 100. The controller 114 alternatively or additionally controls an amount of power delivered to the motors rotating the drive wheels 110 and/or the actuator 112 in response to impact between the bumper 104 and the objects in the environment. In some implementations, the bumper 104 includes a contact sensor, force sensor, or other appropriate sensor that generates signals in response to impact or contact with objects on the ground surface 50. The controller 114 controls the navigation of the robot 100 depending on the signals generated by the sensor. For example, in response to detecting the contact with an object, the controller 114 decreases power delivered to the drive wheels 110 to reduce their speeds or differentially drive the drive wheels 110 to turn the robot 100 away from the object.

In some examples, the bumper 104 contacts objects that have a height greater than a bumper height 116 as measured from the ground surface 50 to a bottom surface of the bumper 104. As the robot 100 moves in the forward direction 102, the bumper 104 contacts the large object 70 but does not contact the small object 65 because the large object 70 has a greater height than the bumper height 116 and the small object 65 has a smaller height than the bumper height 116. The bumper height 116 is, for example, between 3 and 7 centimeters (e.g., 4 to 6 centimeters, approximately 5 centimeters). A height of the large object 70 can be greater than the bumper height 116 (e.g., greater than 3 to 7 centimeters), and a height of the small object 65 can be less than the bumper height 116 (e.g., less than 3 to 7 centimeters).

An object, if sufficiently small, may enter into the underside area 118 beneath the body 103. In some examples, when the bumper 104 does not contact the small object 65, as the robot 100 moves in the forward direction 102, the small object 65 moves into an underside area 118 beneath the body 103. In some cases, the robot 100 contacts an object having a greater height than the bumper height 116, and the object contacts the bumper 104 and cause the bumper 104 to move in the upward direction relative to the body 103 such that the object moves beyond the bumper 104 into the underside area 118 beneath the body 103.

The blade assembly 106 is mounted on the robot 100 such that the blades 108 are positioned at a blade height 132 above the ground surface 50. The blade height 132 determines the height of the mowed grass 60. In this regard, the blade height 132 is selected such that the height of grass after the robot 100 mows the grass (e.g., the unmowed grass 55) is at a desired height. In some examples, the blade height 132 is less than the bumper height 116, while in other examples, the blade height 132 is greater than the bumper height 116.

Figure 4:
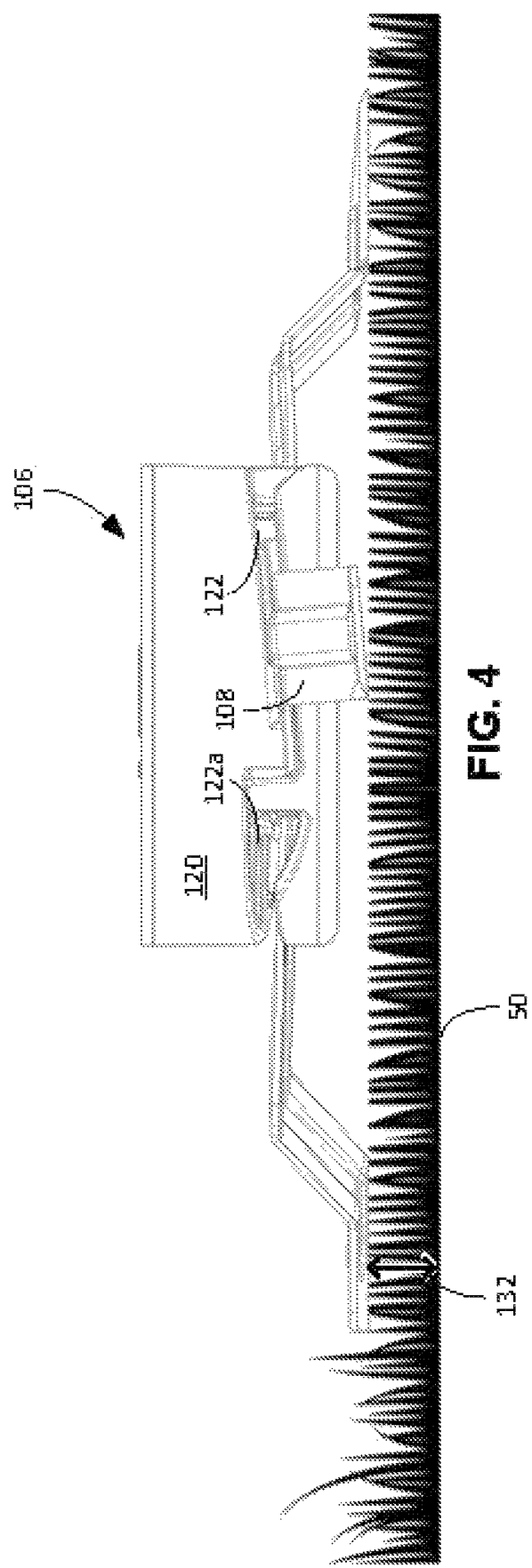
FIG. 4 is a side view of the blade assembly isolated from the grass cutting mobile robot of FIG. 1.
Figure 5:
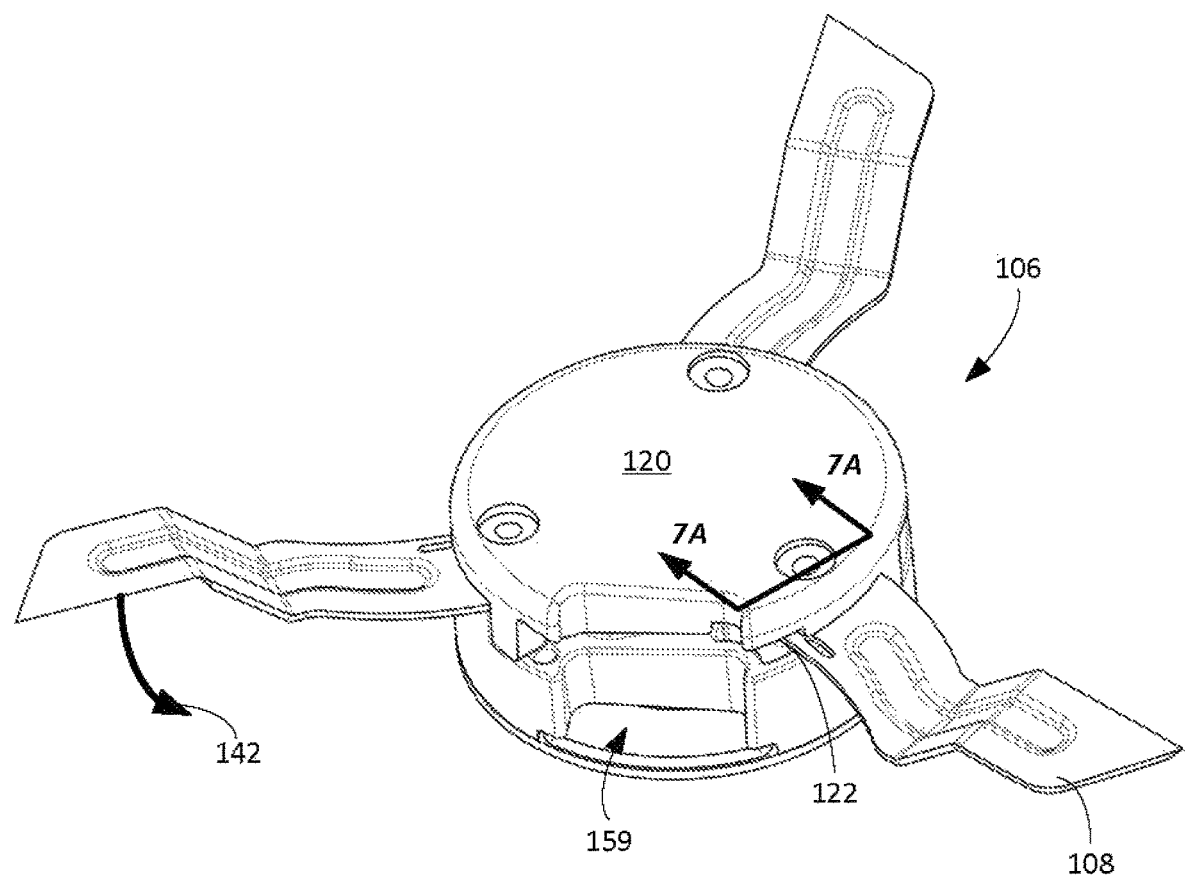
FIG. 5 is a bottom perspective view of the blade assembly of FIG. 4.
Figure 6:
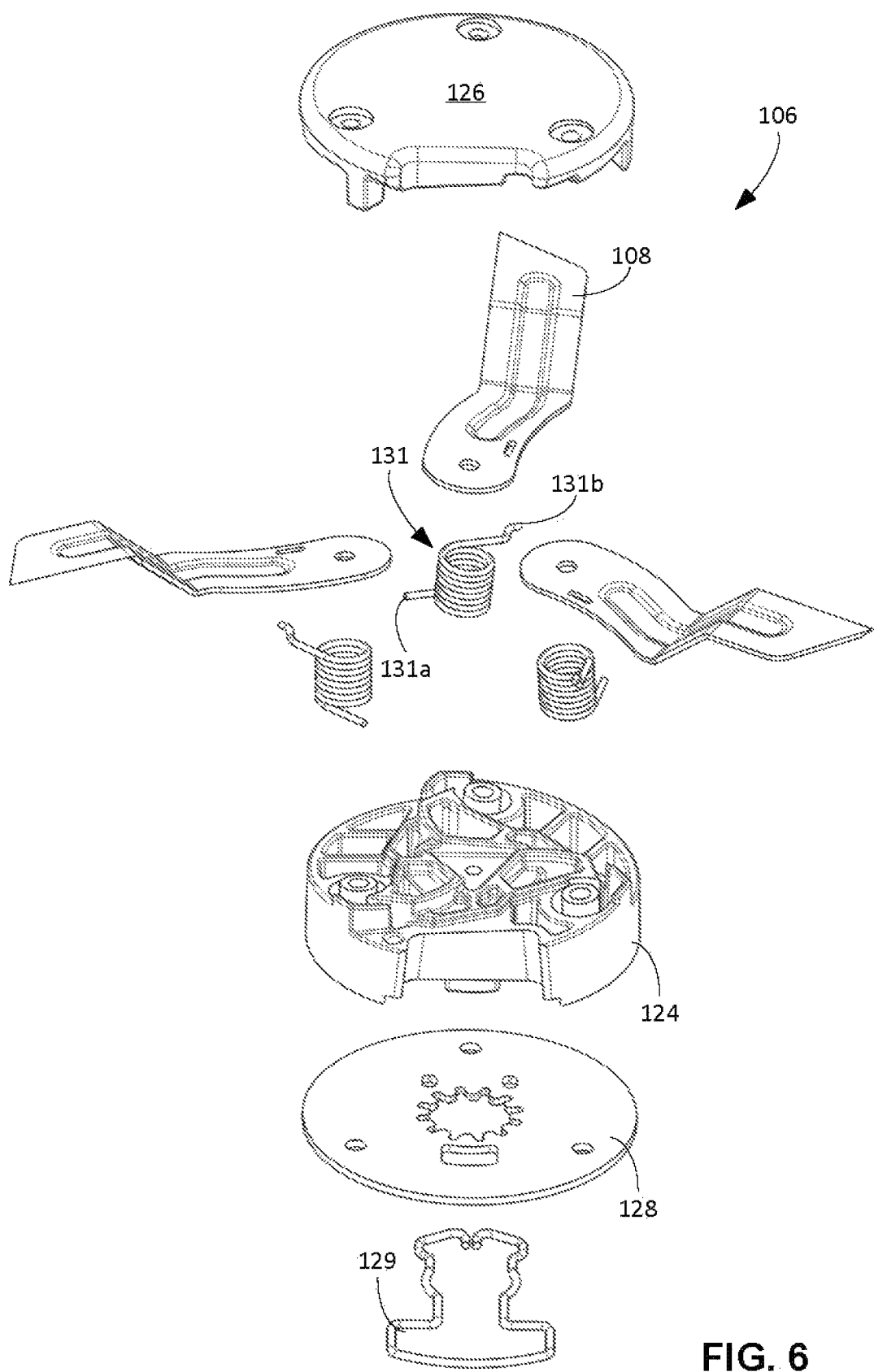
FIG. 6 is an exploded bottom perspective view of the blade assembly of FIG. 4.

FIG. 4 shows the blade assembly 106 isolated from the robot 100 of FIG. 1, and FIG. 5 shows a bottom perspective view of the blade assembly 106. The blade assembly 106 includes the housing 120 to hold the blades 108. While three blades 108 are shown, in some examples, one, two, four, or more blades are mounted in the blade assembly 106. The housing 120 is, for example, a cylindrical housing. The housing 120 includes slots 122 formed between an upper housing 124 and a lower housing 126 that are connected to form the housing 120 (see FIG. 6) and to define the slots 122 in which the blades 108 are mounted.

Figure 7A:
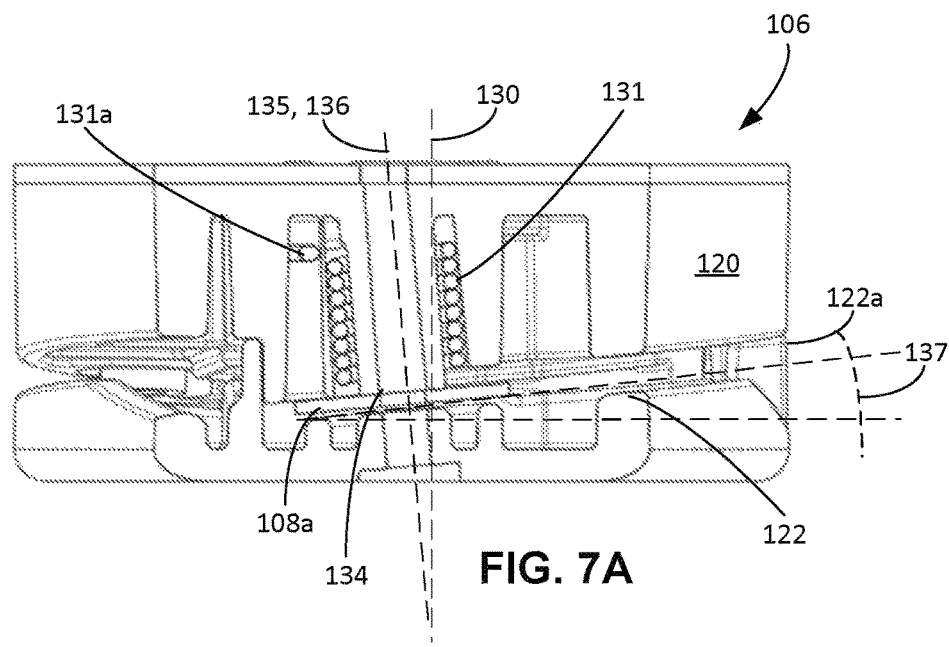
FIG. 7A is a cross-sectional view of the blade assembly taken along the section line 7A-7A in FIG. 5 with a blade of the blade assembly in an extended position.
Figure 7B:
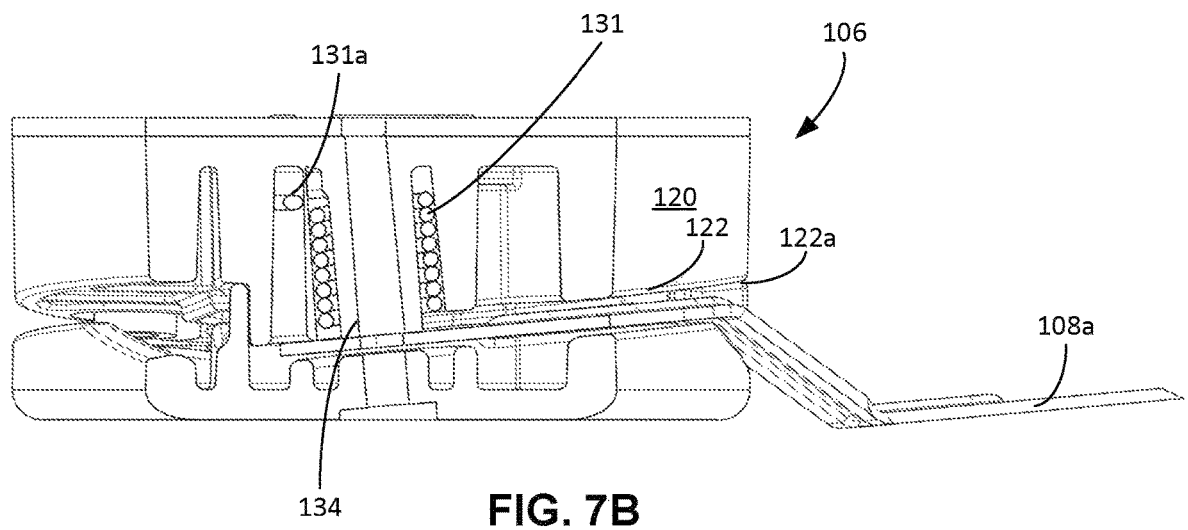
FIG. 7B is the cross-sectional view of the blade assembly shown in FIG. 7A with a blade of the blade assembly in a retracted position.

The blades 108 also move through the slots 122 in response to impact with objects on the ground surface 50. In some examples, as shown in FIG. 4, the slots 122 include widened portions 122a to accommodate the blades 108 in their fully retracted positions. The slots 122 are also inclined along the cylindrical housing so that the slots 122 rise as they extend through the housing, thereby enabling the blades 108 to rise as they move through the housing. As shown in FIGS. 7A and 7B, each blade 108 is mounted on a pivot shaft 134 in the housing 120 such that each blade 108 is rotatable relative to the housing 120 about a mounting axis 135 defined by the pivot shaft 134. For example, as the blade 108a rotates about the mounting axis 135 relative to the housing 120, e.g., in response to an impact force on the blade, the blade 108a moves through the corresponding slot 122.

The housing 120 further includes a confinement plate 128 that cooperates with the upper housing 124 to align the actuator 112 of the robot 100 to the blade assembly 106. The confinement plate 128 and the upper housing 124 rotationally couple the actuator 112 to the blade assembly 106. The upper housing 124 interacts with a retention clip 129, described in greater detail herein, to lock the actuator 112 to the housing 120. When the actuator 112 is locked to the housing 120, relative translation between the actuator 112 and the housing 120 is inhibited, thereby enabling the blade assembly 106 and the shaft 113 of the actuator 112 to jointly rotate about a drive axis 130 relative to the body 103.

The mounting axis 135 of the blades 108 and the drive axis 130 are substantially non-parallel. The drive axis 130 is, for example, perpendicular to a horizontal ground surface 50, while the mounting axis 135 is angled relative to the drive axis 130. The angle between the mounting axis 135 and the drive axis 130 is, for example, is between, for example, 5 and 10 degrees (e.g., between 6 and 9 degrees, 7 and 8 degrees, approximately 7.5 degrees); however, as described herein, angles other than these can be used.

Absent impact or contact between objects on the ground surface 50 and the blades 108, the actuator 112 causes blade tips 173a, 173b, 173c (the blade tip 139d of the blade 108a corresponding to the blade tip 173a, and the blade tips 173a, 173b, 173c being collectively referred to as blade tips 173) to rotate within a plane parallel to and above the ground surface 50. Upon impact or contact between the blades 108 and the objects, the blades 108 rotate relative to the housing 120 to cause the blade tips 173 to rotate within a plane angled to the ground surface 50. The blade tips 173 therefore change in height relative to the ground surface 50 as they rotate relative to the housing 120 of the blade assembly 106. The angle between the plane of rotation of the blade tips 173 relative to the housing 120 and the plane of rotation of the blade tips 173 due to the rotation of the actuator 112 is between, for example, 5 and 10 degrees (e.g., between 6 and 9 degrees, 7 and 8 degrees, approximately 7.5 degrees); however, as described herein, angles other than these can be used. The blades 108 rotate such that they move inwardly toward the housing 120 and rise away from the ground surface 50. The blade tips 173, as the blade tips 173 rise away from the ground surface 50, are configured to increase up to a height between, for example, 5 and 15 millimeters (e.g., between 5 and 10 millimeters, 10 and 15 millimeters, 6 and 14 millimeters, 7 and 13 millimeters, approximately 8 millimeters).

As shown in FIGS. 7A and 7B, example blade 108a is mounted on the housing 120 at a tilt angle 137 relative to the ground surface 50. The tilt angle 137 of the blade 108a enables the blade 108a to move in an upward trajectory as the blade 108a rotates relative to the housing 120 within the slot 122. In this example, the tilt angle corresponds to the angle formed between the mounting axis 135 and the drive axis 130. The tilt angle 137 is between, for example, 5 and 10 degrees (e.g., between 6 and 9 degrees, 7 and 8 degrees, approximately 7.5 degrees); however, angles other than these may be used as the tilt angle. For example, a greater tilt angle increases the height that the blade 108a rises as the blade 108a move within the corresponding slots 12. In other examples, a lower tilt angle in combination with a longer slot increases the distance travelled by the blades through the slot 122 without decreasing the maximum height increase of the blade 108a as the blade 108a moves to the retracted position.

Because the housing 120 is cylindrical, the slot 122 is inclined to enable the blade 108a at the tilt angle 137 to rotate in the upward trajectory relative to the housing 120 through the housing 120. Each of the slots 122, for example, is angled to accommodate the tilt angle 137 of the blade 108a. Each slot 122 extends from proximate the mounting axis 135 away from the mounting axis 135 upward in the housing 120. Each slot 122 inclines upward toward the body 103 away from the ground surface 50 to form an angle with the horizontal ground surface 50. The angle between the slot and the ground surface 50 corresponds to the tilt angle 137 of the blade 108a. The blade 108a accordingly are rotatable through the slot 122 without contacting a wall surface of the housing 120 defining the slot 122.

Figure 8:
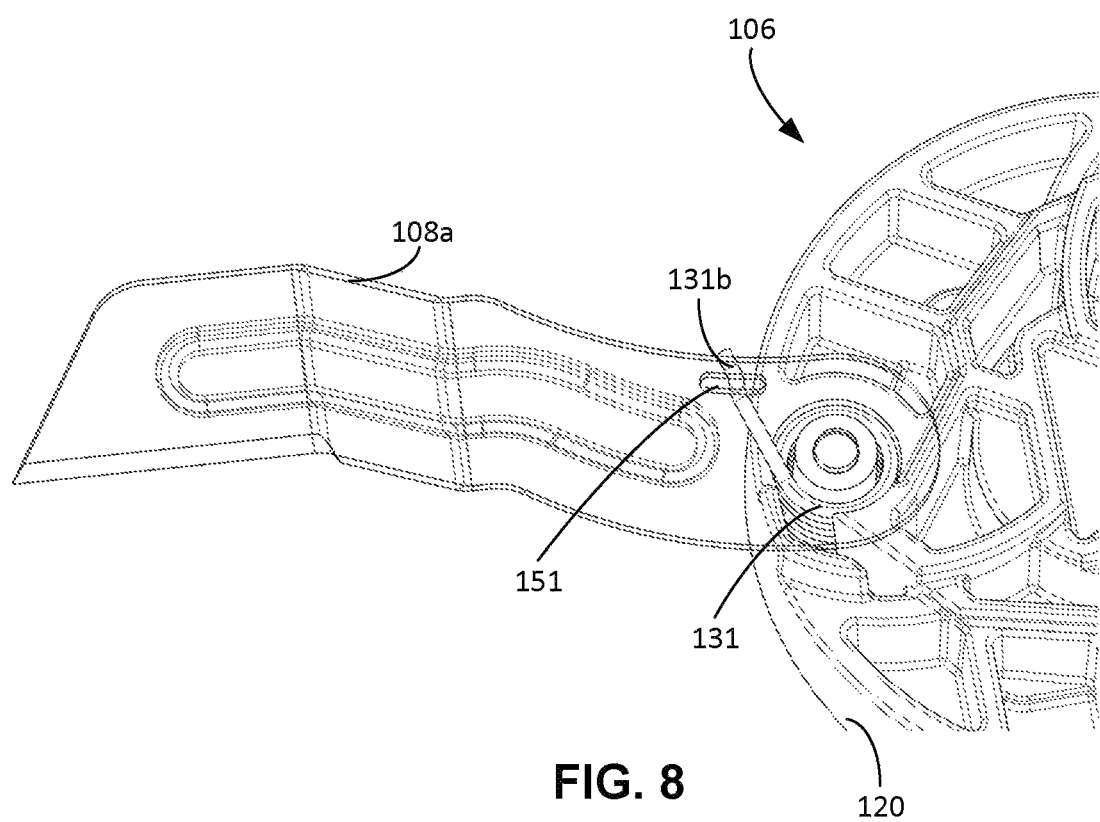
FIG. 8 is a bottom perspective view of a blade, shown transparent, coupled to a spring in the blade assembly.

The blade assembly 106 further includes springs 131 mounted in the housing 120. For each spring 131, one end of the spring 131 is rotationally constrained to the housing 120 and the other end of the spring 131 is coupled to a corresponding blade 108. Because the spring 131 is coupled to both the housing 120 and the blade 108, the spring 131 is configured to constrain movement of the corresponding blade 108 relative to the housing 120. The spring 131 includes a first end 131a coupled to the housing 120 and a second end 131b, as shown in FIG. 8, coupled to the blade 108a. The second end 131b of the spring 131 is mounted into, for example, an opening 151 on the blade 108a.

Because the first end 131a is coupled to the housing 120 (e.g., the first end 131a is rotationally constrained to the housing 120) and the second end is coupled to the blade 108a, relative motion between the housing 120 and the blade 108a causes the spring 131 to twist about the twist axis 136. The blades 108 are spring-mounted within the housing 120 such that the blades 108 are biased into the position as shown in FIGS. 3 to 5, 7A, and 11. The spring 131 is positioned such that a twist axis 136 of the spring 131 coincides with the mounting axis 135. Both the twist axis 136 and the mounting axis 135 are angled relative to the drive axis 130. Each blade 108 has a spring 131 and therefore rotates independently from the other blades.

Rotation of the blade 108a relative to the housing 120 away from its initial position through the slot 122 causes the spring 131 to store energy. The spring 131 exerts a force opposite of the rotation of the blade 108a away from its initial position. Thus, as the blade 108a rotates relative the housing 120 toward another blade, the force from the spring 131 biases the blade 108a away from the other blade. The spring 131 is, for example, a 1 to 5 lb-in (e.g., 1 to 2.5 lb-in, 2.5 to 5 lb-in, approximately 2.5 lb-in, 0.11 to 0.57 N-m, 0.11 to 0.28 N-m, 0.28 to 0.57 N-m, approximately 0.28 N-m) torsional spring; however, torsional springs having other performance characteristics may be used. For example, a torsional spring with greater strength increases the amount of energy absorbed by the spring when the blade 108a is rotated to the fully retracted position and increases the amount of force required to cause the blade 108a to move to the fully retracted position. A torsional spring with smaller strength decreases the amount of energy absorbed by the spring when the blade 108a is rotated to the fully retracted position and decreases the amount of force required to cause the blade 108a to move to the fully retracted position.

FIGS. 7A and 7B depict a single blade 108a moving through the housing 120. The other blades 108b, 108c are not shown to simplify the depiction of the movement of the blade 108a. As described herein in greater detail, the blade 108a rotates through the slot 122 from an extended position (FIG. 7A) to a retracted position (FIG. 7B). The extended position corresponds to an initial position of the blade 108a within the slot 122. The retracted position corresponds to a final position of the blade 108a within the slot 122 in which the blade 108a cannot rotate farther from its initial position due to contact with the walls of the housing 120. In the retracted position, a portion of the blade 108a is within the widened portion 122a of the slot 122.

FIGS. 9A to 9D illustrate an example of the blade 108a. The blade 108a defines a first edge 138 and a second edge 140 that correspond to a leading edge and a trailing edge, respectively, of the blade 108a as the blade assembly 106 rotates about the drive axis 130 in a forward rotating direction 142 (shown in FIG. 5). The first edge 138 and the second edge 140 are connected by a top surface 144 and a bottom surface 146 of the blade 108a.

Because the blade 108a is mounted at the tilt angle 137 relative to the ground surface 50, as shown in FIG. 4, the second edge 140 is higher than the first edge 138 relative to the ground surface 50. The blade height 132 corresponds to the height of the first edge 138 above the ground surface 50. In this regard, when the blade assembly 106 is rotating, the first edge 138 cuts the unmowed grass 55 to a height approximately equal to the blade height 132.

Because the blade 108a is mounted with the tilt angle 137, the bottom surface 146 from near the first edge 138 to the second edge 140 is positioned at a height greater than the blade height 132. Therefore, after the first edge 138 cuts the grass to the blade height 132, the bottom surface 146 clears the mowed grass 60 without dragging along the mowed grass 60. Reduced dragging decreases friction forces that need to be overcome by the actuator 112 as the actuator 112 rotates the blade assembly 106 to cut the grass. The tilt angle 137 thereby can enable greater cutting efficiency by inhibiting friction forces that are caused by the dragging of the bottom surface 146.

Each of the blades 108 includes a first portion 139a, a second portion 139b extending from the first portion 139a, and a third portion 139c extending from the second portion 139b to a blade tip 139d. The first portion 139a is the portion of the blade 108a mounted within the housing 120. The first portion 139a includes the opening 151 to mount the spring 131 to the blade 108a as well as an opening 157 to rotatably mount the blade 108a onto the housing 120 (e.g., to mount the blade 108a onto the pivot shaft 134 of the housing 120). The first portion 139a extends from within the housing 120, where it is mounted, out of the housing 120 through the slot 122.

The second portion 139b of the blade 108a extends downward from the first portion 139a of the blade 108a such that the second portion 139b terminates at the blade height 132. The widened portion 122a of the slot 122 accommodates the second portion 139b of the blade 108a when the blade 108a is in the retracted position (FIG. 7B).

The third portion 139c of the blade 108a extending from the second portion 139b is positioned to extend generally horizontally above the ground surface 50 at the blade height 132. The third portion 139c includes a cutting portion 138a of the first edge 138 that extends from the blade tip 139d inwardly toward the drive axis 130. The third portion 139c and the cutting portion 138a are, for example, coincident with or parallel to a radial axis of the blade assembly 106 extending from the drive axis 130. In some cases, the third portion 139c forms an angle with the radial axis between 0 and 2.5 degrees (e.g., 0 to 1.5 degrees, 0 to 0.5 degrees, less than 1 degree, less than 0.5 degrees).

In some examples, because only the third portion 139c of the blade 108a is at the blade height 132, when the robot 100 travels across the ground surface 50 to mow grass, the third portion 139c contacts the grass while the first and second portions 139a, 139b do not contact the grass. The third portion 139c, as the most distal portion of the blade 108a relative to the drive axis 130 of the blade assembly 106, has a greater lever arm as measured from the drive axis 130. Given a torque applied by the actuator of the robot 100 on the blade assembly 106, the force exerted by the third portion 139c on the grass is greater than the force that could be exerted by the second portion 139b and the first portion 139a.

Furthermore, the third portion 139c has a relatively small length compared to the overall length of the blade 108a. In some examples, the third portion 139c has a length 150 that is a percent of an overall horizontal length 152 of the blade 108a between 10% and 50% (e.g., between 10% and 30%, between 20% and 40%, between 30% and 50%, approximately 20%, approximately 30%, approximately 40%). In some examples, the horizontal length 152 of the blade 108a is between 5 and 30 centimeters (e.g., between 5 and 7.5 centimeters, between 7.5 and 10 centimeters, between 5 and 10 centimeters, between 10 and 20 centimeters, between 20 and 30 centimeters, approximately 7.5 centimeters, approximately 15 centimeters, approximately 20 centimeters, approximately 22.5 centimeters, approximately 25 centimeters). The combination of the smaller surface area of the third portion 139c in contact with the grass and the longer lever arm of the third portion 139c enables the third portion 139c to deliver more concentrated force on the grass as the blade 108a cuts the grass. The concentrated force, by cutting cleanly through the grass, achieves improved cut quality of the grass. Improved cut quality, for example, includes achieving a uniform cut over a swath of grass. In some implementations, improved cut quality means that at least between 75-80% of grass blades in a cut area are within a range of between 10% to 15% of desired cutting height (e.g., blade height 132). In some implementations, improved cut quality means achieving a uniform cut across a vertically oriented blade so that the cut edge is not jagged and/or so that the length of the cut edge is no more than 10-15% longer than the width of the blade of grass.

Figure 9A:
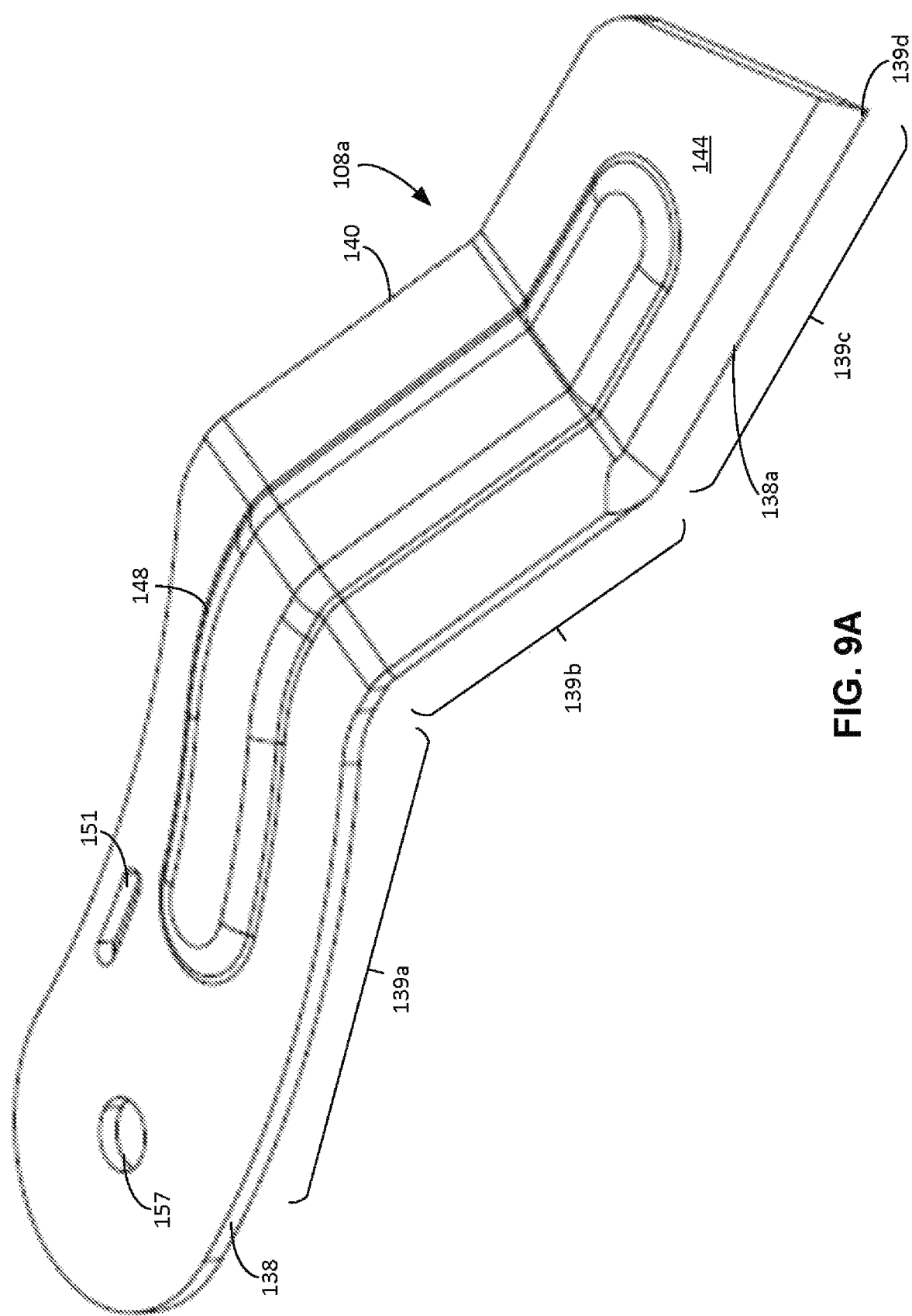
FIG. 9A is a top perspective view of an example of a blade.
Figure 9B:
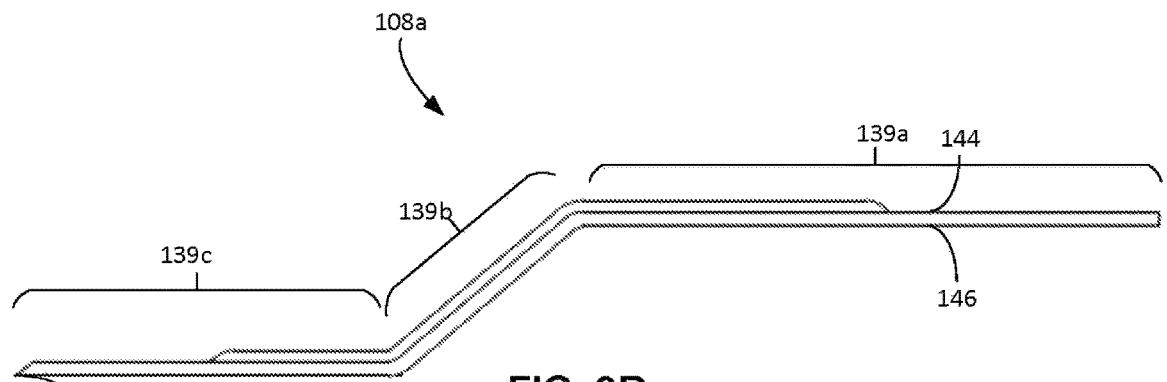
FIG. 9B is a side view of the blade of FIG. 9A.
Figure 9C:
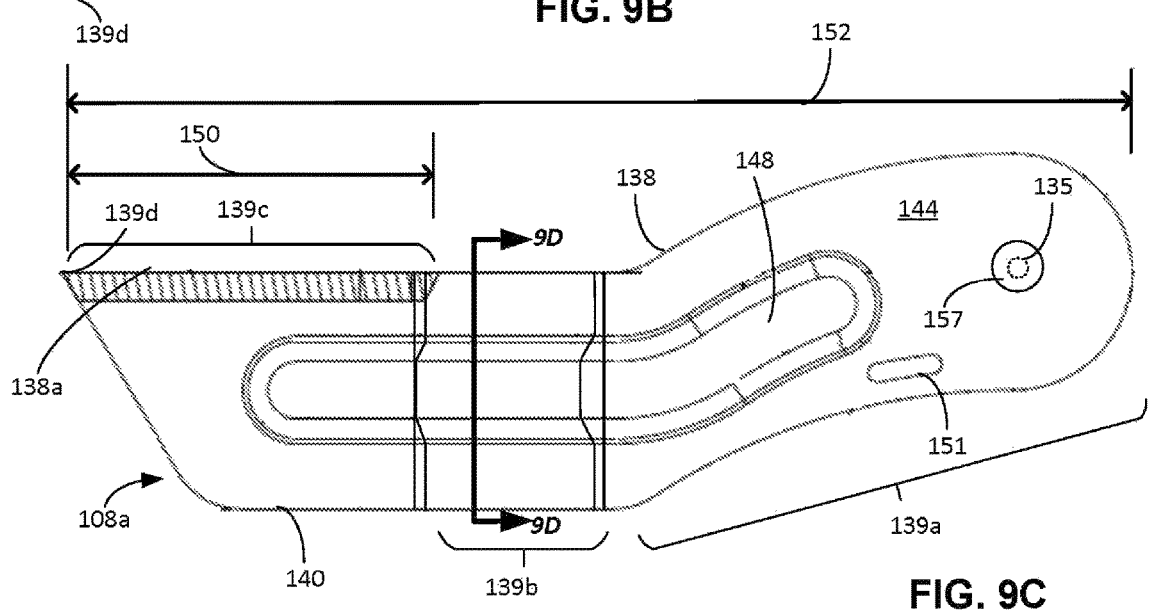
FIG. 9C is a top view of the blade of FIG. 9A.
Figure 9D:
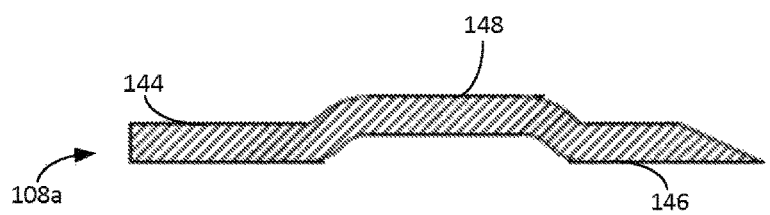
FIG. 9D is a cross sectional view of the blade taken along the section line 9D-9D shown in FIG. 9C.

Optionally, the top surface 144 of the blade 108a includes an embossment 148. The embossment 148 extends longitudinally along the blade 108a. The embossment 148, for example, extends along the top surface 144 through 50% to 90% (e.g., 60% to 80%, 65% to 75%, approximately 70%) of the horizontal length 152 of the blade 108a. As shown in FIG. 9D, which is a cross-sectional view of the blade 108a along the section line 9D-9D shown in FIG. 9C, the embossment 148 modifies the cross-sectional shape of the blade 108a to modify air flow across the blade 108a as the blade 108a rotates. The cross-sectional shape of the embossment 148 is, for example, configured such that air flow during rotation of the blade assembly 106 induces a lift force on the blade 108a that would cause the blade 108a to partially rise through the slot 122. Such a cross-sectional shape reduces a risk of the blade 108a bending in response to the air flow that occurs during the rotation of the blade assembly 106.

Figure 11:
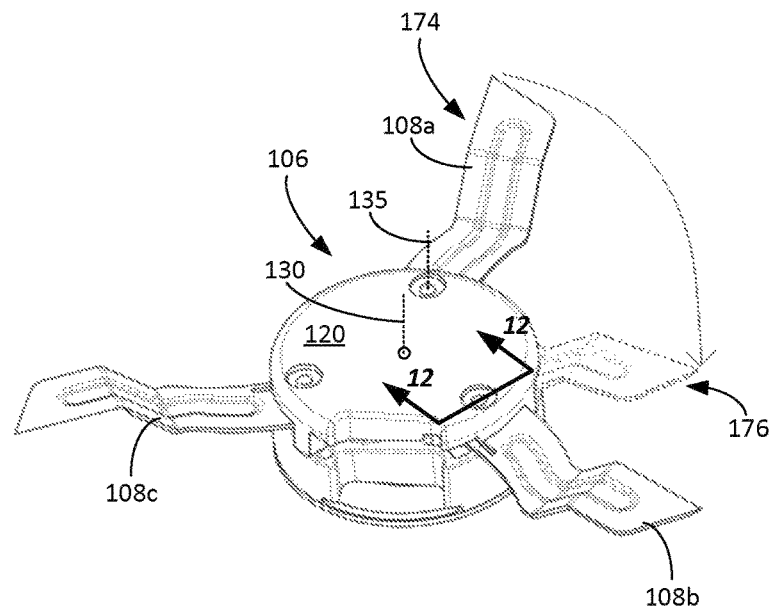
FIG. 11 is a top perspective view of the blade assembly showing the blade in the extended position and the retracted position.

When the blade 108a moves through the slot 122, the blade 108a is configured such that rotation of the blade 108a about the mounting axis 135 of the blade 108a through the slot 122 causes the blade 108a to move toward the drive axis 130. As depicted in a top view of the blade assembly 106 in FIG. 10, during cutting operations, the blades 108a, 108b, 108c rotate with the blade assembly 106 in a counterclockwise sense (as viewed from above). Each of the blades 108a, 108b, 108c is movable relative to the housing 120 between an extended position and a retracted position. FIGS. 10 and 11 depict only the blade 108a in the extended position 174 and in the retracted position 176, but each of the blades 108a, 108b, 108c is movable between these positions.

In some examples, one of the blades 108 contacts objects (e.g., the small object 65) as the objects enter the underside area (e.g., the underside area 118 depicted in FIG. 1) beneath the body 103, causing the blade 108a to move from the extended position 174 to or toward the retracted position 176. Absent impact or contact with an object on the ground surface 50, the blade 108a is positioned to rotate throughout an extended tip radius 178 (see FIG. 10) corresponding to the tip radius of the blade in the extended position 174 as measured from the drive axis 130. In the retracted position 176, the blade 108a rotates through a retracted tip radius 179 (see FIG. 10). In response to the impact and movement of the blade 108a, the blade 108a is positioned to rotate throughout a radius corresponding to the tip radius of the blade in a partially retracted position between the retracted position 176 and the extended position 174 (e.g., a radius between the extended tip radius 178 and the retracted tip radius 179).

As the blade 108a moves through the slot 122 from the fully extended position 174 and the fully retracted position 176, the blade height 132 linearly increases with the distance that the blade 108a travels through the slot 122 toward the fully retracted position 176. Similarly, in some implementations, the tip radius of the blade 108a also decreases linearly with the amount of rotation of the blade 108a through the slot 122 toward the fully retracted position 176.

As the blade 108a is rotating in its extended position 174, the blade 108a is able to avoid further contact with objects positioned in an outer region 175 defined by an outer radius corresponding to the extended tip radius 178 and an inner radius corresponding to the retracted tip radius 179. When the blade 108a contacts an object positioned in the outer region 175, the blade 108a retracts from the extended position 174 to a partially retracted position within the outer region 175. In some examples, the blade 108a retracts from the extended position 174 to the fully retracted position 176.

In some examples, the blade 108a avoids contact with the object in the outer region 175 by rising over the object. In some examples, if an object enters an inner region 177 defined by a radius corresponding to the retracted tip radius 179, the blade 108a is able to avoid further contact with the object by rising over the object. Even though the blade 108a cannot retract beyond the retracted tip radius 179, the blade 108a is able to rise high enough to clear the height of the object. Examples of these mechanisms for the blade 108a to avoid objects are described in greater detail herein, for example, with respect to FIGS. 14A to 14D and FIGS. 15A to 15D.

The controller 114 and the blade assembly 106 are configured such that the controller reduces the power to the actuator 112 driving the blade assembly 106 by the time any object enters the inner region 177. An object along the ground surface 50 in the forward direction 102 of the robot 100 that enters the inner region 177 contacts one of the blades 108 before entering the inner region 177. When one of the blades 108 contact the object, because the object contacting the blade 108 causes a force opposite the direction of rotation of the blade assembly 106, the blade assembly 106 and the actuator 112 experiences a decrease in rotational speed. The decrease in rotational speed of the actuator 112 is detectable by the controller 114, for example, using an encoder or other sensor attached to the actuator 112. The controller 114 includes, for example, a feedback speed control mechanism to maintain the speed of rotation of the actuator 112. The decrease in the detected rotational speed of the actuator 112 consequently causes the controller 114, implementing the feedback speed control mechanism, to increase power delivered to the actuator 112 of the robot 100 driving the blade assembly 106 to control the rotational speed to be within a predetermined range.

In some examples, the decrease in rotational speed occurs quickly because, as a blade of a blade assembly contacts an object, the impact on the blade is transferred unabated to the housing and then to an actuator driving the blade assembly. The force transfer between the blade and the actuator occurs quickly due to, for example, an absence of components to absorb or slow the transfer of the impact from the blade to the actuator. In other examples, the blades contact an object and are unable to move around or above the object as the blade assembly rotates. The actuator driving the blade assembly may stall due to the contact between the blades and the object. In some examples, a controller is able to detect a decreased rotational speed of the blade assembly and accordingly compensates by increasing the power delivered to the actuator driving the blade assembly. However, as the blades 108 are unable to maneuver about the object, the blades 108 remain in contact with the object, and the power delivered to the actuator 112 may continue to increase.

To enable the blades 108 to avoid contact with the object, as described herein, in response to impact with the object entering the underside area, the blades 108 move within the housing 120 from the extended position 174 to the retracted position 176. Because the blades are able to move through the slot 122 against the force of the spring 131, the force of the impact is absorbed by the spring 131. The impact therefore occurs over a greater distance, e.g., the length of the slot 122, thus decreasing the impulse force on the blade 108a. The decreased impulse force can reduce the risk of damaging the blade 108a.

The impact also occurs over a greater duration of time because the blade 108a initially travels through the slot 122. The greater duration of time for the impact allows the controller 114 to have a greater amount of time to detect that the rotational speed of the actuator 112 is decreasing. Upon detecting that the rotational speed is decreasing, the controller 114 responds by, for example, ceasing implementation of the feedback speed control mechanism and initiating a process to stop power delivery to the actuator 112. By decreasing the power deliver to the actuator 112, the controller 114 can mitigate a risk of damage to the actuator 112 due to excess power delivered to the actuator 112. In particular, the blades 108 are mounted in the housing such that, by the time the object has moved through the outer region 175 to the inner region 177, one of the blades 108 has contacted the object for a great enough duration of time to enable the controller 114 to detect the resulting decrease in the rotational speed of actuator 112. The controller 114 then reduces power to the actuator 112 so that the blades 108 do not continue rotating against the object.

In addition, the movement of the blades 108 through the slots 122 also provides the controller 114 with sufficient time to detect the contact with the object so that the controller 114 can reduce or cut power delivered to the drive wheels 110. As a result, any object that enters the inner region 177 is detected by the controller 114 before the grass cutting mobile robot 100 moves enough to cause the housing 120 of the blade assembly 106 to contact the object. As described herein, that contact may damage the actuator shaft 113. The ability of the controller 114 to inhibit this contact protects the actuator 112 from this damage.

In some implementations, the controller 114 detects an increase in power supplied to the actuator 112 to maintain the rotational speed of the actuator 112 and responds to the increase in the power supplied by stopping power delivery to the actuator 112. The increase in the power, for example, corresponds to a spike in power that indicates that one or more of the blades 108 has struck an object. In some examples, the controller 114 detects a mechanical shock on the blade assembly 106 and/or the blades 108 based on signals from an accelerometer coupled to the blades 108 and/or the housing 120 of the blade assembly 106. An increase in the measured acceleration of the actuator indicates to the controller 114 that the blades 108 and/or the housing 120 have contacted an object. The increase in the measured acceleration, for example, corresponds to a spike in the measured acceleration indicating the contact between a component of the blade assembly 106 and an object. The controller 114, in response, reduces the power supplied to the actuator or stops delivering power to the actuator 112.

As described herein, the bumper 104 and the blade assembly 108 each provides a mechanism to avoid damage to the robot 100 that may be caused by contact with non-mowable objects. The controller 114 described herein, for example, uses a combination of the sensing systems associated with the bumper 104 and the blade assembly 108 to avoid damage to the blades 108, the actuator 112, and other components of the robot 100. In some examples, the robot 100 includes a sensor to detect that an object has contacted the bumper 104 and caused an upward movement of the bumper 104. The object, for example, causes a lift in the body 103, the drive wheels 110, and/or the caster wheels 111 of the robot 100. One or more sensors attached to the body 103, the drive wheels 110, and/or the caster wheels 111 generates an electrical that corresponds to an amount of the lift. The sensor is, for example, an accelerometer, a velocity sensor, a position sensor, a force sensor, or other appropriate sensor that is responsive to the object contacting the bumper 104 and causing an upward force on the body 103 and the bumper 104. The upward force is, for example, a result of an applied upward force directly on the bumper 104 causing relative motion between the bumper 104 and the body 103 or an upward force causing upward motion of the bumper 104 and the body 103 together.

In examples where the sensor is a force sensor, if the force detected during a mowing operation is higher than a threshold force, the controller 114 responds by discontinuing delivery of power to the drive wheels 110 and/or the actuator 112. If the force is below the threshold force, the controller 114 continues the mowing operation without adjusting the amount of power delivered. In some cases, the bumper 104 contacts the object, and the sensor does not detect a force above the threshold force. The robot 100 continues moving in the forward drive direction, which causes the blades 108 and/or the housing 120 to contact the object.

The movement to the retracted position 176 also enables the blades 108 to avoid further contact with the object as the blade assembly 106 continues to rotate. The movement of the blades 108 within the housing 120 enables the blades 108 to rotate into the housing 120 (decreasing the tip radius of the blades 108) and to move upward relative to the ground surface 50. The rotation of the blades 108 into the housing causes lateral movement of the blades 108 relative to the object so that the blades 108 avoid further contact with the object. The combination of the rotation of the blades 108 into the housing and the upward movement of the blades 108 in response to contact with the object prevents further contact between the blades 108 and the object.

The movement to the retracted positions causes the radius of the blade tips 173 to decrease by, for example, 20 to 40 millimeters (e.g., 20 to 30 millimeters, 30 to 40 millimeters, approximately 30 millimeters). In some implementations, the retracted tip radius 179 is 40% to 80% (e.g., 40% to 60%, 60% to 80%, 50% to 70%, approximately 50%, approximately 60%, approximately 70%) of the extended tip radius 178. In some examples, the extended tip radius 178 is between 8 and 12 centimeters (e.g., between 9 and 11 centimeters, approximately 10 centimeters), and the retracted tip radius 179 is between 4 and 8 centimeters (e.g., between 5 and 7 centimeters, approximately 6 centimeters). During operation, the blades 108 have a radius between the extended tip radius 178 and the retracted tip radius 179 (inclusive) depending on the amount of retraction of the blades 108 (e.g., due to contact or absence of contact with an object).

The upward movement of the blades 108 relative to the ground surface 50 causes an increase in the blade height 132 so that the blades 108 climb over the object. The blade height 132 increases by, for example, 5 to 15 millimeters (e.g., 5 to 10 millimeters, 10 to 15 millimeters, 6 to 14 millimeters, 7 to 13 millimeters, approximately 8 millimeters). In some examples, the blade height 132 of the blades 108 in the extended position 174 is between 30 millimeters and 50 millimeters (e.g., between 30 and 40 millimeters, between 35 and 45 millimeters, between 40 and 50 millimeters, approximately 35 millimeters, approximately 40 millimeters, approximately 45 millimeters). The blade height 132 of the blades 108 in the retracted position 176 is between 40 and 60 millimeters (e.g., between 40 and 50 millimeters, between 45 and 55 millimeters, between 50 and 60 millimeters, approximately 45 millimeters, approximately 50 millimeters, approximately 55 millimeters). The ratio of the blade height 132 in the retracted position 176 to the blade height 132 in the extended position 174 is, for example, 1.05 to 1.25 (e.g., 1.05 to 1.15, 1.10 to 1.20, 1.15 to 1.25, approximately 1.10, approximately 1.15, approximately 1.20).

With respect to the lateral movement of the blades 108 upon impact described herein, when the blade 108a travels toward the retracted position 176 from the extended position 174, as shown in FIG. 11, a first blade 108a moves through the slot 122 toward a second blade 108b and away from a third blade 108c. Initially, absent contact with objects on the ground surface 50, the blades 108 are equally spaced from one another. The blade tips 173 of the blades 108, in some examples, form 120 degree angles with one another. In some cases, the blade tips 173 are equidistantly spaced along a circumference through which the blade tips 173 are swept when the blade assembly 106 is rotated and the blades 108 are each in an extended position.

In some examples, when one of the blades 108a, 108b, 108c, e.g., the blade 108a, contacts an object, the blade 108a moves to a partially retracted position between the extended position 174 and the retracted position 176, thereby causing the blade 108a to become unequally spaced from the blades 108b, 108c. The angle between the blade tip 173a of the blade 108a (in the retracted position 176) from the blade tip 173b of the blade 108b (in an extended position) is, for example, 30 to 70 degrees (e.g., between 30 and 50 degrees, between 40 and 60 degrees, between 50 and 70 degrees, approximately 40 degrees, approximately 50 degrees, approximately 60 degrees). The angle between the blade tip 173a of the blade 108a (in the retracted position 176) and the blade tip 173c of the blade 108c (in an extended position) is, for example, 150 to 240 degrees (e.g., between 150 and 180 degrees, between 180 and 210 degrees, between 210 and 240 degrees, approximately 165 degrees, approximately 195 degrees, approximately 225 degrees). In some implementations, the angle between the blade tip 173a of the blade 108a and the blade tip 173b of the blade 108b (in the extended position) decreases by 25% to 40% (e.g., 25% to 35%, 30% to 40%, approximately 30%, approximately 35%) as the blade 108a moves from the extended position 174 to the retracted position 176.

Furthermore, moving from the extended position 174 to the retracted position 176, the blade 108a travels through the slot 122 such that the blade 108a moves toward the drive axis 130. The third portion 139c moves inward toward the drive axis 130 such that a tip radius defined by the blade tip 139d and the drive axis 130 reduces as the blade 108a travels from the extended position 174 to the retracted position 176. As described herein, the extended tip radius 178 when the blade 108a is in the extended position 174 is greater than the retracted tip radius 179 when the blade 108a is in the retracted position 176.

Figure 12:
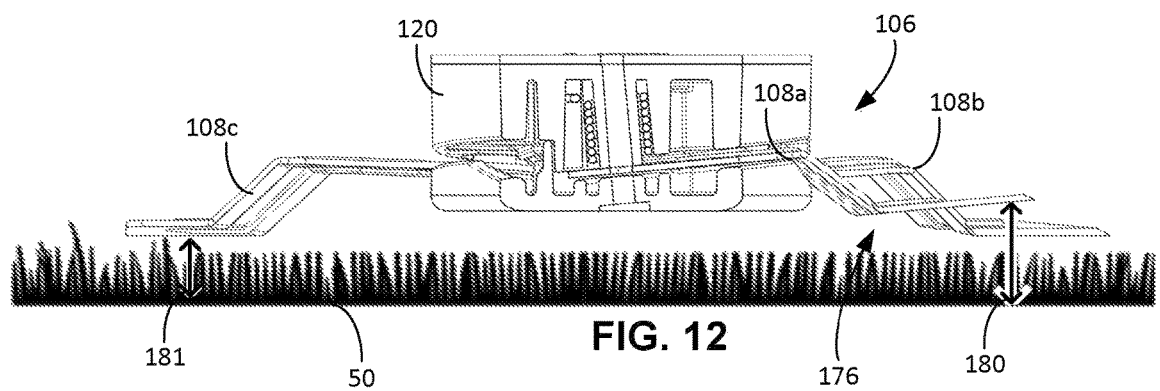
FIG. 12 is a side cross-sectional view of the blade assembly isolated from the grass cutting mobile robot taken along the section line 12-12 in FIG. 11 with the blade in the retracted position.
Figure 13:
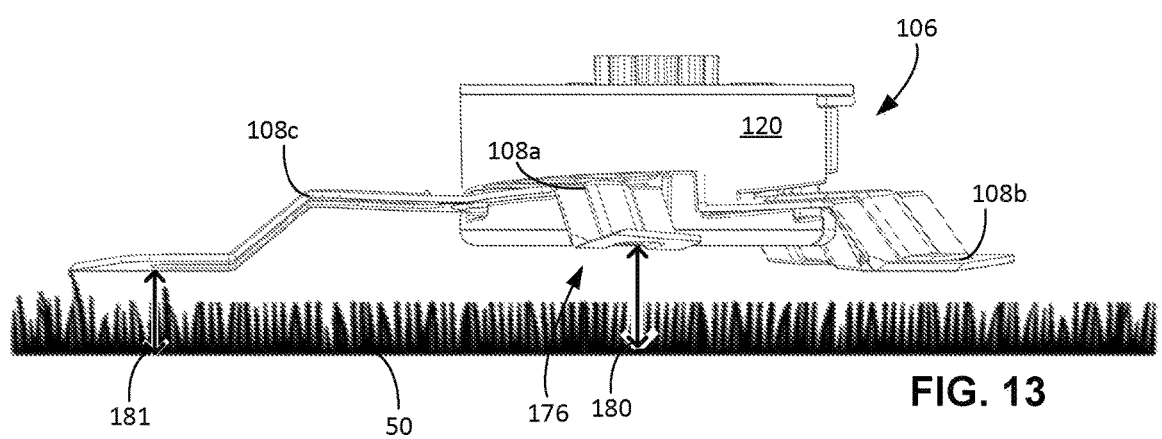
FIG. 13 is a side view of the blade assembly isolated from the grass cutting mobile robot with the blade in the retracted position.

With respect to the upward movement of the blades 108 described herein, the blade 108a also travels through the slot 122 such that the blade 108a moves upward relative to the ground surface 50 toward the body 103. In particular, as the blade 108a moves toward the drive axis 130, the third portion 139c moves upward relative to the ground surface 50 toward the body 103. Because the blade 108a is mounted to the housing through the opening 157 (as shown in FIG. 9A), the opening 157 of the blade 108a does not move relative to the housing 120. As shown in FIG. 12, the blade 108a is in the retracted position 176. The third portion 139c of the blade 108a in the retracted position 176 has a retracted blade height 180 that is greater than an extended blade height 181 of the blades 108b, 108c, which are both in extended positions.

FIGS. 14A to 14D schematically depict a position of the blade 108a when the blade 108a contacts an object 80 and consequently travels within the housing 120 to rise over the object 80 to avoid being stuck in contact with the object 80. FIGS. 14A to 14D show sequential side perspective views of the blade 108a as the blade assembly 106 rotates in a first direction 182 about the drive axis 130 and the blade 108a contacts the object 80.

Figure 14A:
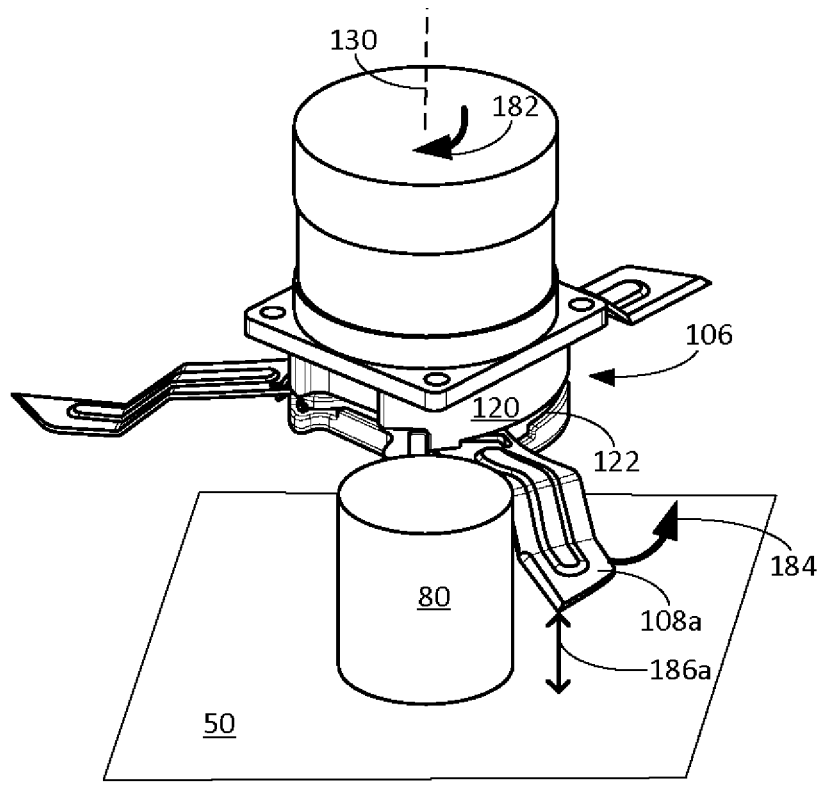
FIGS. 14A to 14D are side perspective views of an example of a blade of a blade assembly contacting an object.

In FIG. 14A, the blade 108a initially contacts the object 80 as the blade assembly 106 rotates in the first direction 182 about the drive axis 130. The blade 108a is initially at a blade height 186a above the ground surface 50 and is initially in the extended position. The initial contact causes a force on the blade 108a in a second direction 184 that opposes the first direction 182. The contact with the object 80 causes the blade 108a to overcome the spring force of the spring and thereby causes the object to rotate in the second direction 184 toward the retracted position relative to the housing 120. The rotation in the second direction 184 causes the blade 108a to move upward relative to the ground surface 50.

Figure 14B:
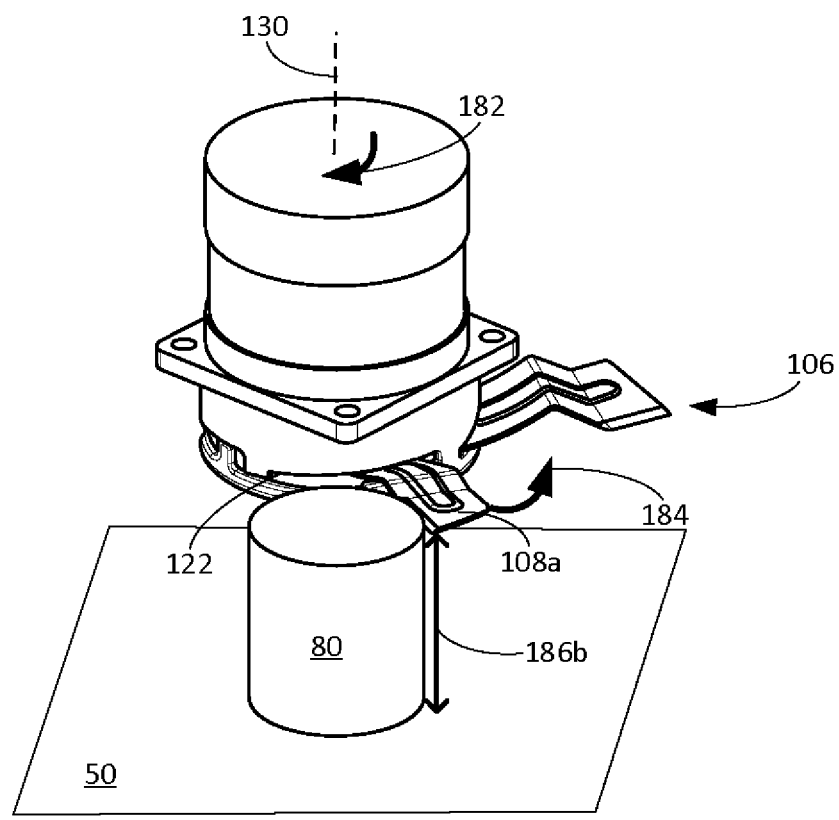

In FIG. 14B, the blade assembly 106 continues rotating in the first direction 182. However, because of the object 80, the blade 108a rotates in the second direction 184 and travels through the slot 122 while remaining in contact with the object 80. The continued contact with the side of the object 80 causes the blade 108a to travel through the slot 122 toward the retracted position. The blade height 186b increases because the blade 108a is tilted at an angle relative to the ground surface 50. The blade 108a moves upwards relative to the ground surface 50 toward the body 103 of the robot 100 in response to continued contact with the object and rotation of the blade assembly 106.

The rotation of the blade 108a within the slot 122 away from its initial extended position causes the spring (e.g., the spring 131) to twist. The spring, as the amount of twisting increases, biases the blade 108a back toward the initial extended position, but the blade 108a is unable to return to the extended position while the blade 108a is contact with the object 80. As a result, the blade 108a remains in contact with the object 80 in a partially retracted position between the initial extended position and the fully retracted position.

Figure 14C:
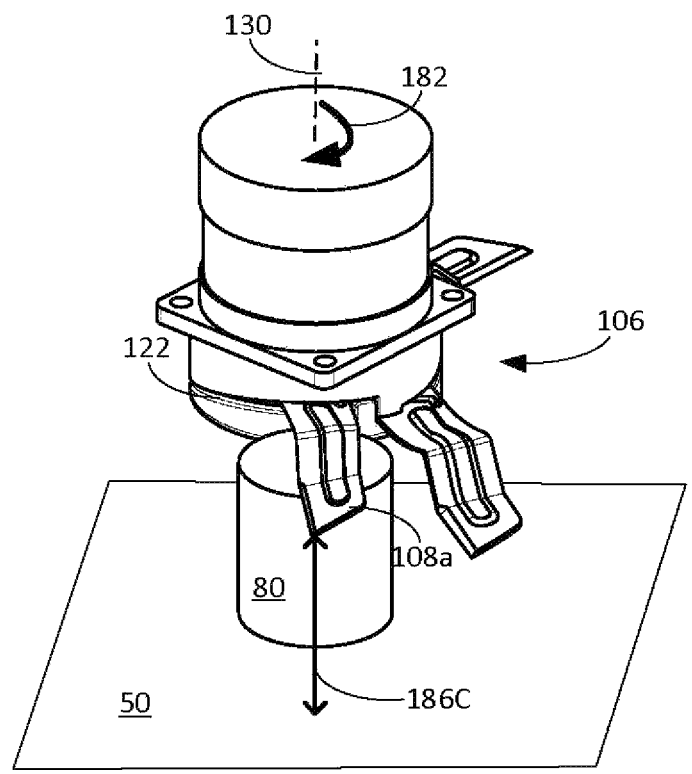

In FIG. 14C, the blade assembly 106 continues rotating in the first direction 182. Because the blade 108a travels through the slot 122 and consequently experiences an increase in its blade height, the blade 108a reaches a blade height 186c sufficient to climb over the object 80. In particular, the blade 108a reaches a blade height 186c that is greater than an object height. While the blade 108a travels across the top of the object 80, if the object 80 has a flat top surface, the blade 108a remains in relatively the same position within the slot 122. The spring continues to bias the blade 108a back toward the initial extended position, but the top of the object 80 limits the movement of the blade 108a in the direction toward the initial extended position.

Figure 14D:
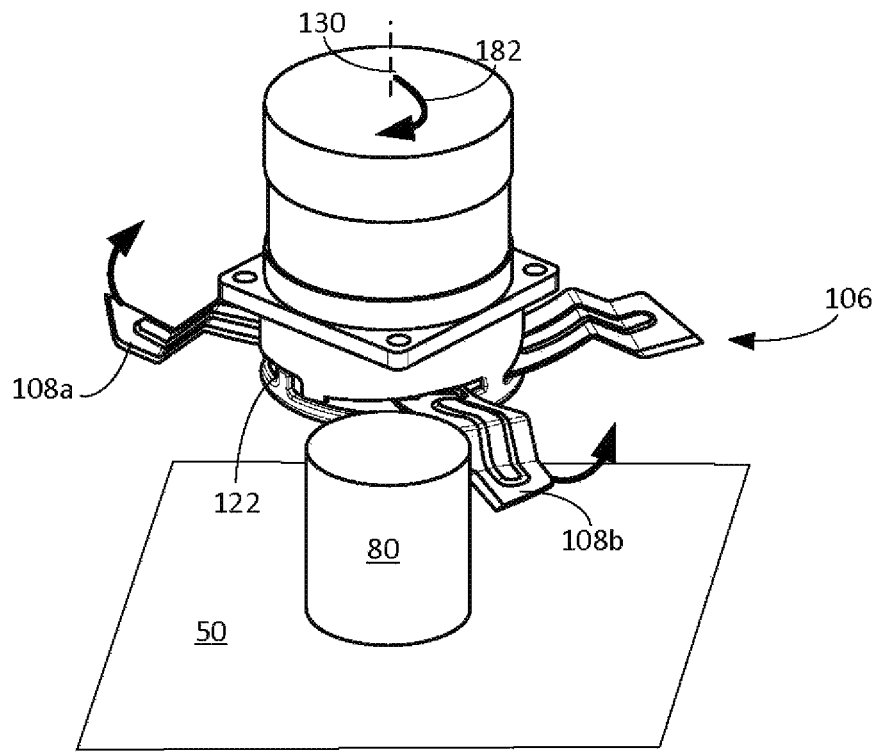

In FIG. 14D, the blade assembly 106 continues rotating in the first direction 182. The blade 108a has travelled across the length of the top of the object 80 and thereby is able to return toward its initial position within the slot 122 depicted in FIG. 14A. The spring biases the blade 108a back toward the initial extended position. Because the object 80 no longer blocks the blade 108a, the biasing force of the spring is able to cause rotation of the blade 108a back toward the initial extended position. In some examples, another blade 108b contacts the object after the blade 108a loses contact with the object 80.

In contrast to FIGS. 14A to 14D where the blade 108a maneuvers beyond an object 80 by climbing over the object, the blade 108a depicted in FIGS. 15A to 15D beyond an object 90 by lateral movement of the blade 108a relative to the object. In particular, FIGS. 15A to 15D schematically depict a position of the blade 108a when the blade 108a contacts an object 80 and consequently travels within the housing 120 to maneuver laterally around the object 80 to avoid being stuck in contact with the object 80. FIGS. 15A to 15D show sequential top views of the blade 108a as the blade assembly 106 rotates in a first direction 190 about the drive axis 130 and the blade 108a contacts the object 90.

Figure 15A:
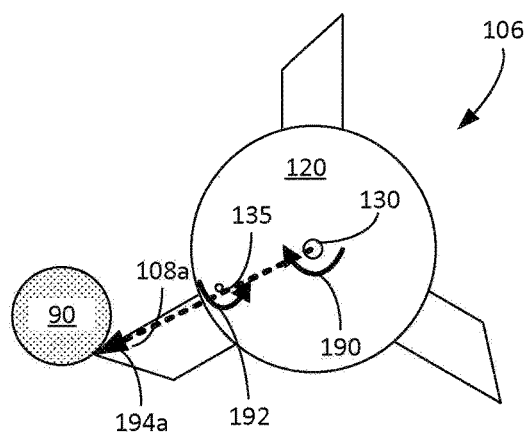
FIGS. 15A to 15D are schematic side views of an example of a blade of a blade assembly contacting an object.

In FIG. 15A, the blade 108a initially contacts the object 90 as the blade assembly 106 rotates in the first direction 190 about the drive axis 130. The blade 108a is initially in the extended position and at a blade tip radius 194a. The initial contact causes a force on the blade 108a. The force causes the blade to rotate in a second direction 192 about the mounting axis 135 relative to the housing 120. The second direction 192 of movement opposes the rotation of the blade 108a (with the blade assembly 106) in the first direction 190. The contact with the object 90 causes the blade 108a to move toward the retracted position, therefore causing the blade 108a to move toward another blade and inward relative to the drive axis 130.

Figure 15C:
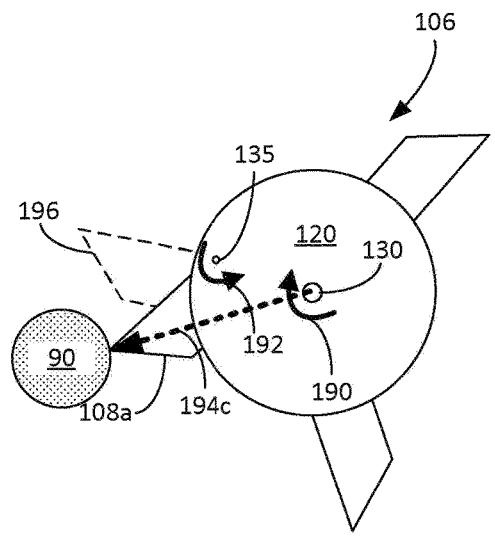
Figure 15B:
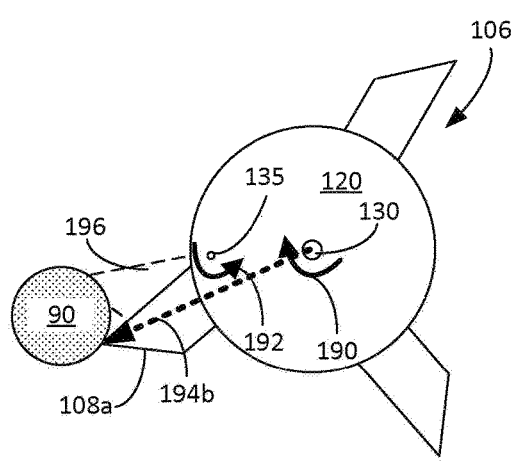

In FIG. 15B, the blade 108a rotates in the second direction 192 relative to the housing 120 to cause blade 108a to begin retracting. The blade 108a rotates within the slot (not shown) relative to the housing 120 such that the blade tip radius 194b decreases from the blade tip radius 194a shown in FIG. 17A. The blade tip radius 194b is positioned inward toward the drive axis 130 relative to the blade tip radius 194a. The rotation of the blade 108a within the housing 120 away from its initial extended position 196 causes the spring (e.g., the spring 131) to twist. The spring, as the amount of twisting increases, biases the blade 108a back toward the initial extended position 196, but the blade 108a is unable to return to the extended position 196 while the blade 108a is contact with the object 90. As a result, the blade 108a remains in contact with the object 90 in a partially retracted position between the extended position 196 and the fully retracted position.

Figure 15D:
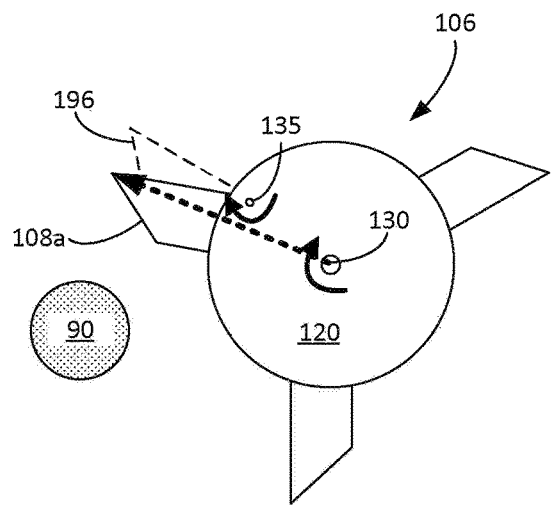

In FIG. 15C, the blade assembly 106 continues rotating. The blade 108a has rotated a sufficient amount within the housing 120 toward the retracted position such that the blade tip radius 194c is less than a distance between the object 90 and the drive axis 130. As shown in FIG. 15D, once the blade 108a has collapsed enough to clear the object 90, the spring biases the blade 108a back toward the extended position 196. In this regard, the blade 108a is rotating with the rotation of the blade assembly 106 in the first direction 190 about the drive axis 130 and is additionally rotating relative to the housing 120 about the mounting axis 135.

In some implementations, the object 80 has a height that the blade 108a is unable to clear, or the object 90 is positioned sufficiently close to the drive axis 130 to prevent the blade 108a from maneuvering about the object 90. In particular, the blade 108a moves from its initial extended position to the its fully retracted position. Even in the fully retracted position, the blade tip radius is too large for the blade 108a to move laterally around the object to avoid the object, or the blade height is too small for the blade 108a to climb over the object to avoid the object.

In these cases, the blade 108a moves through the slot 122 from the initial extended position to the fully retracted position as the actuator 112 rotates the blade assembly 106. During this movement through the slot 122, the blade 108a contacts the object 80, 90, which imparts a force on the blade assembly 106 that would cause the blade 108a to move in a direction opposite the rotation of the blade assembly 106. The force is therefore, for example, in opposition to the torque that the actuator 112 applies on the blade assembly 106. The force decreases the speed of the blade assembly 106, and the controller 114, using the feedback speed controls, increases an electrical current delivered to the actuator 112 to maintain the rotational speed of the blade assembly 106. The controller 114 then detects this increase in the electrical current delivered to the actuator 112. Once the increase is beyond a predetermined threshold, the controller 114 reduces the electrical current delivered to the actuator 112 to avoid delivering an amount of electrical current beyond the specified maximum allowed current of the actuator 112. In some examples, the controller 114 disables the feedback speed controls so that any decrease in rotational speed of the actuator 112 does not cause the controller 114 to deliver a greater amount of power to the actuator 112.

Because the blade 108a is able to move through the slot 122 against the force of the spring 131, the impact with the object 80, 90 generates a force that is absorbed by the spring 131. The impact therefore occurs over a greater distance, e.g., the length of the slot 122, thus decreasing the impulse force on the blade 108a. Decreasing the impulse force reduces the risk of damaging the blade 108a.

In addition, because the spring 131 initially absorbs the force, the blade assembly 106 does not experience a sudden decrease in rotational speed due to the impact with the object but rather experiences a gradual decrease in rotational speed. The gradual decrease provides a greater amount of time for the controller 114 to detect the increased current delivered to the actuator 112 to compensate for the gradual decrease in the rotational speed.

Figure 3:
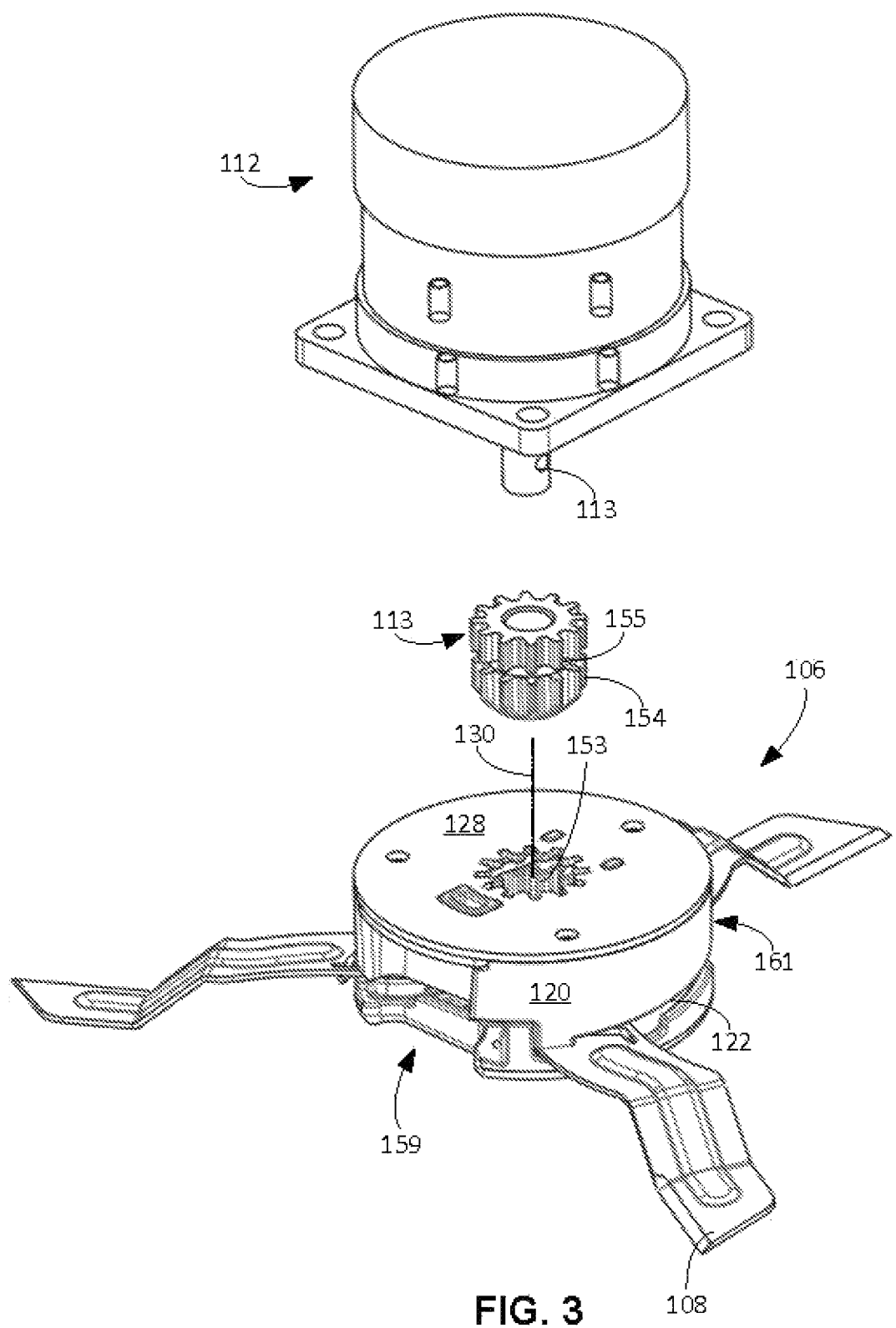
FIG. 3 is an exploded top perspective view of an actuator and a blade assembly.
Figure 17A:
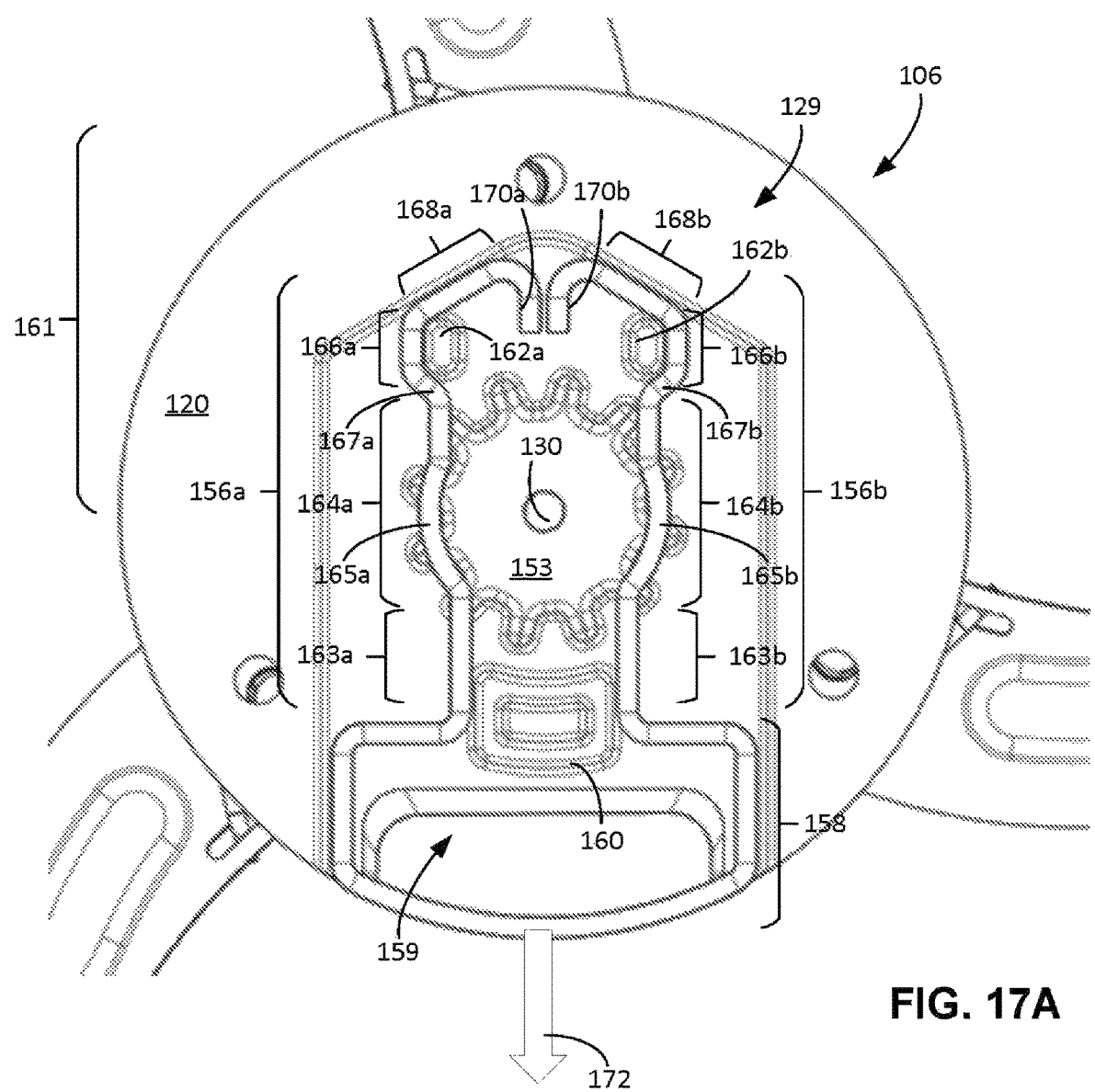
FIG. 17A is a top view of the blade assembly showing the retention clip of FIG. 16 in a retaining position.

For the actuator 112 to rotate the blade assembly 106 as described in the examples herein, the blade assembly 106 is mounted onto the actuator 112 such that the housing 120 of the blade assembly 106 is rotationally constrained to the actuator 112. As shown in FIG. 17A, to rotationally constrain the housing 120 of the blade assembly 106 to the actuator 112, the shaft 113 of the actuator 112 mates with a splined cavity 153 defined by the housing 120. Referring also to FIG. 3, when the blade assembly 106 is mounted to the actuator shaft 113, the splined cavity 153 interfaces with a splined portion 154 of the actuator shaft 113. The splined cavity 153 aligns the actuator shaft 113 with the blade assembly 106. The splined cavity 153 receives and mates with the splined portion 154 of the shaft 113 to limit relative rotation between the actuator shaft 113 and the blade assembly 106 when the blade assembly 106 is properly mounted to the shaft 113.

Figure 16:
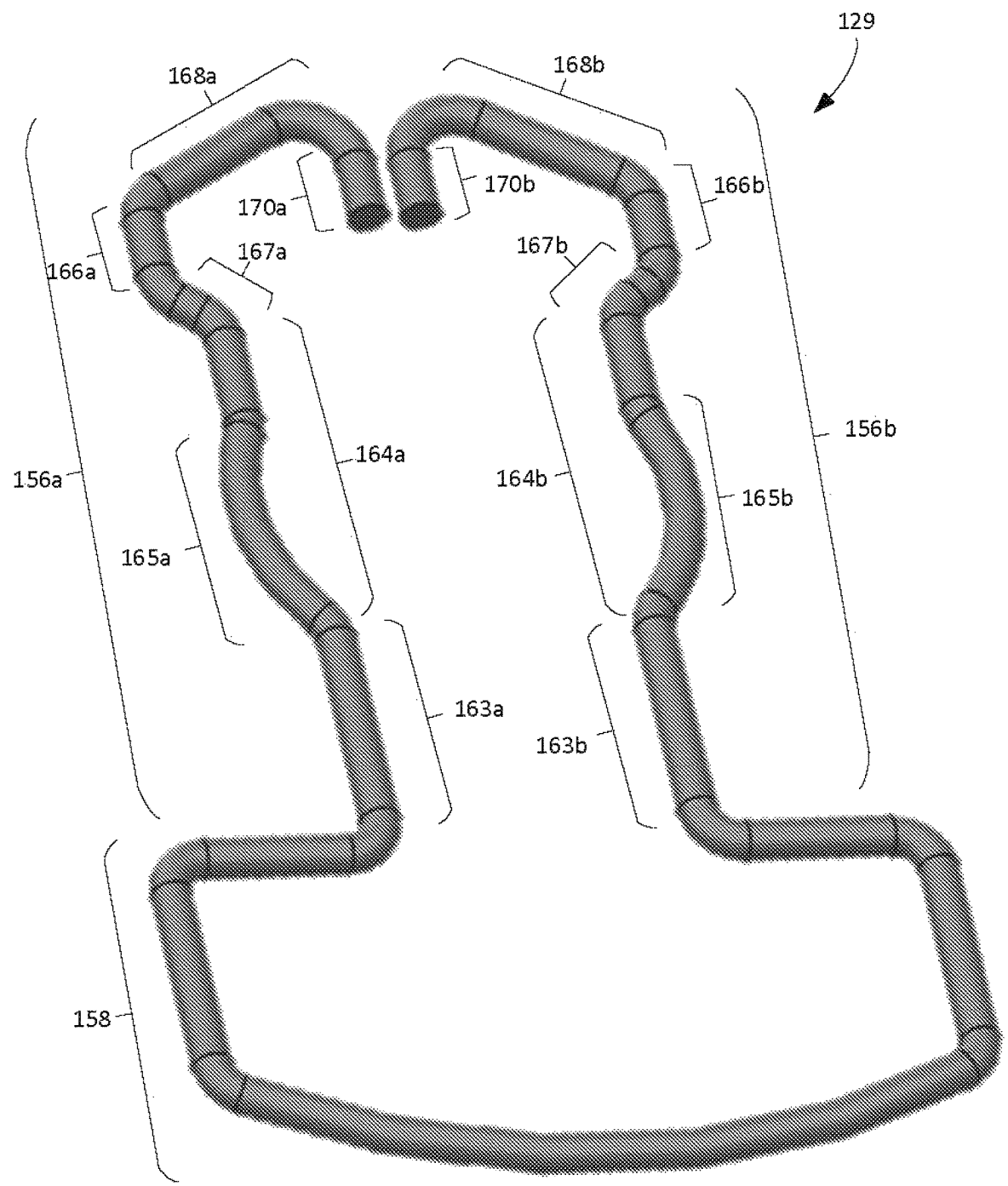
FIG. 16 is a top perspective view of a retention clip.

To inhibit relative translation of the housing 120 and the shaft 113 of the actuator 112, the blade assembly 106 includes the retention clip 129 (FIG. 16) that forms a (quick release) retention mechanism, as depicted in FIG. 17A. The retention mechanism facilitates attachment of the blade assembly 106 to the shaft 113 of the actuator 112 of the robot 100 so as to translationally constrain the blade assembly 106 to the actuator 112. In particular, a groove 155 of the splined portion 154, as described herein, engages with the retention clip 129 to translationally constrain the blade assembly 106 to the actuator shaft 113.

The retention mechanism includes the retention clip 129, which includes a first arm 156a and a second arm 156b (collectively referred to as arms 156) connected by a tab portion 158. The housing 120 includes the confinement plate (e.g., the confinement plate 128 shown in FIG. 6) that confines the retention clip 129 between the confinement plate and the housing 120. The housing 120 further defines upwardly extending posts 162a, 162b and a support boss 160. The confinement plate and the housing 120 confine the retention clip 129 such that the tab portion 158 and the arms 156 are confined along a plane.

An inset portion 159 within the housing 120 enables the user to manually pull the tab portion 158. The confinement plate and the inset portion 159 of the housing 120 allow only the tab portion 158 to be accessed externally by the user. The inset portion 159, in some cases, is counterbalanced by mass removed from the housing 120 on an opposite lateral portion 161 of the housing 120 such that the mass of blade assembly 106 is axisymmetrically distributed about the drive axis 130. For example, the housing 120 is hollow in the opposite lateral portion 161 such that the absence of material of the inset portion 159 is balanced by an absence of material in the opposite lateral portion 161.

The arms 156 are slidable within the housing 120 along the plane. As described herein, the user applies a pull force 172 to enable release of the retention clip 129 from the actuator 112. The posts 162a, 162b extend into the plane such that the arms 156 abut and slide along the posts 162a, 162b. The support boss 160 also extends into the plane in which the retention clip 129 is confined. Each of the arms 156 includes a support portion 163a, 163b, a retaining portion 164a, 164b, a step portion 167a, 167b, a first stop portion 166a, 166b, a sliding portion 168a, 168b, and a second stop portion 170a, 170b. The support portions 163a, 163b, connecting the tab portion 158 to the arms 156, extend away from the tab portion 158 toward the drive axis 130. The support portions 163a, 163b, for example, are substantially parallel linear portions that extend along the axis of the pull force 172.

The retaining portions 164a, 164b of the arms 156 are the portions of the arms 156 proximate to the drive axis 130, and hence the portions mounted within the groove 155 of the actuator shaft 113 when the blade assembly 106 is mounted to the actuator shaft 113. The retaining portions 164a, 164b extend from the support portions 163a, 163b. In some examples, the retaining portions 164a, 164b extend along the axis of the pull force 172 and include concave portions 165a, 165b that have radii of curvatures that accommodate the radii of curvature of the groove 155 of the splined portion 154. The radii of curvature of the concave portions 165a, 165b and the groove 155 of the splined portion 154 are, for example, between 2 millimeters and 6 millimeters (e.g., between 2 and 4 millimeters, between 4 and 6 millimeters, approximately 3 millimeters, approximately 4 millimeters, approximately 5 millimeters).

The step portions 167a, 167b extend from the retaining portions 164a, 164b away from the drive axis 130, thus forming angles with the retaining portions 164a, 164b. The first stop portions 166a, 166b extend from the step portions 167a, 167b along the axis of pull force 172. The sliding portions 168a, 168b extend and are angled away from the first stop portions 166a, 166b. The sliding portions 168a, 168b extend toward one another. The second stop portions 170a, 170b extend from the sliding portions 168a, 168b toward the drive axis 130. In some implementations, the second stop portions 170a, 170b are substantially linear and parallel and extend along the axis of the pull force 172 toward the drive axis 130.

Figure 17B:
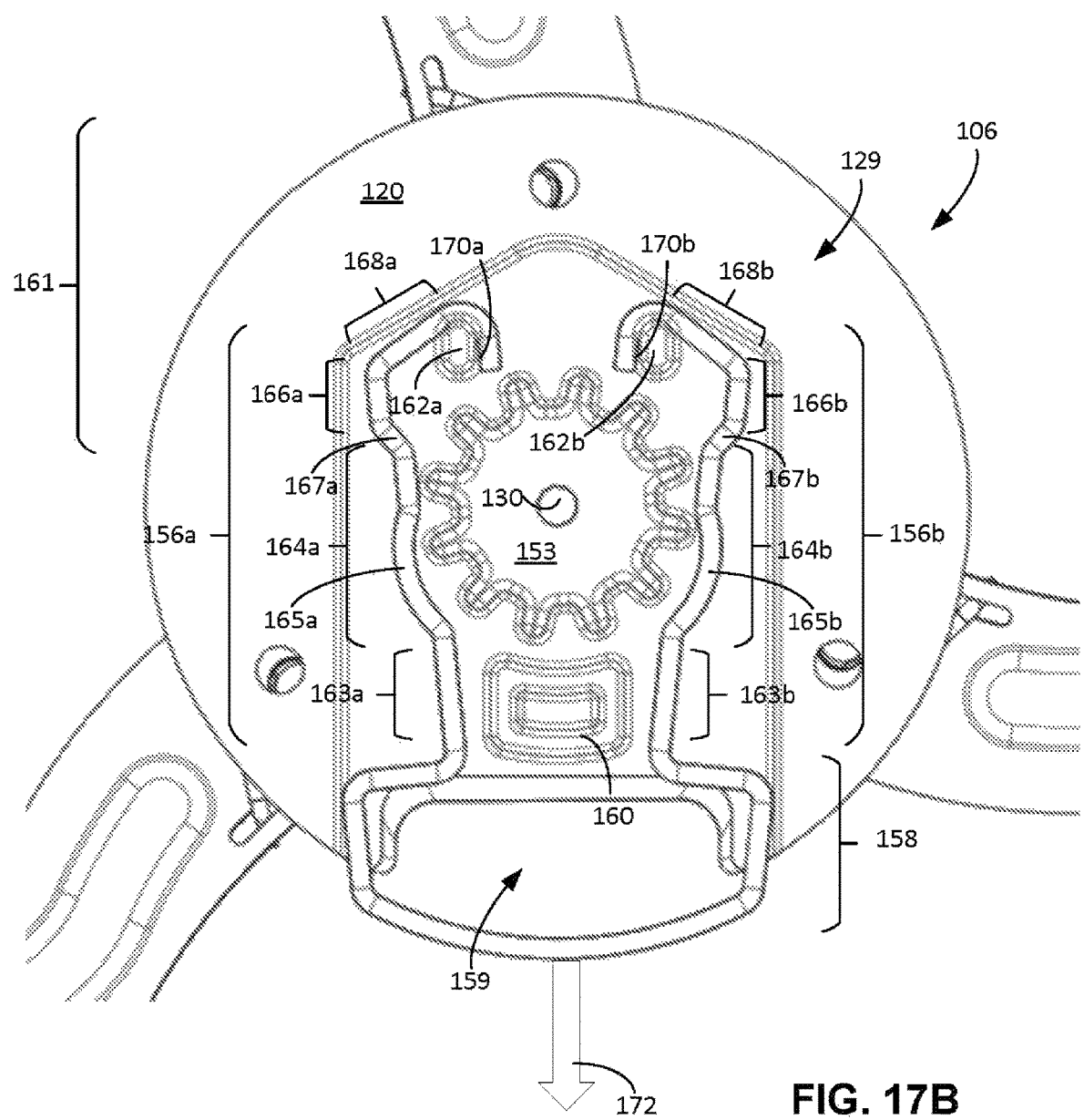
FIG. 17B is a top view of the blade assembly showing the retention clip of FIG. 16 in a release position.

The extension of the step portions 167a, 167b away from the drive axis 130 enables the first stop portions 166a, 166b to be positioned farther from one another while enabling the retaining portions 164a, 164b to be positioned closer to one another. The step portions 167a, 167b accordingly are sized and dimensioned to define the distance between the first stop portions 166a, 166b and the distance between the retaining portions 164a, 164b. The retaining portions 164a, 165b are positioned such that, in a retaining position (FIG. 17A), the concave portions 165a, 165b engage the groove 155 of the actuator shaft 113, and in a release position (FIG. 17B), the concave portions 165a, 165b do not engage the groove 155 of the actuator shaft 113. The distance between the first stop portions 166a, 166b, in turn define the lengths of the sliding portions 168a, 168b, which at least in part determine the amount of separation that occurs due to the movement of the retaining clip 129 from the retaining position (FIG. 17A) to the release position (FIG. 17B).

In some examples, the lengths of the support portions 163a, 163b are between 4 and 6 millimeters. The lengths of the retaining portions 164a, 164b are between, for example, 7 and 11 millimeters. The lengths of the step portions 167a, 167b are between, for example, 0.5 and 3 millimeters. The angle formed between the step portion 167a, 167b and the retaining portion 164a, 164b is, for example, between 120 and 150 degrees. The lengths of the first stop portions 166a, 166*b* are, for example, between 1 and 4 millimeters. The lengths of the sliding portions 168*a*, 168*b* are, for example, between 2 and 6 millimeters. The angle formed between the sliding portion 168*a*, 168*b* and the first stop portion 166*a*, 166*b* is, for example, between 130 and 170 degrees. The lengths of the second stop portions 170*a*, 170*b* are, for example, between 1 and 4 millimeters.

The alignment mechanism between the actuator shaft 113 and the blade assembly 106, while described as an interface between the splined cavity 153 and the splined portion 154, is a lock-and-key, an offset boss, or other appropriate mechanism to rotationally constrain the actuator shaft 113 to the blade assembly 106. The portion 154, for example, includes one or more longitudinally extending posts that mate with cavities defined by the housing 120 of the blade assembly 106. The posts mated with the cavities inhibit relative rotational movement between the housing 120 and the shaft 113. In some cases, the shaft 113 includes a radially extending flange rotationally asymmetric about the drive axis 130. The radially extending flange inserts into a corresponding cavity in the housing 120 to rotationally couple the blade assembly 106 to the actuator shaft 113.

FIG. 17A shows the retention clip 129 in the retaining position. In the retaining position, the arms 156 contact the support boss 160 at one end and contact the posts 162*a*, 162*b* at the other end. In particular, the support portions 163*a*, 163*b* abut the support boss 160, and the first stop portion 166*a*, 166*b* of each arm 156 abuts the corresponding post 162*a*, 162*b*. If the splined portion 154 of the actuator shaft 113 has been inserted into the splined cavity 153, the retaining portion 164*a*, 164*b* of each of the arms 156 interfaces with the splined portion 154 to prevent relative translation (e.g., relative vertical movement) between the blade assembly 106 and the shaft 113. For example, in this implementation, the retaining portions 164*a*, 164*b* are positioned within the groove 155 of the splined portion 154 to lock the housing 120 and the blade assembly 106 to the actuator 112.

The retention clip 129 is movable between the retaining position (FIG. 17A) and the release position (FIG. 17B). When a pull force 172 applied on the tab portion 158 is directed along the plane to which the retention clip 129 is confined and is directed outward from the drive axis 130, the arms 156 slide along the housing 120 to increase a separation distance between the retaining portions 164*a*, 164*b*. The user, for example, applies the pull force 172 on the tab portion 158 by pulling the tab portion 158 away from the drive axis 130, thereby causing the retaining portions 164*a*, 164*b* to move away from one another. The increased distance between the retaining portions 164*a*, 164*b* enables the retaining portions 164*a*, 164*b* to be removed from the groove 155 of the actuator shaft 113 such that the actuator 112 is translatable relative to the housing 120.

During application of the pull force 172, the support portions 163*a*, 163*b* remain in sliding contact with the support boss 160. As a result, the arms 156 deform outwardly relative to the drive axis 130, with the support portions 163*a*, 163*b* remaining substantially undeformed. The pull force 172 causes the sliding portions 168*a*, 168*b* to slide along the posts 162*a*, 162*b*, in turn causing the retaining portion 164*a*, 164*b* of the arms 156 to deform outwardly relative to the drive axis 130. With continued application of the pull force 172, the sliding portions 168*a*, 168*b* continue sliding along the posts 162*a*, 162*b* until the second stop portions 170*a*, 170*b* abut the posts 162*a*, 162*b*. During this sliding motion, the retaining portions 164*a*, 164*b* continue to deform outwardly relative to the drive axis 130.

When the second stop portions 170*a*, 170*b* abut the posts 162*a*, 162*b*, the arms 156 are in the release position (FIG. 17B). In the release position, the retaining portions 164*a*, 164*b* are no longer positioned within the groove 155 of the splined portion 154. If the blade assembly 106 was mounted to the actuator 112, when the retention clip 129 is in the release position, the blade assembly 106 is no longer locked to the actuator 112. The blade assembly 106 is translatable relative to the actuator 112 such that the blade assembly 106 can be dismounted from the actuator 112.

In a retaining position as depicted in FIG. 17A, the first stop portions 166*a*, 166*b* are positioned between, for example, 7 and 13 millimeters (e.g., between 7 and 9 millimeters, between 9 and 11 millimeters, between 11 and 13 millimeters, approximately 8 millimeters, approximately 10 millimeters, approximately 12 millimeters) away from one another. The retaining portions 164*a*, 164*b* are positioned between, for example, 6 and 12 millimeters (e.g., between 6 and 8 millimeters, between 8 and 10 millimeters, between 10 and 12 millimeters, approximately 7 millimeters, approximately 9 millimeters, approximately 11 millimeters). Because the sliding portions 168*a*, 168*b* extend toward one another, in some examples, in the retaining position (FIG. 17A) of the retention clip 129, the second stop portions 170*a*, 170*b* are adjacent one another. The second stop portions 170*a*, 170*b* are, for example, between 1 millimeter and 1.5 millimeters away from one another (as measured from a longitudinal axis of the second stop portion 170*a* to a longitudinal axis of the second stop portion 170*b*). In some examples, the second stop portions 170*a*, 170*b* are contacting one another when the retention clip 129 is in the retaining position (FIG. 17A).

In the release position as depicted in FIG. 17A, the first stop portions 166*a*, 166*b* are positioned between, for example, 12 and 18 millimeters (e.g., between 12 and 14 millimeters, between 14 and 16 millimeters, between 16 and 18 millimeters, approximately 13 millimeters, approximately 15 millimeters, approximately 17 millimeters) away from one another. The retaining portions 164*a*, 164*b* are positioned between, for example, 10 and 16 millimeters (e.g., between 10 and 12 millimeters, between 12 and 14 millimeters, between 14 and 16 millimeters, approximately 11 millimeters, approximately 13 millimeters, approximately 15 millimeters) away from one another. The second stop portions 170*a*, 170*b* are, for example, 5 to 7 millimeters away from one another.

When the retention clip 129 is moved from the retaining position (FIG. 17A) to the release position (FIG. 17B), in some implementations, the distance between the first stop portions 166*a*, 166*b* increases by 50% to 150% (e.g., 50% to 100%, 100% to 150%). In some cases, the distance between the retaining portions 164*a*, 164*b* increases by 40% to 80% (e.g., 40% to 60%, 60% to 80%). In some examples, the distance between the second stop portions 170*a*, 170*b* increases by 300% to 700% (e.g., between 300% and 500%, between 500% and 700%).

When the first stop portions 166*a*, 166*b* contact the support posts 162*a*, 162*b*, the arms 156 extend substantially parallel to the axis of the pull force (e.g., the support portions 163*a*, 163*b*, the first stop portions 166*a*, 166*b*, and the second stop portions 170*a*, 170*b* extend substantially parallel to the axis of the pull force 172). The support portions 163*a*, 163*b*, the first stop portions 166*a*, 166*b*, and the second stop portions 170*a*, 170*b*, for example, each form an angle between 0 and 2.5 degrees with the axis of the pull force 172. When the arms 156 are in a fully deformed position (e.g., when the second stop portions 170*a*, 170*b* contact the support posts 162a, 162b, as shown in FIG. 17B), the arms 156 deform at an angle relative to the axis of the pull force 172. The angle when the arms 156 are deformed is, for example, between 5 and 15 degrees (e.g., between 7 and 13 degrees, between 9 and 11 degrees, approximately 8 degrees).

The arms 156 are formed of a resilient material, such as, for example, aluminum, stainless steel, acetal, or other resilient material. As a result, when the pull force 172 is released, the retention clip 129 returns to the retaining position (FIG. 17A). In some implementations, the arms 156 are further coupled to a spring or other resilient member that biases the arms 156 toward the retaining position.

When the retention clip 129 locks into the groove 155, in some examples, the retention clip 129 contacts the shaft 113 and generates an audible and tactile indication that the retention clip 129 is properly seated into the groove 155. The audible indication is, for example, a clicking noise that indicates to the user that blade assembly 106 is coupled to the actuator 112. In some cases, the housing 120 includes one or more protrusions that contact the arms 156 of the retention clip 129 as the retention clip 129 moves to the retaining position (FIG. 17A). The contact between the protrusions and the arms 156 generates an additional audible indication that the retention clip 129 is in the retaining position (FIG. 17A). In further examples, the housing 120 includes one or more protrusions that contact the arms 156 as they move into the release position (FIG. 17B), thereby enabling yet another audible indication that informs a user that the retention clip 129 has been released.

In an alternate exemplary implementation, the blade assembly 300 of FIGS. 19A through 24 includes a spring loaded coupling latch 329, 329a, 329b, 329c for locking the blade assembly to the shaft 113 of the actuator 112, thereby enabling the blade assembly 300 and the shaft 113 to jointly rotate about a drive axis 130 relative to the body 103 of the mobile robot 100.

Like the embodiment of FIGS. 3 through 15D, the blade assembly 300 includes a housing 320 to hold the blades 308, 308a, 308b, 308c (collectively referred to as blades 308 and interchangeably referred to as blade 308). While three blades 308, 308a, 308b, 308c are shown, in some examples, one, two, four, or more blades are mounted in the blade assembly 300. The housing 320 is, for example, a cylindrical housing. The housing 320 includes slots 322, 322a, 322b, 322c (collectively referred to as slots 322 and interchangeably referred to as slot 322) formed between an upper housing 324 and a lower housing 326 that are connected to form the housing 320 and to define the slots 322 in which the blades 308 are mounted. The slots 322 extend between finger wells 350, 350a, 350b, 350c (collectively referred to as finger wells 350 and interchangeably referred to as finger well 350) that accommodate human fingers intentionally pressing push tabs 330, 330a, 330b, 330c (collectively referred to as push tabs 330 and interchangeably referred to as push tab 330) disposed within each finger well for unlocking the blade assembly 300 from the shaft 113. The push tabs 300 are located within the periphery of the housing 320 such that they are protected from accidental application of force by incidental contact with external objects and such that they are protected from accidentally snagging on foreign objects with which they come into contact.

Figure 19A:
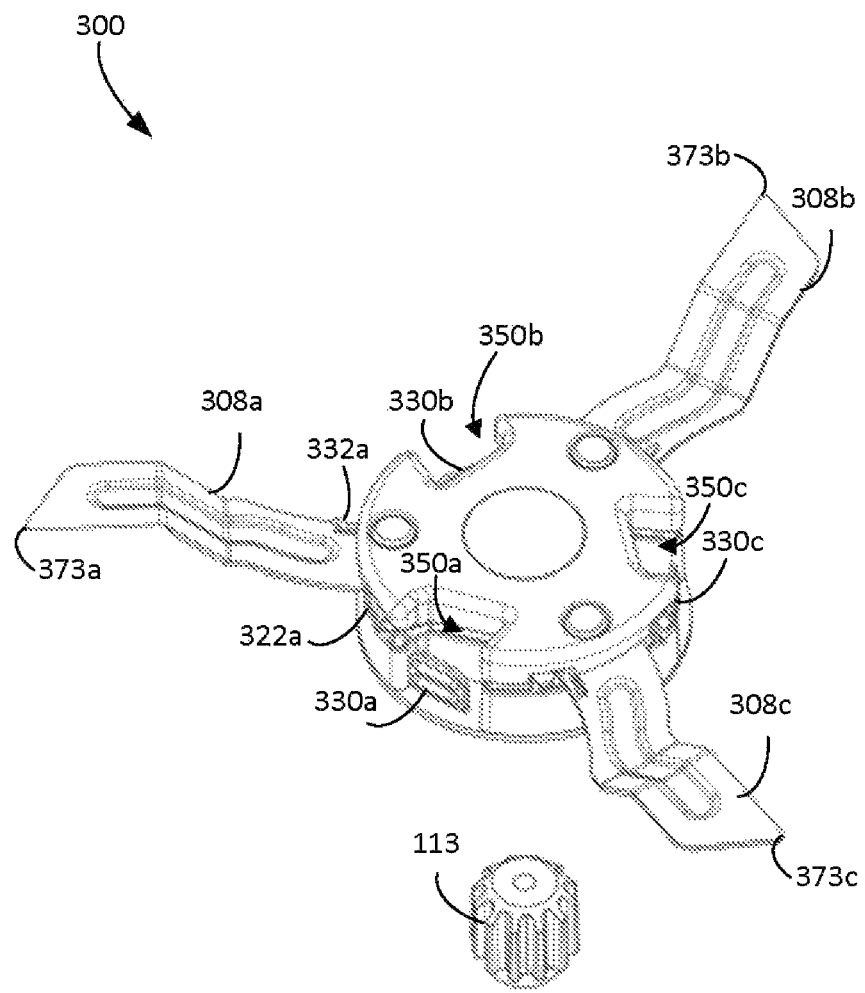
FIG. 19A is a bottom perspective view of an exemplary blade assembly.
Figure 19B:
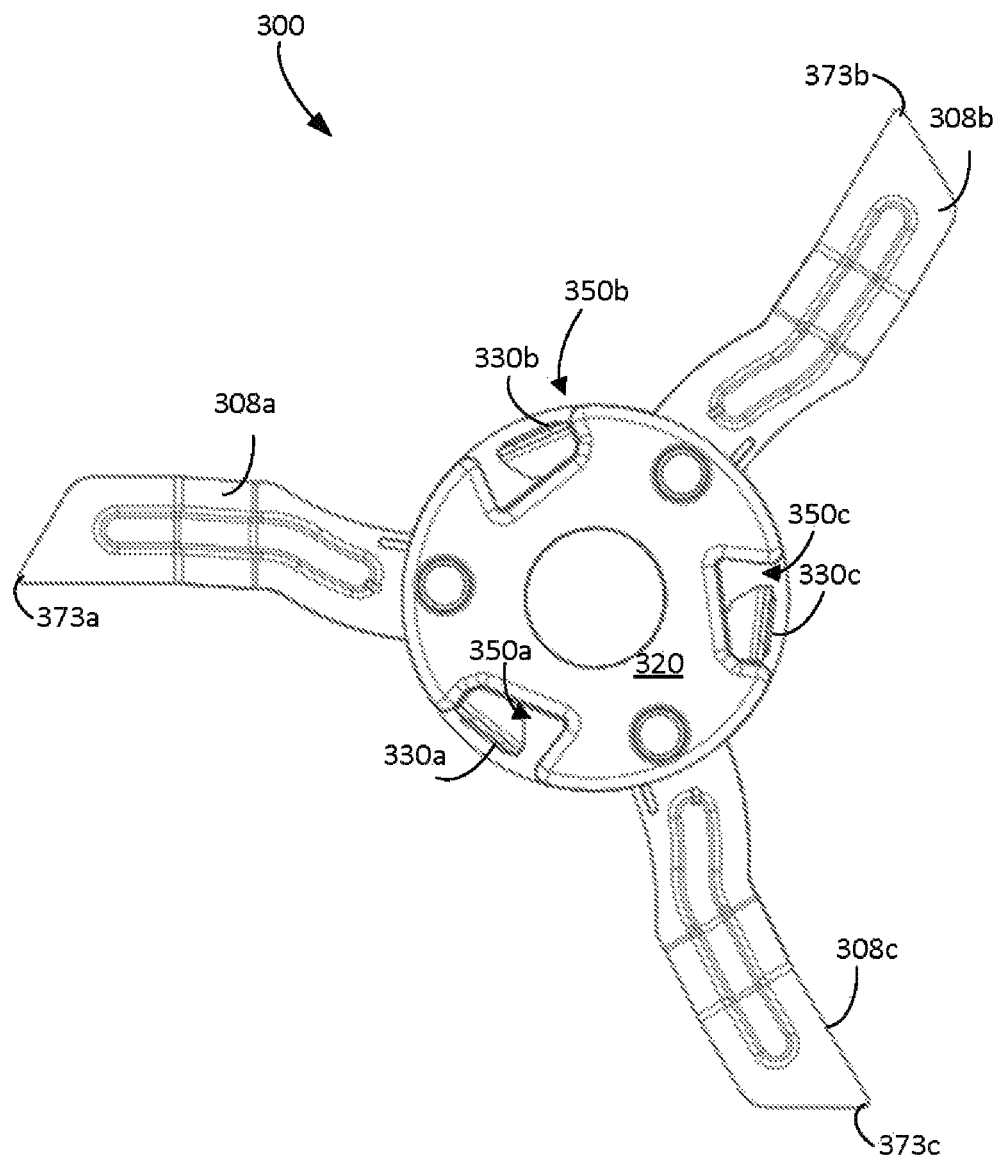
FIG. 19B is a bottom view of an exemplary blade assembly.
Figure 20:
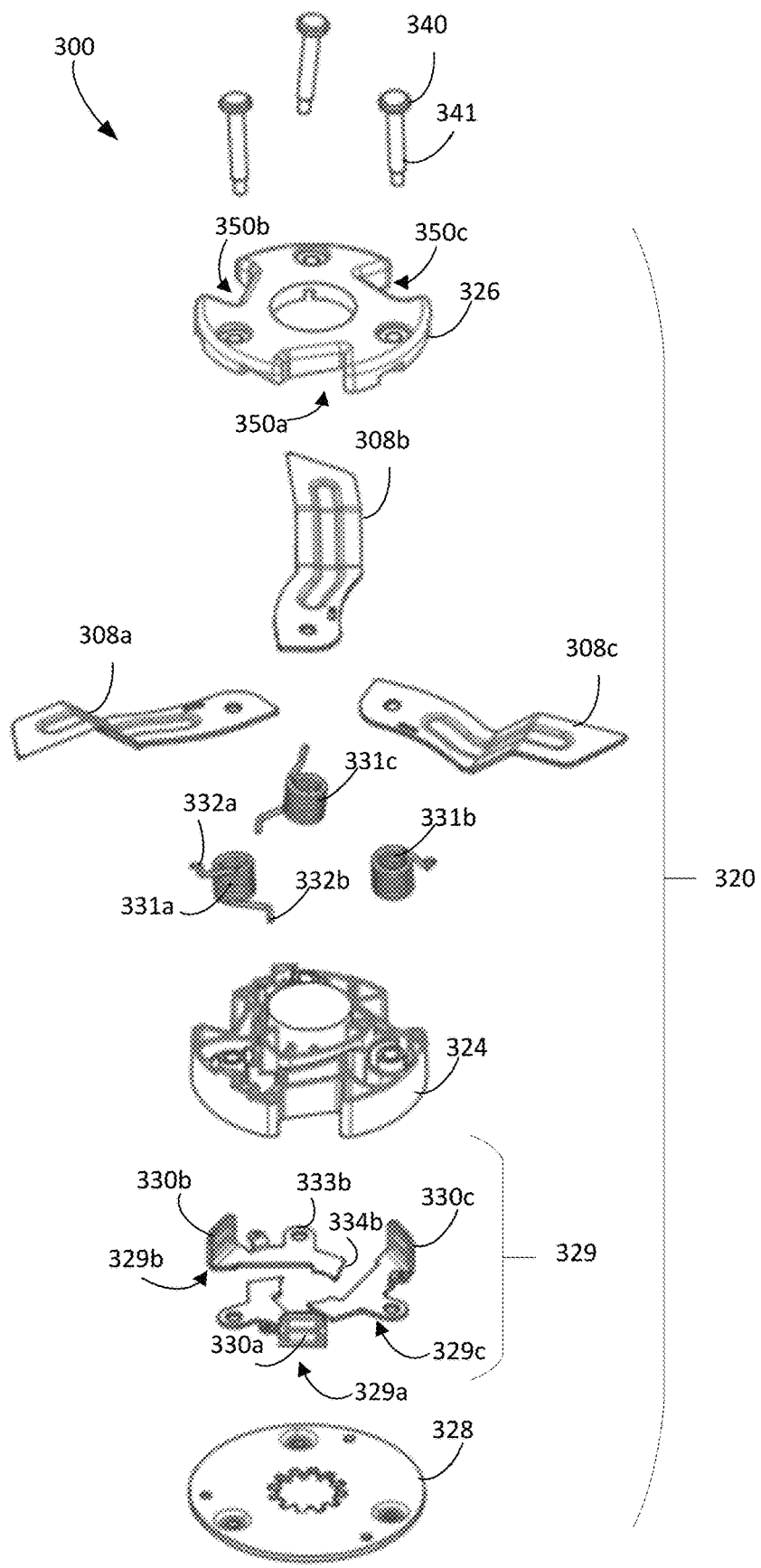
FIG. 20 is an exploded bottom perspective view of an actuator and a blade assembly of FIGS. 19A and 19B.
Figure 21:
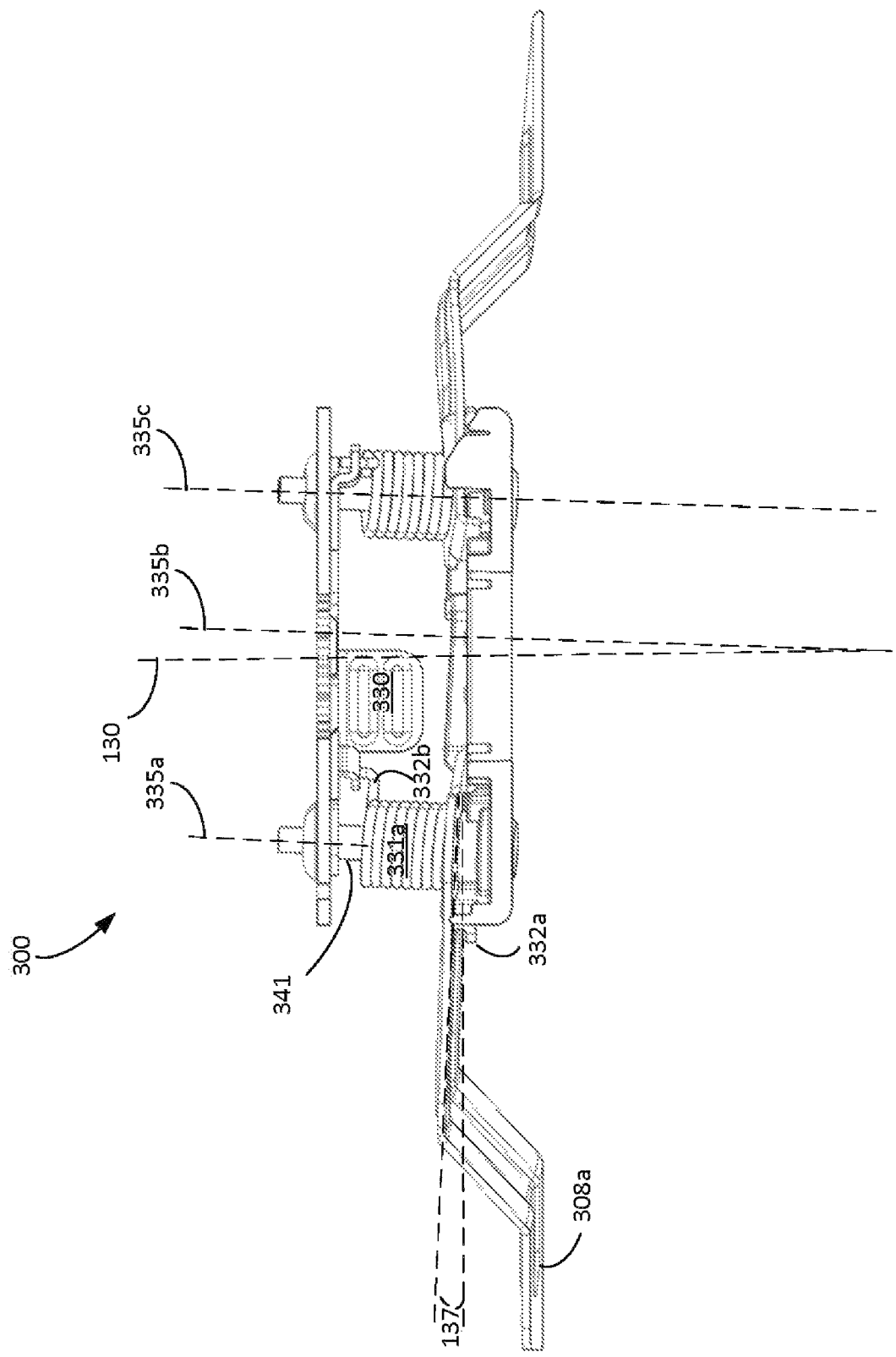
FIG. 21 is a side view of the blade assembly of FIGS. 19A and 19B with a portion of the assembly removed.

The blades 308 also move through the slots 322 in response to impact with objects on the ground surface 50. In some examples, as shown in FIG. 19A, the slots 322 include widened portions 322a to accommodate the blades 308 in their fully retracted positions. The slots 322 are also inclined along the cylindrical housing so that the slots 322 rise as they extend through the housing, thereby enabling the blades 308 to rise as they move through the housing. As shown in FIGS. 20 through 24, each blade 308 is mounted on a pivot shaft 341 of a pivot pin 340 in the housing 320 such that each blade 308 is rotatable relative to the housing 320 about a mounting axis 335 defined by the pivot shaft 341. For example, as shown in FIGS. 19A and 21, as the blade 308a rotates about the mounting axis 335a relative to the housing 320, e.g., in response to an impact force on the blade, the blade 308a moves through the corresponding slot 322a.

The housing 320 further includes a confinement plate 328 that cooperates with the upper housing 324 to align the actuator 112 (not shown) of the robot 100 to the blade assembly 300. In implementations, as shown in the analogous embodiment of FIG. 3, the confinement plate 328 and the upper housing 324 rotationally couple the actuator 112 to the blade assembly 300. In other implementations, the confinement plate 328 does not interface with the drive shaft 113 in normal operation and does not transfer rotational torque from the blade to the drive shaft 113. The shaft 113 coupled to the actuator 112 interacts with a coupling latch 329, described in greater detail herein, to lock the actuator 112 to the housing 320. When the actuator 112 is locked to the housing 300, relative translation between the actuator 112 and the housing 320 is inhibited, thereby enabling the blade assembly 300 and the shaft 113 of the actuator 112 to jointly rotate about a drive axis 130 relative to the body 103.

Similar to the embodiment of FIGS. 7A and 7B, as shown in FIG. 21, the blade assembly 300 includes a mounting axis 335, 335a, 335b, 335c, (collectively referred to as mounting axes 335 and interchangeably referred to as mounting axis 335) for each of the blades 308, 308a, 308b, 308c that is substantially non-parallel to the drive axis 130. The drive axis 130 is, for example, perpendicular to a horizontal ground surface 50, while the mounting axis 335 is angled relative to the drive axis 130. The angle between the mounting axis 335 and the drive axis 130 is, for example, is between, for example, 5 and 10 degrees (e.g., between 6 and 9 degrees, 7 and 8 degrees, approximately 7.5 degrees); however, as described herein, angles other than these can be used.

Absent impact or contact between objects on the ground surface 50 and the blades 308, the actuator 112 causes blade tips 373, 373a, 373b, 373c (collectively referred to as blade tips 373 and interchangeably referred to as blade tip 373) to rotate within a plane parallel to and above the ground surface 50. Upon impact or contact between the blades 308 and the objects, the blades 308 rotate relative to the housing 320 to cause the blade tips 373 to rotate within a plane angled to the ground surface 50. The blade tips 373 therefore change in height relative to the ground surface 50 as they rotate relative to the housing 320 of the blade assembly 300. The angle between the plane of rotation of the blade tips 373 relative to the housing 320 and the plane of rotation of the blade tips 373 due to the rotation of the actuator 112 is between, for example, 5 and 10 degrees (e.g., between 6 and 9 degrees, 7 and 8 degrees, approximately 7.5 degrees); however, as described herein, angles other than these can be used. The blades 308 rotate such that they move inwardly toward the housing 320 and rise away from the ground surface 50. As the blade tips 373 rise away from the ground surface 50, they are configured to increase up to a height between, for example, 5 and 15 millimeters (e.g., between 5 and 10 millimeters, 10 and 15 millimeters, 6 and 14 millimeters, 7 and 13 millimeters, approximately 8 millimeters).

As shown in FIG. 21, the blade 308a is mounted on the housing 320 at a tilt angle 137 relative to the ground surface 50. The tilt angle of the blade 308a enables the blade 308a to move in an upward trajectory as the blade 308a rotates relative the housing 320 within the slot 322. In this example, the tilt angle corresponds to the angle formed between the mounting axis 335 and the drive axis 130. The tilt angle 137 is between, for example, 5 and 10 degrees (e.g., between 6 and 9 degrees, 7 and 8 degrees, approximately 7.5 degrees); however, angles other than these may be used as the tilt angle. For example, a greater tilt angle increases the height that the blade 308a rises as the blade 308a moves within the corresponding slot 322a (see FIG. 19A). In other examples, a lower tilt angle in combination with a longer slot increases the distance travelled by the blade 308a through the slot 322a without decreasing the maximum height increase of the blade 308a as the blade 308a moves to the retracted position.

Because the housing 320 is cylindrical, the slot 322a is inclined to enable the blade 308a at the tilt angle 137 to rotate in the upward trajectory relative to the housing 320 through the housing 320. Each of the slots 322, for example, is angled to accommodate the tilt angle 137 of the blade 308. Each slot 322 extends from proximate the mounting axis 335 away from the mounting axis 335 upward in the housing 320. Each slot 322 inclines upward toward the body 103 away from the ground surface 50 to form an angle with the horizontal ground surface 50. The angle between the slot and the ground surface 50 corresponds to the tilt angle 137 of the blade 308. The blades 308 accordingly are rotatable through the slot 322 without contacting a wall surface of the housing 120 defining the slot 322.

As shown in FIGS. 20 through 24, the blade assembly 300 further includes springs 331, 331a, 331b, 331c (collectively referred to as springs 331 and interchangeably referred to as spring 331) mounted in the housing 320. For each spring 331, one end of the spring 131 is rotationally constrained to the blade 308 and another end of the spring is restrained to the coupling latch 329. As shown in FIGS. 21 through 24, the spring 331 includes a lower end 332b coupled to the coupling latch 329 and an upper end 332a coupled to the blade 308. The upper end 332a of the spring 331 is mounted into, for example, an opening 351 on the blade 308.

Figure 22:
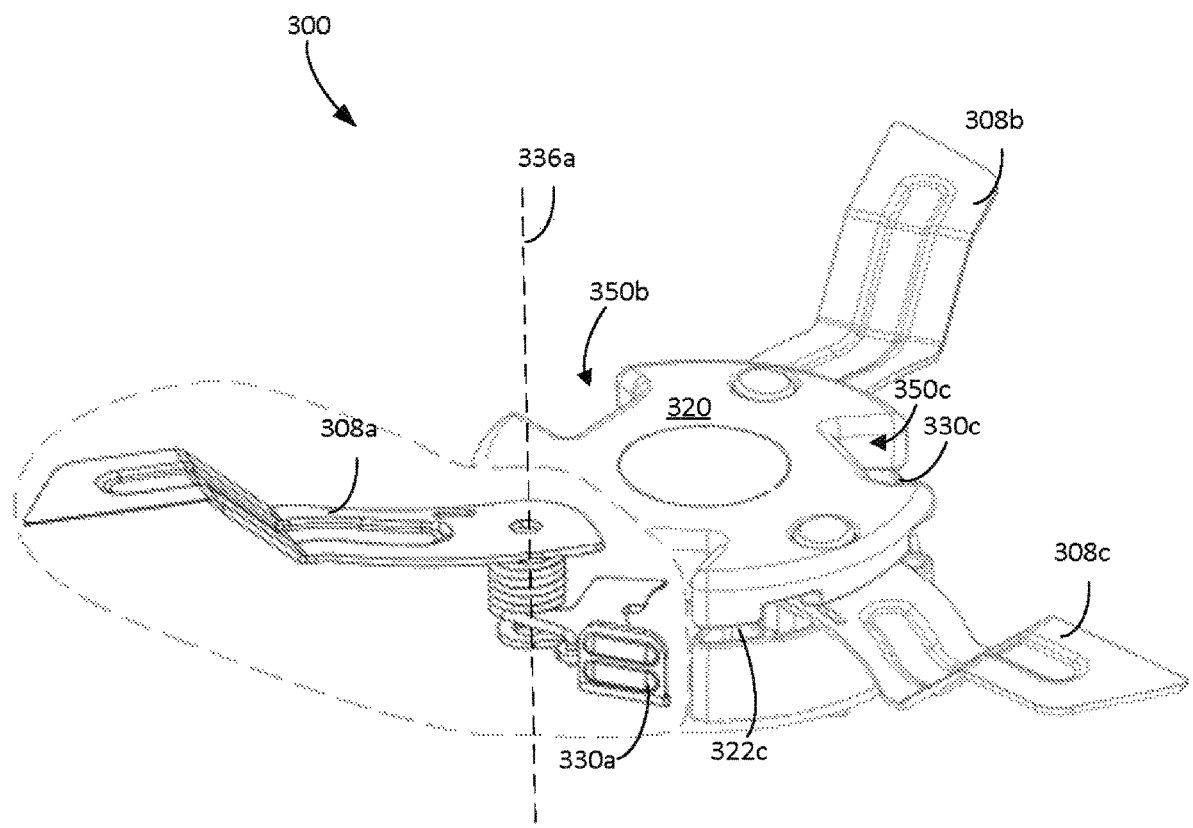
FIG. 22 is a partial cut away side view of the blade assembly of FIGS. 19A and 19B.
Figure 23:
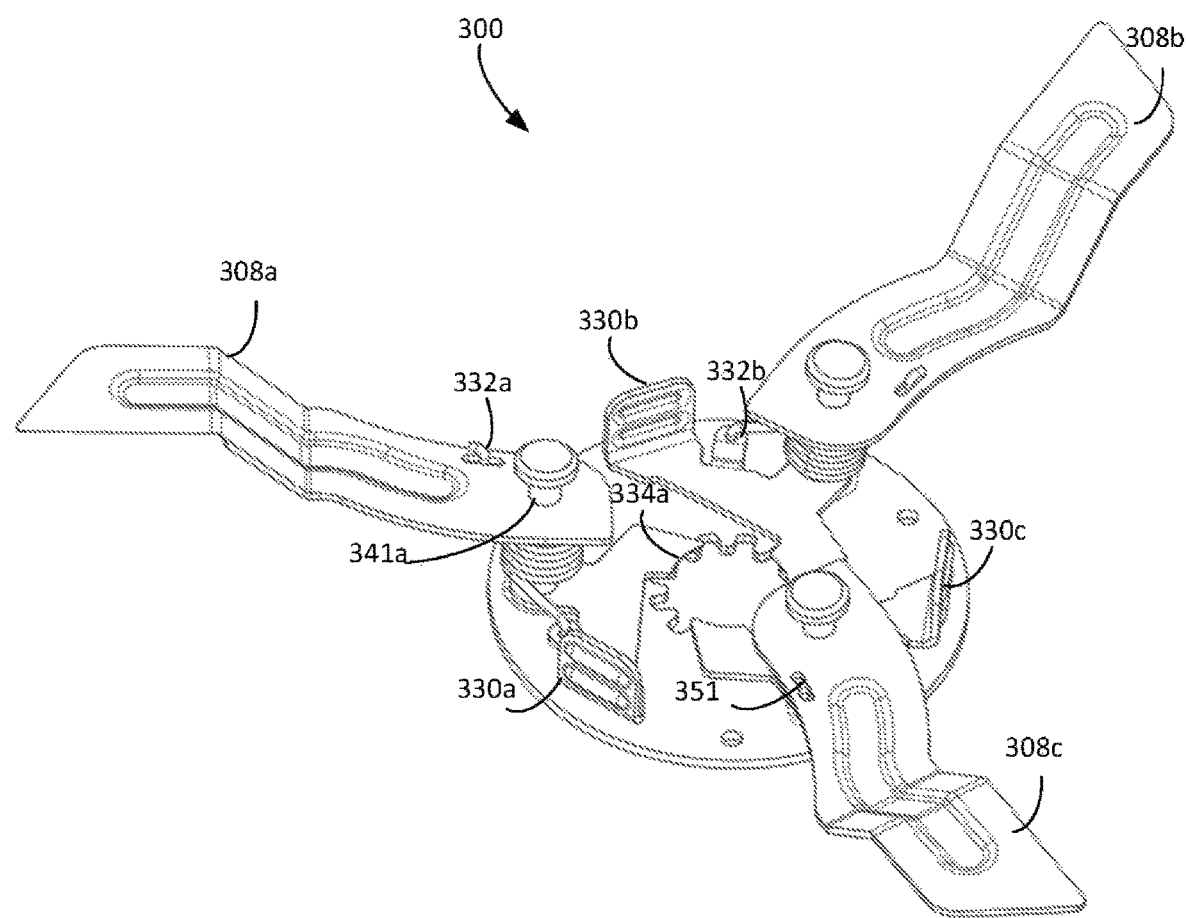
FIG. 23 is a bottom perspective view of a portion of the blade assembly of FIGS. 19A and 19B.
Figure 24:
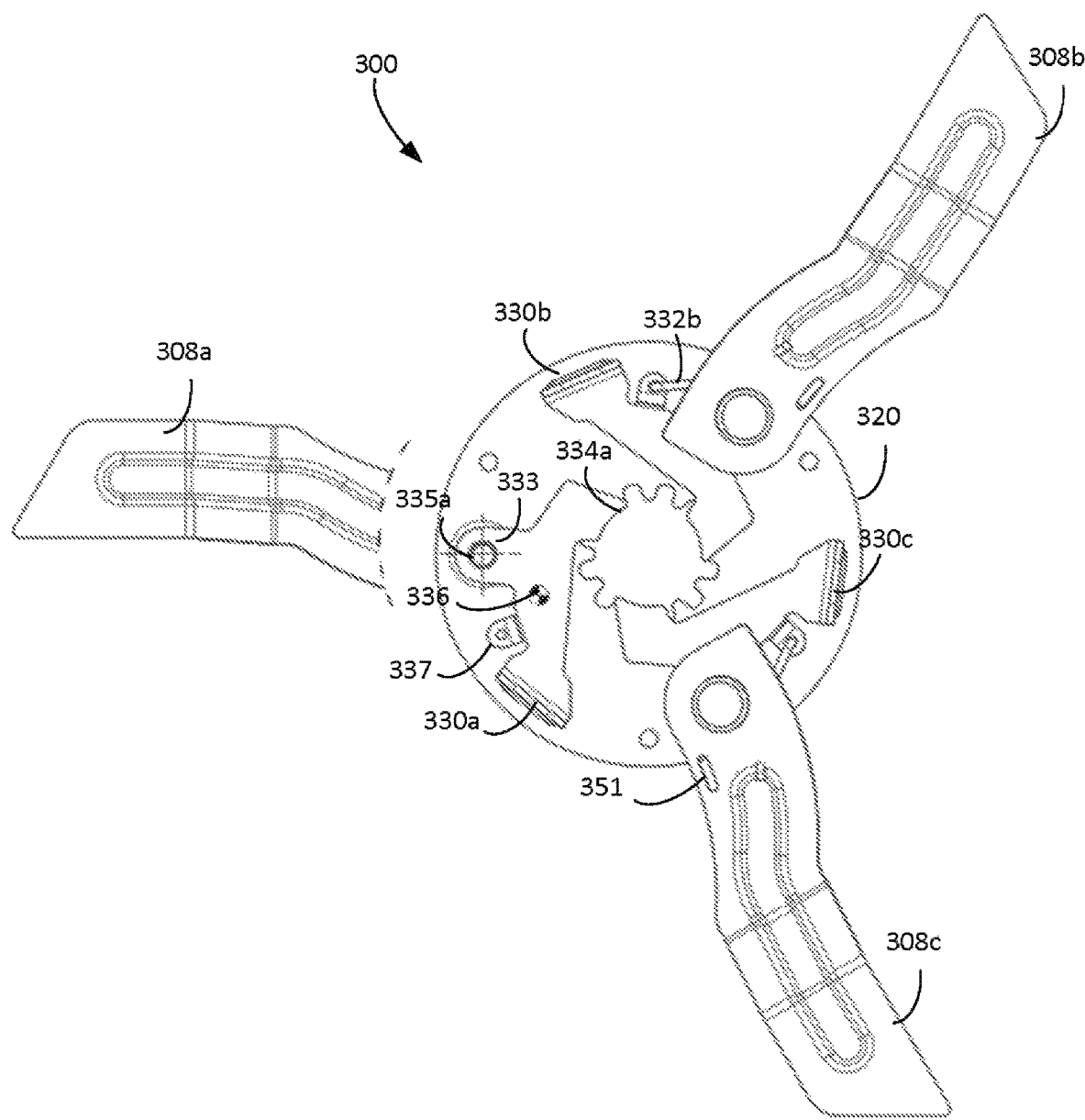
FIG. 24 is a bottom view of a portion of the blade assembly of FIGS. 19A and 19B.
Figure 25:
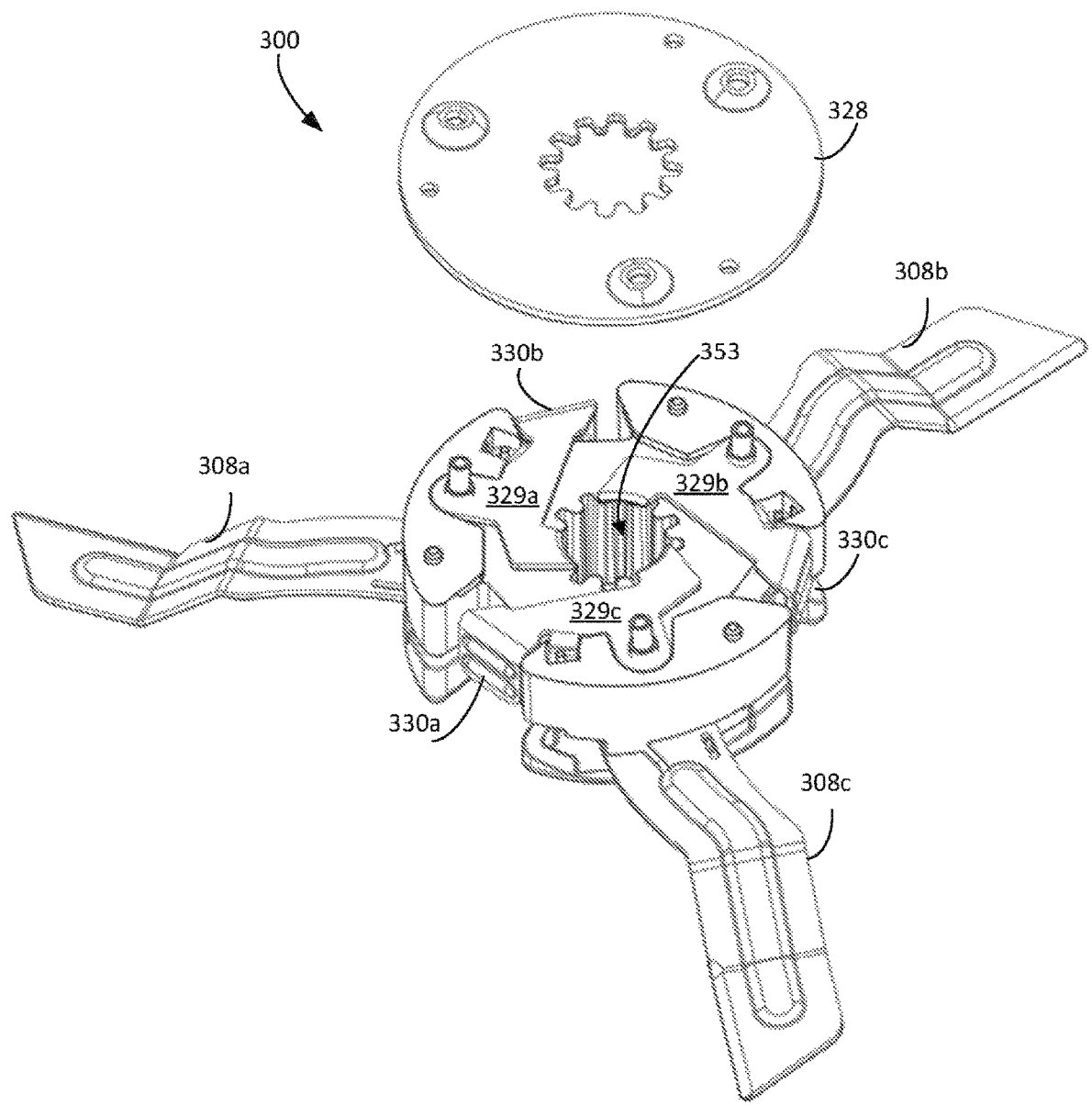
FIG. 25 is a top perspective exploded view of the blade assembly of FIGS. 19A and 19B.

Because the lower end 332b is coupled to the coupling latch 329 (e.g., the lower end 332b is rotationally constrained to coupling latch 329) and the upper end is coupled to the blade 308, motion of either or both of the coupling latch 329 and the blade 308 causes the spring 331 to twist about the twist axis 336. The blades 308 are spring-mounted within the housing 320 such that the blades 308 are biased into the position as shown in FIGS. 19A and 22 when the coupling latch 329 is full engaged with the shaft 113. The spring 331 is positioned such that a twist axis 336 of the spring 331 coincides with the mounting axis 335. Both the twist axis 336 and the mounting axis 335 are angled relative to the drive axis 130. Each blade 308, 308a, 308b, 308c, has a dedicated spring 331, 331a, 331b, 331c and therefore rotates independently from the other blades.

As shown in FIGS. 22 through 25, each finger tab 330 is an extension of a coupling latch 329 that includes a pivot arm 333 mounted to the pivot shaft 341 on which the blade 308 is mounted. The coupling latch 329 includes an engagement end 334 configured to press against the drive shaft 113 in tension loaded by the spring 331. The lower end 332b of the spring 331 is connected to the coupling latch 329 at a connection tab 337 positioned near the center of gravity 336 of the coupling latch 329 and between the finger tab 330 and the pivot arm 333, adjacent the periphery of the housing 320. In embodiments, the finger tab 330 is formed from a monolithic structural element into which the pivot arm 333, engagement end 334, and connection tab are formed. The coupling latch 329 maybe, for example, stamped, cast, injection molded, or printed as a unitary piece having these components.

In implementations, pressing the finger tab 330 rotates the coupling latch 329 around the pivot shaft 341 such that the spring 331 twists in compression and the engagement end 334 disengages from the drive shaft 113. In embodiments, the engagement end 334 has a radius of curvature matching the radius of curvature of the drive shaft 113, and the drive shaft includes a groove, undercut, or other geometry for receiving the engagement end 334 to prevent removal of the blade assembly 300 form the drive shaft 113. The blade assembly 300 rotates at a high frequency of revolutions, for example 1000 to 6000 RPM (e.g., 1000 RPM, 2000 RPM, 3000 RPM, 4000 RPM, 5000 RPM, 6000 RPM). Because the center of gravity 336 is on the opposite side of the rotation axis 335 from the engagement end 334, centrifugal force pulls each push tab 330 outward and pushes the engagement end 334 of the coupling latch 329 against the drive shaft 113 thereby ensuring that the engagement end 334 will not disengage from the drive shaft 113 during rotation.

Additionally, because the blade 308 is connected to an upper end 332a of the spring 331 and the coupling latch 329 is connected to a lower end 332b of the spring, rotation of the blade 308 relative to the housing 320 away from its initial position through the slot 322 causes the spring to increase the spring force pressing the coupling latch into the drive shaft 113 further preventing the coupling latch 329 from disengaging from the drive shaft 113. For example, when the blade 308 encounters an obstacle and retracts within the housing and through the slot 322, the spring 331 presses the engagement end 334 into the drive shaft. The spring 331 is, for example, a 1 to 5 lb-in (e.g., 1 to 2.5 lb-in, 2.5 to 5 lb-in, approximately 2.5 lb-in, 0.11 to 0.57 N-m, 0.11 to 0.28 N-m, 0.28 to 0.57 N-m, approximately 0.28 N-m) torsional spring; however, torsional springs having other performance characteristics may be used. For example, a torsional spring with greater strength increases the amount of energy absorbed by the spring when the blade 308 is rotated to the fully retracted position and increases the amount of force required to cause the blade 308 to move to the fully retracted position. A torsional spring with lower strength decreases the amount of energy absorbed by the spring when the blade 308 is rotated to the fully retracted position and decreases the amount of force required to cause the blade 308 to move to the fully retracted position.

In implementations, the blade assembly 300 has three finger wells 350 forming indentations in the housing 320. In implementations, these finger wells 350 are equidistantly spaced or spaced unevenly in an ergonomic pattern to enable a user to grasp the housing 320 while pressing the finger tab 350 in each finger well and rotating the associated coupling latch 320 away from the drive shaft 113 of the mobile robot. Once the coupling latches rotate so that they no longer contact the drive shaft 113, a user can pull the blade assembly free of the drive shaft 113 thereby disengaging the blade assembly from the robot 100 for maintenance or replacement. The drive shaft 113, coupling latch 329 and confinement plate 328 are designed in such a way that the user may reattach the blade assembly by pressing it onto the drive shaft 113, with or without activating the finger tabs 330. Alternatively, a user may reattach the blade assembly 300 to the drive shaft 113 by pressing the push tabs within the finger wells to rotate the engagement end 334 of each coupling latch outward toward the outer periphery of the housing such that a mounting cavity 353 (FIG. 25) of the blade assembly 300 may receive the drive shaft 113 therein. Releasing the finger tabs enables the spring 331 to rotate the coupling latch 329 into forced engagement with the drive shaft.

One or more controllers (e.g., the controller 114) may control all or part of the foregoing operation of the grass cutting mobile robot by executing one or more computer programs. A computer program can be written in any form of programming language, including compiled or interpreted languages, and it can be deployed in any form, including as a stand-alone program or as a module, component, subroutine, or other unit suitable for use in a computing environment.

Operations associated with implementing all or part of the control processes, for example, for the actuator 112, described herein can be performed by one or more programmable processors executing one or more computer programs to perform the functions described herein. Control over all or part of the control processes described herein can be implemented using special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass PCBs for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Figure 18A:
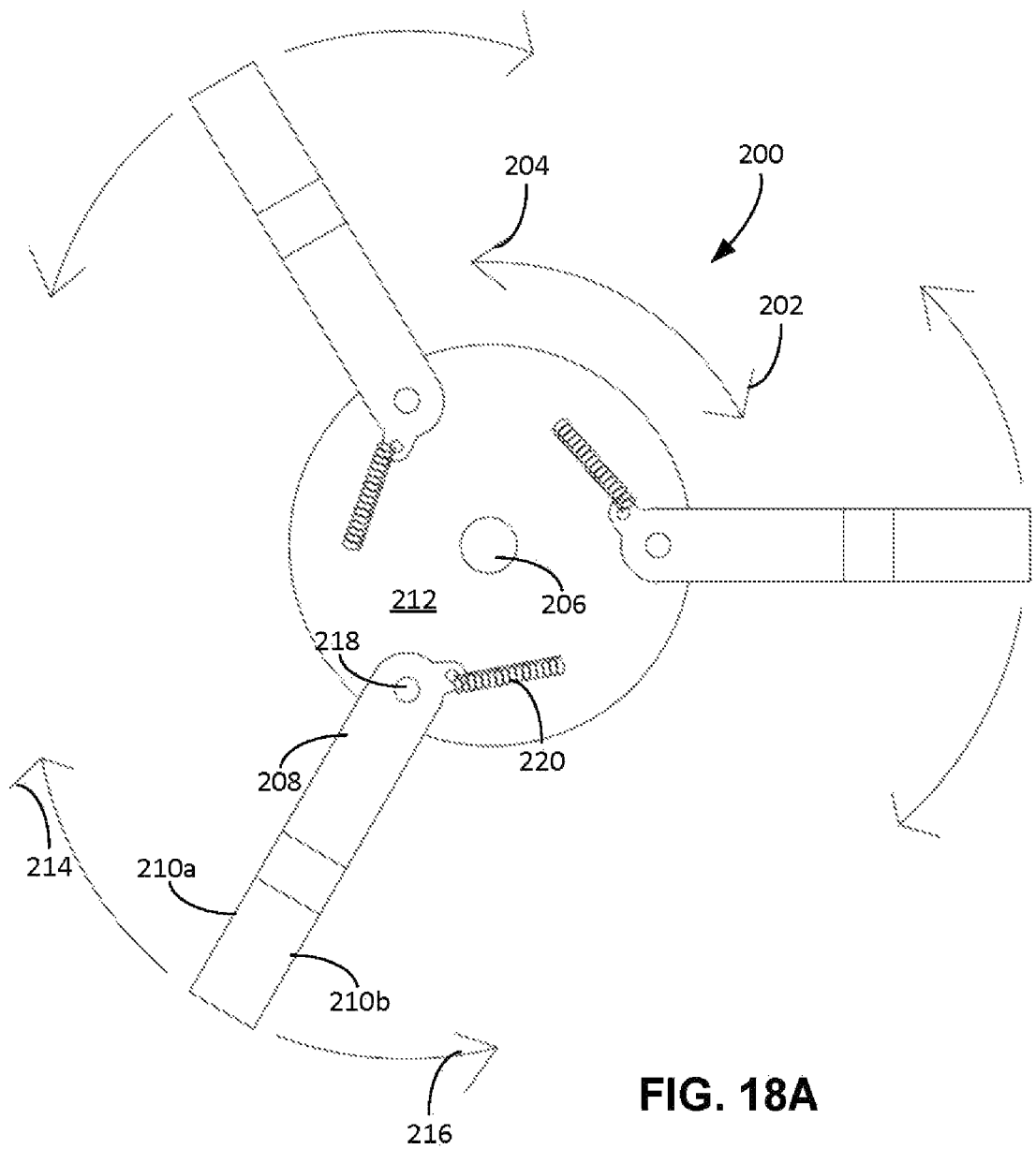
FIG. 18A is a top schematic view of an example of a blade assembly with blades having two cutting edges.

While the housing 120 has been described to be rotated in a first direction and the blade 108a has been described to rotate in a second direction in response to impact with an object in the environment, in some examples, a housing of a blade assembly is rotatable in both a first direction and a second direction. The blade is also rotatable in both the first direction and the second direction. For example, FIG. 18A shows a schematic top view of a blade assembly 200. In contrast to the blade assembly 106 described herein, the blade assembly 200 is rotatable in both a clockwise direction 202 and a counterclockwise direction 204 about a drive axis 206 to cut grass. In particular, blades 208 of the blade assembly 200 include edges 210a, 210b both usable to cut grass.

Blades 208 of the blade assembly 200 are mounted in a housing 212 of the blade assembly 200 such that the blades 208 are rotatable relative to the housing 212 in both a clockwise direction 214 and a counterclockwise direction 216 about a mounting axis 218. The blades 208 are spring-mounted. The blade assembly 200 includes, for example, springs 220 connecting the blades 208 to the housing 212. The springs 220 are, for example, extension or compression springs that extend or compress in response to movement of the blades 208 within the housing 212. Absent impact with objects in the environment, the blades 208 are in neutral positions as depicted in FIG. 18A.

Figure 18B:
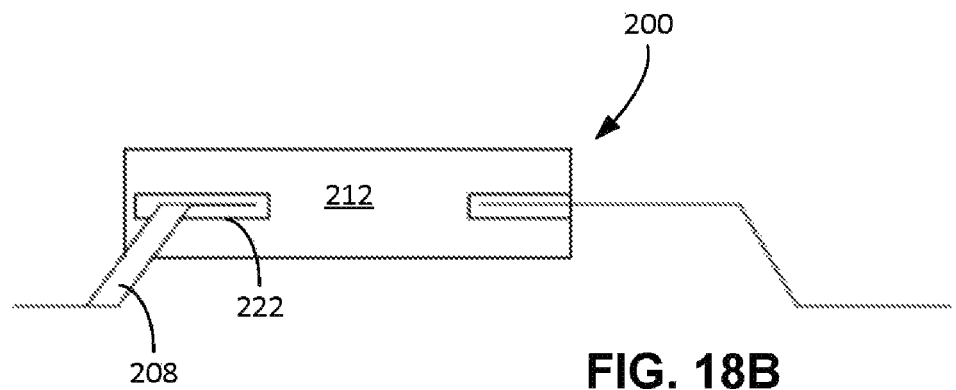
FIG. 18B is a side schematic view of the blade assembly of FIG. 18A.

As shown in a schematic side view of the blade assembly 200 in FIG. 18B, the blades 208 are mounted such that they do not rise within the housing 186, e.g., within slots 222 of the housing 212, when the blades 208 rotate relative to the housing 212. In this regard, the blades 208 may not have a tilt angle, as described with respect to the blades 208. Furthermore, the slots 222 are configured to accommodate rotation of the blades 208 relative to the housing 212 in both the clockwise direction 214 and the counterclockwise direction 216 about the mounting axis 218.

During mowing operations, the blade assembly 200 is rotatable (e.g., by the actuator 112) in both the clockwise direction 202 and the counterclockwise direction 204. The edge 210a of the blade 208 cuts the grass when the blade assembly 200 is rotated in the clockwise direction 202. The edge 210a of the blade 208 can contact objects in the environment during the rotation of the blade assembly 200 in the clockwise direction 202. In response to impact of the edge 210a with an object, the blade 208 rotates in the counterclockwise direction 216 relative to the housing 212 such that a radius of the blade tip is reduced. As a result, the blade 208 maneuvers laterally around the object to avoid being stuck in contact with the object, as described in greater detail with respect to FIGS. 15A to 15D. The rotation of the blade 208 within the housing 212 in the counterclockwise direction 216 causes the corresponding spring 220 to compress. When the blade 208 is moved beyond the object, the compressed spring 220 biases the blade 208 back to the neutral position.

The edge 210b cuts the grass when the blade assembly 200 is rotated in the counterclockwise direction 204. The edge 210b can contact objects in the environment during the rotation of the blade assembly 200 in the counterclockwise direction 204. In response to impact of the edge 210b with an object, the blade 208 rotates in the clockwise direction 214 relative to the housing 212 such that a radius of the blade tip is reduced. As a result, the blade 208 maneuvers laterally around the object to avoid being stuck in contact with the object, as described in greater detail with respect to FIGS. 15A to 15D. The rotation of the blade 208 relative to the housing 212 in the clockwise direction 214 causes the corresponding to spring 220 to stretch. When the blade 208 is moved beyond the object, the stretched spring 220 biases the blade 208 back to the neutral position. Thus, in the example of the blade assembly 200 described in FIGS. 18A and 18B, the blades 208 are able to move into a retracted position (e.g., the retracted position 176) through rotation in the clockwise direction 214 relative to the housing 212 and through rotation in the counterclockwise direction 216 relative to the housing 212.

Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. A grass cutting mobile robot comprising:
 a body; and
 a blade assembly connected to the body and rotatable about a drive axis, the blade assembly comprising:

two or more spring mounted blades, each blade of the two or more blades rotatably mounted on a corresponding mounting axis and including a corresponding cutting portion extending inwardly toward the drive axis from a corresponding blade tip;
two or more springs, each spring of the two or more springs being configured to constrain movement of an associated one of the two or more blades; and
a housing to hold the two or more blades, the housing comprising:
two or more finger wells;
two or more slots in which to mount the two or more blades, each slot of the two or more slots extending between corresponding successive finger wells of the two or more finger wells; and
two or more push tabs, each push tab of the two or more push tabs accessible within a corresponding one of the two or more finger wells and connected to a corresponding coupling latch of two or more coupling latches, wherein the corresponding coupling latch of the two or more coupling latches is mounted on the mounting axis of a corresponding one of the two or more blades and configured to engage with a shaft rotatable about the drive axis, and wherein, for each of the two or more push tabs, pressing a push tab of the two or more push tabs inward toward the drive axis rotates the corresponding coupling latch of the two or more coupling latches away from the drive axis and releasing the push tab of the two or more push tabs rotates the corresponding coupling latch of the two or more coupling latches towards the drive axis.

2. The grass cutting mobile robot of claim 1, wherein the two or more finger wells are equidistantly spaced about the housing.

3. The grass cutting mobile robot of claim 1, wherein the two or more finger wells are recessed within the housing and the two or more push tabs are positioned fully within a periphery of the housing.

4. The grass cutting mobile robot of claim 1, wherein a coupling latch of the two or more coupling latches is connected to a lower end of a corresponding one of the two or more springs.

5. The grass cutting mobile robot of claim 1, wherein a coupling latch of the two or more coupling latches is configured to rotate around the mounting axis of a blade of the two or more blades.

6. The grass cutting mobile robot of claim 1, wherein a coupling latch of the two or more coupling latches comprises an engagement end configured to engage with the shaft, the engagement end having a radius of curvature complimentary of a radius of curvature of the shaft.

7. The grass cutting mobile robot of claim 1, wherein each slot of the two or more slots is angled so that, in response to an impact, a portion of a corresponding blade of the two or more blades moves within a corresponding slot of the two or more slots towards the drive axis by rotating about the mounting axis of the corresponding blade of the two or more blades to cause the cutting portion of the corresponding blade of the two or more blades to move upward relative to a ground surface toward the body and to reduce a tip radius defined by the blade tip of the corresponding blade of the two or more blades and the drive axis as the blade tip of the corresponding blade of the two or more blades rotates about the drive axis.

8. The grass cutting mobile robot of claim 1, wherein each of the two or more slots extends, from proximate the mounting axis of a corresponding blade of the two or more blades, away from the mounting axis of the corresponding blade of the two or more blades, and upward at an incline relative to a horizontal ground surface, an angle of the incline relative to the horizontal ground surface being between 5 and 10 degrees.

9. The grass cutting mobile robot of claim 1, wherein the mounting axis of a blade of the two or more blades and the drive axis are non-parallel.

10. The grass cutting mobile robot of claim 1, wherein the housing is configured to receive the shaft, wherein the shaft connects the housing to the body, the shaft defining a groove therein,
and wherein a coupling latch of the two or more coupling latches further comprises an engagement end configured to engage with the shaft, the engagement end positionable within the groove to lock the housing to the shaft.

11. The grass cutting mobile robot of claim 1, wherein each of the two or more blades is connected to an upper end of a corresponding one of the two or more springs.

12. The grass cutting mobile robot of claim 1, wherein a push tab of the two or more push tabs and a coupling latch of the two or more coupling latches are formed in a monolithic element.

13. A blade assembly for a grass cutting mobile robot, the blade assembly comprising:
a housing to hold blades and configured for coupling to an actuator of the grass cutting mobile robot so that the housing is rotatable about a drive axis, the housing comprising a slot in which to mount one of the blades, wherein the housing is configured to receive a shaft that connects the housing to the actuator, the shaft defining a groove therein;
a coupling latch mounted on an axis of the one of the blades and configured to engage with the shaft, the coupling latch being rotatable within the housing to move an engagement end towards, or away from the groove, wherein the engagement end is positionable within the groove to lock the housing to the actuator; and
a spring that connects at an upper end to the one of the blades and at a lower end to the coupling latch.

14. The blade assembly of claim 13, wherein the one of the blades is movable through the slot towards another one of the blades in response to an impact, and the slot is configured to slope upwards in the housing toward a body of the grass cutting mobile robot, thereby enabling the one of the blades to move upwards in response to the impact.

15. The blade assembly of claim 14, wherein:
the spring is a torsion spring having a twist axis, and
the one of the blades is configured to rotate relative to the housing about a mounting axis coincident with the twist axis and non-parallel to the drive axis.

16. The grass cutting mobile robot of claim 14, wherein the spring biases the one of the blades away from the other one of the blades.

17. The grass cutting mobile robot of claim 13, wherein the blade assembly is configured to rotate relative to a body of the grass cutting mobile robot in a first direction, and the one of the blades is configured to rotate relative to the body in a second direction opposite the first direction in response to an impact.

18. The grass cutting mobile robot of claim 17, further comprising:
the actuator, wherein the actuator is mounted in the body to rotate the blade assembly, and one or more processors to execute instructions to perform operations comprising:

detecting an increase in an electrical current delivered to the actuator, the increase being responsive to the impact, and reducing the electrical current delivered to the actuator in response to detecting the increase.

19. The blade assembly of claim 13, wherein the housing comprises a splined cavity configured to mate with a corresponding splined portion of the shaft of the actuator.

20. The blade assembly of claim 13, wherein the housing further comprises a finger well adjacent one of the blades and a push tab extending from the coupling latch and accessible within the finger well, wherein the spring biases the coupling latch to rotate toward the shaft, and wherein pressing the push tab inward toward the drive axis rotates the coupling latch away from the to shaft.

* * * * *

UNITED STATES PATENT AND TRADEMARK OFFICE
CERTIFICATE OF CORRECTION

| | | |
|---|---|---|
| PATENT NO. | : 11,470,774 B2 | Page 1 of 1 |
| APPLICATION NO. | : 16/631109 | |
| DATED | : October 18, 2022 | |
| INVENTOR(S) | : Brian W. Doughty | |

It is certified that error appears in the above-identified patent and that said Letters Patent is hereby corrected as shown below:

In the Claims

Column 31, Line 17, Claim 20 – delete "the to" and insert -- the --.

Signed and Sealed this
Twentieth Day of December, 2022

*Katherine Kelly Vidal*

Katherine Kelly Vidal
*Director of the United States Patent and Trademark Office*